United States Patent [19]
Kajimoto et al.

[11] Patent Number: 5,539,527
[45] Date of Patent: Jul. 23, 1996

[54] SYSTEM FOR NON-LINEAR VIDEO EDITING

[75] Inventors: Kazuo Kajimoto, Neyagawa; Rumi Tsubota, Hirakata; Kinya Kanno, Katano, all of Japan

[73] Assignee: Matsushita Electric Industrial Co., Ltd., Osaka, Japan

[21] Appl. No.: 209,746

[22] Filed: Mar. 10, 1994

[30]     Foreign Application Priority Data

Mar. 11, 1993  [JP]  Japan ................................ 5-050468
Dec. 28, 1993  [JP]  Japan ................................ 5-349713
Dec. 28, 1993  [JP]  Japan ................................ 5-352818

[51] Int. Cl.⁶ .................................................... H04N 5/76
[52] U.S. Cl. ............................ 358/335; 358/342; 360/13
[58] Field of Search .............................. 358/335, 342, 358/311, 906; 360/33.1, 13, 14.1; 348/159, 552; H04N 5/76

[56]                References Cited

U.S. PATENT DOCUMENTS

| | | | |
|---|---|---|---|
| 4,754,342 | 6/1988 | Duffy | 360/14.3 |
| 4,837,638 | 6/1989 | Fullwood | 358/311 |
| 4,945,425 | 7/1990 | Hahn | 358/311 |
| 4,964,004 | 10/1990 | Barker | 358/335 |
| 5,206,929 | 4/1993 | Langford et al. | 358/311 |

*Primary Examiner*—Tommy P. Chin
*Assistant Examiner*—Huy Nguyen
*Attorney, Agent, or Firm*—Price, Gess & Ubell

[57]                ABSTRACT

A non-linear video editing apparatus having a randomly accessible image data storage unit, a FIFO, a video effects unit, and desired-shots storage unit. The image data from the image data storage unit and data transfer to the FIFO are controlled so that images are not interrupted during an editing operation. The apparatus dispenses with a great number of switches and manage with a FIFO having a small capacity.

204 Claims, 63 Drawing Sheets

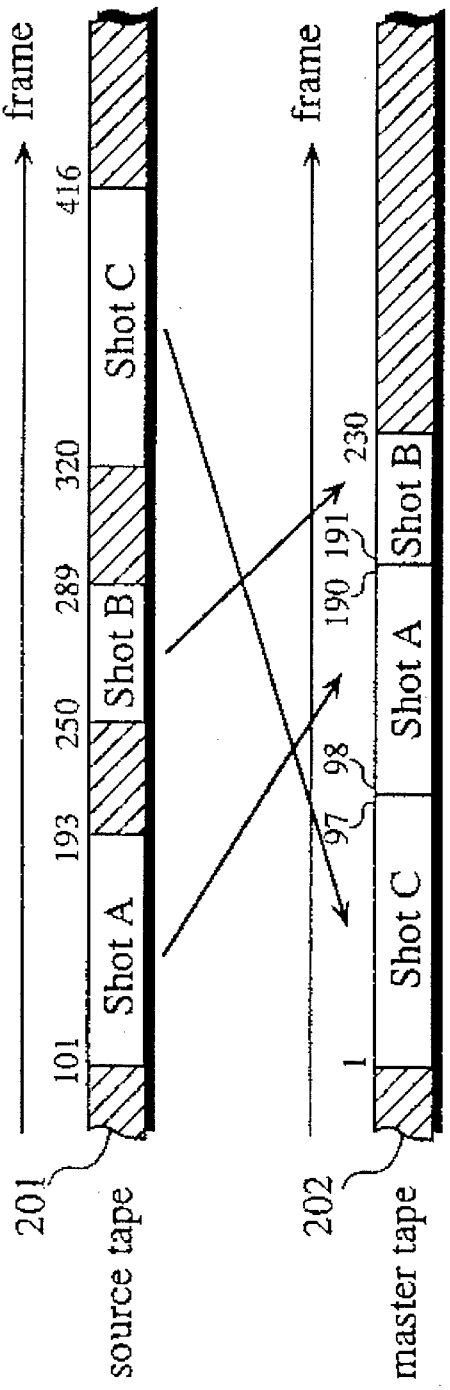

Fig. 5B

AC roll

| Shot No. | Start frame No. | Termination frame No. |
|---|---|---|
| 1 | 320 | 416 |
| 2 | 101 | 193 |
| ⋮ | ⋮ | ⋮ |

BC roll

| Shot No. | Start frame No. | Termination frame No. |
|---|---|---|
| 1 | 501 | 620 |
| 2 | 751 | 860 |
| ⋮ | ⋮ | ⋮ |

Fig. 5C

| In-points | Out-points | Effects No. |
|---|---|---|
| 1 | 97 | PIPACBC10 |
| 98 | 120 | PIPACBC10 |
| 121 | 190 | PIPACBC10 |
| 191 | 230 | PIPACBC10 |

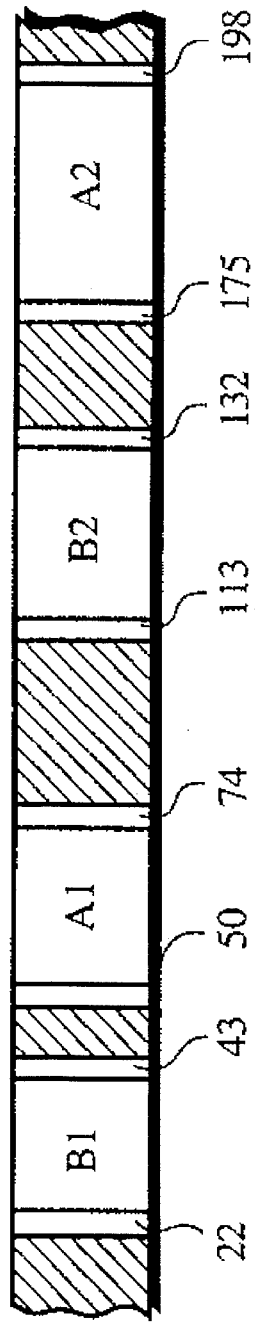

Fig. 10

| Shot | Start frame No. | Termination frame No. | Replay start frame No. | Replay termination frame No. |
|---|---|---|---|---|
| B1 | 0022 | 0043 | 0019 | 0040 |
| B2 | 0113 | 0132 | 0051 | 0070 |

Fig. 11

| In-points | Out-points | Effects No. |
|---|---|---|
| 0019 | 0024 | WIPE05 |
| 0035 | 0040 | WIPE14 |
| 0051 | 0058 | WIPE07 |

Fig. 18

| block transfer request times | block transfer start frame No. | block transfer termination frame No. | block transfer frames | shot No. |
|---|---|---|---|---|
| 1st | 320 | 327 | 8 | 1 |
| 2nd | 328 | 335 | 8 | 1 |
| 3rd | 336 | 343 | 8 | 1 |
| ⋮ | ⋮ | ⋮ | ⋮ | ⋮ |
| 11th | 400 | 407 | 8 | 1 |
| 12th | 408 | 416 | 9 | 1 |
| 13th | 101 | 108 | 8 | 2 |
| 14th | 109 | 116 | 8 | 2 |
| ⋮ | ⋮ | ⋮ | ⋮ | ⋮ |
| 23rd | 181 | 188 | 8 | 2 |
| 24th | 189 | 193 | 5 | 2 |
| 25th | 250 | 257 | 8 | 3 |
| 26th | 258 | 265 | 8 | 3 |
| 27th | 266 | 273 | 8 | 3 |
| 28th | 274 | 281 | 8 | 3 |
| 29th | 282 | 289 | 8 | 3 |

Fig. 22

| Shot No. | Start frame No. | Termination frame No. | Replay start frame No. | Replay termination frame No. |
|---|---|---|---|---|
| 1 | 320 | 416 | 1 | 97 |
| 2 | 101 | 193 | 98 | 190 |
| 3 | 250 | 289 | 191 | 230 |

Fig. 23

| Shot No. | Start frame No. | Termination frame No. | Replay start frame No. | Replay termination frame No. |
|---|---|---|---|---|
| 1 | 501 | 620 | 1 | 120 |
| 2 | 751 | 860 | 121 | 230 |

Fig. 24

| block transfer request times | block transfer start frame No. | block transfer termination frame No. | block transfer frames | shot No. |
|---|---|---|---|---|
| 1st | 501 | 508 | 8 | 1 |
| 2nd | 509 | 516 | 8 | 1 |
| 3rd | 517 | 524 | 8 | 1 |
| ⋮ | ⋮ | ⋮ | ⋮ | ⋮ |
| 15th | 613 | 620 | 8 | 1 |
| 16th | 751 | 758 | 8 | 2 |
| 17th | 759 | 766 | 8 | 2 |
| ⋮ | ⋮ | ⋮ | ⋮ | ⋮ |
| 29th | 855 | 860 | 6 | 2 |

Fig. 31B

| Shot No. | Start frame No. | Termination frame No. | Replay start frame No. | Replay termination frame No. | HD No. |
|---|---|---|---|---|---|
| 1 | 320 | 416 | 1 | 97 | 1 |
| 2 | 101 | 193 | 98 | 190 | 1 |
| 3 | 250 | 289 | 191 | 230 | 2 |

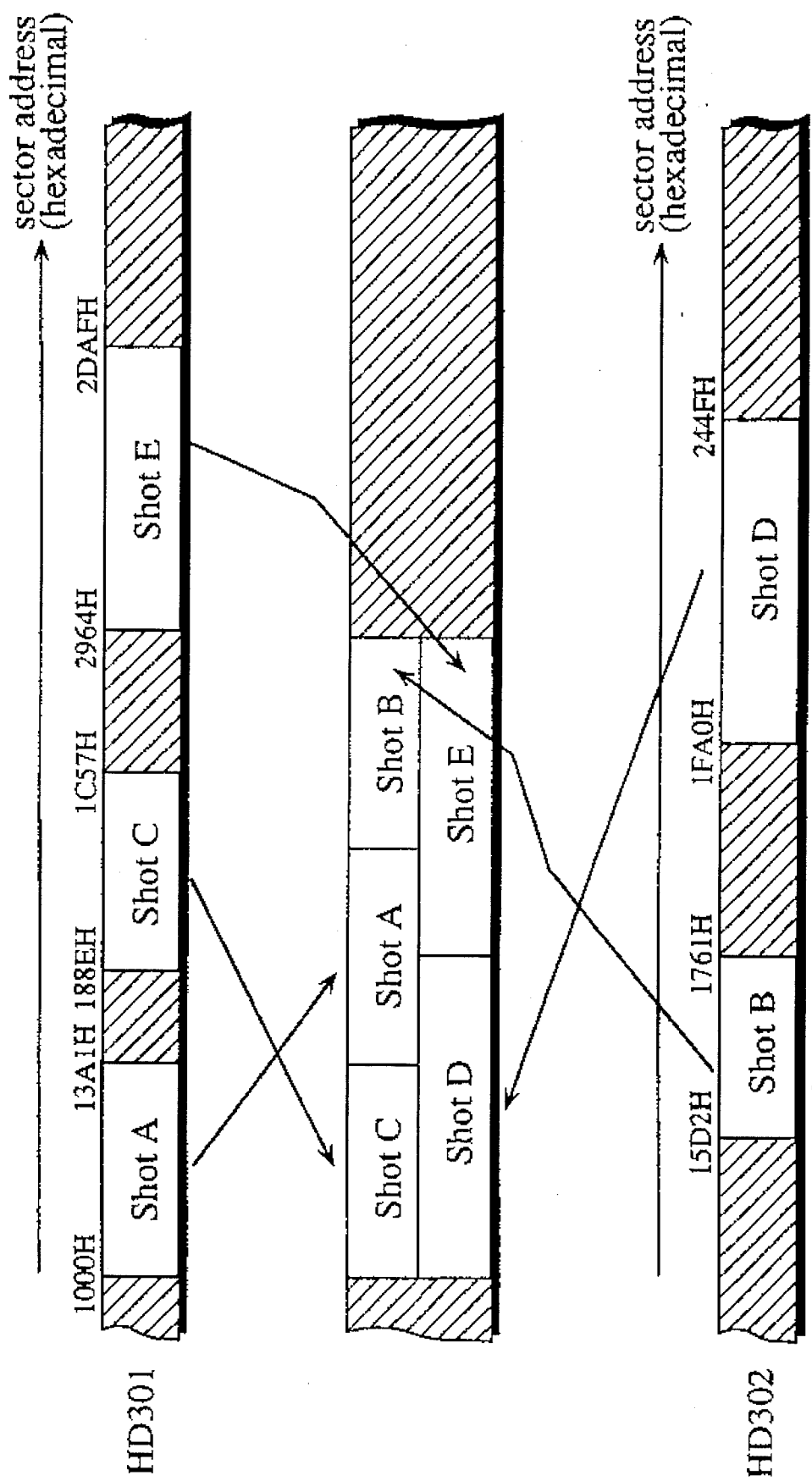

Fig. 33A

| Shot No. | Start frame No. | Termination frame No. | Replay start frame No. | Replay termination frame No. | HD No. |
|---|---|---|---|---|---|
| 1 | 320 | 416 | 1 | 97 | 1 |
| 2 | 101 | 193 | 98 | 190 | 1 |
| 3 | 250 | 289 | 191 | 230 | 2 |

Fig. 33B

| Shot No. | Start frame No. | Termination frame No. | Replay start frame No. | Replay termination frame No. | HD No. |
|---|---|---|---|---|---|
| 1 | 501 | 620 | 1 | 120 | 2 |
| 2 | 751 | 860 | 121 | 230 | 1 |

Fig. 35
| command transfer request times | transfer commands | block transfer start frame No. | block transfer termination frame No. | block transfer request times | block transfer frames | shot No. |
|---|---|---|---|---|---|---|
| 1st | 10 | 320 | 327 | 1st | 8 | 1 |
| | | 328 | 335 | 2nd | 8 | 1 |
| | | 336 | 343 | 3rd | 8 | 1 |
| | | ⋮ | ⋮ | ⋮ | ⋮ | ⋮ |
| | | 400 | 407 | 11th | 8 | 1 |
| 2nd | 10 | 408 | 416 | 12th | 9 | 1 |
| | | 101 | 108 | 13th | 8 | 2 |
| | | 109 | 116 | 14th | 8 | 2 |
| | | ⋮ | ⋮ | ⋮ | ⋮ | ⋮ |
| | | 181 | 188 | 23rd | 8 | 2 |
| | | 189 | 193 | 24th | 5 | 2 |
| 3rd | 9 | 250 | 257 | 25th | 8 | 3 |
| | | 258 | 265 | 26th | 8 | 3 |
| | | 266 | 273 | 27th | 8 | 3 |
| | | 274 | 281 | 28th | 8 | 3 |
| | | 282 | 289 | 29th | 8 | 3 |
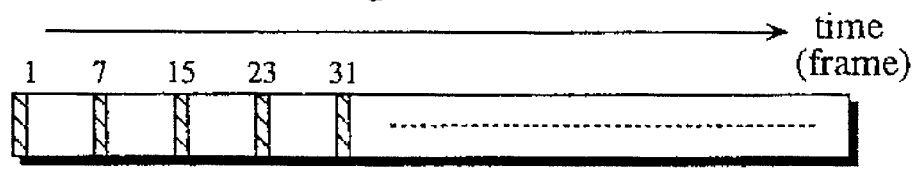
Fig. 36
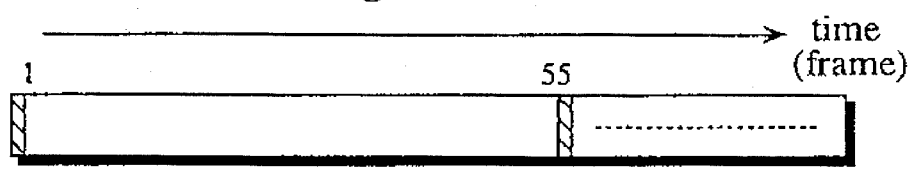
Fig. 37

Fig. 39

| command transfer request times | transfer commands | FIFO selection signals | block transfer start frame No. | block transfer termination frame No. | block transfer request times | block transfer frames | shot No. |
|---|---|---|---|---|---|---|---|
| 1st | 10 | A | 320 | 327 | 1st(A) | 8 | 1(A) |
| | | B | 501 | 508 | 1st(B) | 8 | 1(B) |
| | | A | 328 | 335 | 2nd(A) | 8 | 1(A) |
| | | B | 509 | 516 | 2nd(B) | 8 | 1(B) |
| | | A | 336 | 343 | 3rd(A) | 8 | 1(A) |
| | | B | 517 | 524 | 3rd(B) | 8 | 1(B) |
| | | ⋮ | ⋮ | ⋮ | ⋮ | ⋮ | ⋮ |
| 2nd | 10 | ⋮ | ⋮ | ⋮ | ⋮ | ⋮ | ⋮ |
| 3rd | 10 | A | 400 | 407 | 11th(A) | 8 | 1(A) |
| | | B | 581 | 588 | 11th(B) | 8 | 1(B) |
| | | A | 408 | 416 | 12th(A) | 9 | 1(A) |
| | | B | 589 | 596 | 12th(B) | 8 | 1(B) |
| | | B | 597 | 604 | 13th(B) | 8 | 1(B) |
| | | A | 101 | 108 | 13th(A) | 8 | 2(A) |
| | | ⋮ | ⋮ | ⋮ | ⋮ | ⋮ | ⋮ |
| 4th | 10 | ⋮ | ⋮ | ⋮ | ⋮ | ⋮ | ⋮ |
| 5th | 10 | ⋮ | ⋮ | ⋮ | ⋮ | ⋮ | ⋮ |
| | | B | 815 | 822 | 24th(B) | 8 | 2(B) |
| | | A | 189 | 193 | 24th(A) | 5 | 2(A) |
| | | A | 250 | 257 | 25th(A) | 8 | 3(A) |
| | | B | 823 | 830 | 25th(B) | 8 | 2(B) |
| | | ⋮ | ⋮ | ⋮ | ⋮ | ⋮ | ⋮ |
| 6th | 8 | A | 282 | 289 | 29th(A) | 8 | 3(A) |
| | | B | 855 | 860 | 29th(B) | 6 | 2(B) |

Fig. 42A

| Shot | Start frame No. | Termination frame No. | Replay start frame No. | Replay termination frame No. |
|------|-----------------|----------------------|------------------------|------------------------------|
| A1   | 0050            | 0074                 | 0000                   | 0024                         |
| A2   | 0175            | 0198                 | 0035                   | 0058                         |

Fig. 42B

| Shot | Start frame No. | Termination frame No. | Replay start frame No. | Replay termination frame No. |
|------|-----------------|----------------------|------------------------|------------------------------|
| B1   | 0022            | 0043                 | 0019                   | 0040                         |
| B2   | 0113            | 0132                 | 0051                   | 0070                         |

Fig. 43

| In-points | Out-points | Effects No. |
|---|---|---|
| 0019 | 0024 | WIPE05 |
| 0035 | 0040 | WIPE15 |
| 0051 | 0058 | WIPE27 |

| Shot | Start frame No. | Termination frame No. | Replay start frame No. | Replay termination frame No. |
|------|-----------------|----------------------|------------------------|------------------------------|
| A1 | 0050 | 0079 | 0000 | 0029 |
| A2 | 0170 | 0198 | 0030 | 0058 |

| Shot | Start frame No. | Termination frame No. | Replay start frame No. | Replay termination frame No. |
|---|---|---|---|---|
| B1 | 0003 | 0048 | 0000 | 0045 |
| B2 | 0108 | 0132 | 0046 | 0070 |

Fig. 51

| Shot | Start frame No. | Termination frame No. | Replay start frame No. | Replay termination frame No. |
|------|-----------------|----------------------|------------------------|------------------------------|
| A1   | 0050            | 0079                 | 0000                   | 0029                         |
| B1   | 0003            | 0048                 | 0000                   | 0045                         |
| A2   | 0170            | 0198                 | 0030                   | 0058                         |
| B2   | 0108            | 0132                 | 0046                   | 0070                         |

SYSTEM FOR NON-LINEAR VIDEO EDITING

BACKGROUND OF THE INVENTION

(1) Field of the Invention

The present invention relates to a system for non-linear video editing in which a video is divided into shots and after video effects have been applied, the shots are rearranged to produce a new video.

(2) Description of the Related Art

FIG. 1 is a block diagram showing the structure of a conventional video editing system. The system includes a VTR 101 having a source tape, a VTR 102 having a master tape, a sync signal generation unit 103 for generating signals to synchronize the VTRs 101 and 102, a shot link information memory 104 for holding information on the linking order of shots set by the user, and an edition control unit 105 for controlling the operations of the VTRs 101 and 102 in accordance with the information.

FIG. 2A shows a source tape 201 having Shots A, B and C corresponding to frames 101–193, 250–289, and 320–416 respectively, and a master tape 202 on which Shots C, A, and B are rearranged to correspond to frames 1–97, 98–190, and 191–230 respectively. FIG. 2B is a shot information table showing selected shots Nos. and start frame Nos. and termination frame Nos. in the source tape 201 and the master tape 202.

FIGS. 3A and 3B shows a flow chart depicting a series of operations of the edition control unit 105 for dubbing Shots A, B, and C on the source tape 201 onto the master tape 202 as shown in FIG. 2A, based on the shot information shown in FIG. B.

(a1) The operation is started when the user inputs a direction to the edition control unit 105.

(a2) All the shot link information shown in FIG. 2B is inputted to the edition control unit 105.

(a3) The shot No. shown in FIG. 2B is initialized to 1.

(a4) The start frame 320 for shot No. 1 on the source tape 201 is accessed.

(a5) After the completion of the access, the source tape 201 is rewound a little bit further than the accessed frame. This is called pre-roll, which allows the source tape 201 to reach a normal replay speed by the time the accessed frame starts to replay.

(a6) The start frame 1 for shot No. 1 on the master tap 202 is accessed.

(a7) After the completion of the access, the pre-roll is executed.

(a8) The VTR 101 having the source tape 201 starts replaying.

(a9) The VTR 102 having the master tape 202 starts recording.

(a10) The timing of the replaying of VTRs 101 and the recording of 102 is adjusted for synchronization with reference to the synch signal sent from the sync signal generation unit 103.

(a11) The adjustment is continued until the synchronization is achieved. This process is called phase modification.

(a12) After the completion of the phase modification, it is checked whether the master tape 202 is ready to start from the start frame 1.

(a13) After the check, the VTR 102 having the master tape 202 is set on a recording mode.

(a14) It is checked whether the VTR 102 has recorded up to the termination frame 97.

(a15) When the recording is completed, the recording mode is cancelled.

(a16) The VTR 101 for the source tape 201 is stopped.

(a17) The VTR 102 for the master tape 202 is stopped.

(a18) It is judged whether the shot No. in process is the largest.

(a19) If it is not the largest shot No., the shot No. is incremented by "1" and goes back to (a4) for processing the next shot.

These steps (a1)–(a19) are repeated until all the selected shots A, B, and C are dubbed onto the master tape 202 as shown in FIG. 2A. The steps (a8) and (a16) may be executed simultaneously with the steps (a9) and (a17) respectively.

The following is an operational description when two source tapes are used to create a master tape.

FIG. 4 is a block diagram showing the structure of another conventional video editing system, which is provided with two VTRs for source tapes. The system is different from the system shown in FIG. 1 as follows.

There are two VTRs: VTR AC 1011 and VTR BC 1012 for source tapes so that a shot link information memory 1041 takes care of data in both the VTRs. There are a video effects unit 1013 provided for applying video effects, a shot effects information memory 1042 provided for storing information on the video effects.

The edition control unit 105 not only controls operations of the VTR AC 1011 and VTR BC 1012 for source tapes and the VTR 102 for a master tape, based on the cut link information, but reads the contents of the video effects information memory 1042, thereby forwarding them to the video effects unit 1013. The VTR AC 1011 and VTR BC 1012 may be used independently in accordance with the contents of the edition.

Here, "channels" are not limited to frequencies in TV broadcast but represent programs or records. Although AC channel and BC channel are usually produced for different purpose from each other, they may be former half and latter half of a program.

Generally, the video effects are applied to image signals divided into luminance (Y) components and chrominance (C) components.

FIG. 5A shows a source tape 501 for AC channel having Shots A, B, and C and a source tape 502 for BC channel having Shots D and E and a master tape 503 onto which these shots are recorded with video effects called "picture in picture", which will be described below. These source tapes 501 and 502 are hereinafter referred to as AC roll 501 and the BC roll 502 respectively.

FIG. 5B are tables showing shot link information stored in the shot link information memory 1041 for the AC roll 501 and BC roll 502.

FIG. 5C is a table showing information on video effects. In the table, in-points and out-points indicate start frame Nos. and termination frame Nos. respectively on the master tape 503 to apply video effects. The video effects Nos. indicate the types of video effects: PIPACBC indicates "picture in picture" in which a child screen BC is displayed on a parent screen AC as shown in FIG. 6A, and the numeral 10 which follows PIPACBC indicates the contents of the effects. Besides the "picture in picture", the video effects include "wipe" in which a shot is partly broken away and the next shot is projected in the broken-away part so that the former is gradually replaced by the latter as shown in FIG. 6B, "fade in, fade out" in which a shot gradually appear or disappear from a black or white screen, "dissolve" in which a shot gradually fades out to disappear and another shot gradually fades in to appear until the former is replaced by the latter, "DSK" (down stream key) in which letters are superimposed on a picture image, "replacement" in which a shot appearing in another shot grows out of the latter shot until the latter shot is replaced by the former shot, "multichannel synchronous display with multiwindows", and "mosaic" in which a shot is divided into small lattices and the lattices are rearranged.

On the AC roll 501 shown in FIG. 5A, Shots A, B and C correspond to frames 101–193, 250–289, and 320–416 respectively, and on the BC roll 502, Shots D and E correspond to frames 501–620 and 751–860 respectively. The Shots C, A, and B are inputted and rearranged to correspond to frames 1–97, 98–190, and 191–230 respectively on the master tape 503. Simultaneously with the input of Shot C, A, and B, Shots D and E are inputted with the effects "picture in picture" and rearranged to correspond to frames 1–120 and 121–230 respectively on the master tape 503. As a result, on the master tape 503, Shot C is played on the parent screen followed by Shots A and B while on the child screen, Shot D is played followed by Shot E. The speed of driving these rolls are adjusted in the same manner as the case where a single roll is used.

However, it takes time to search the start frame of each selected shot on both the source tapes and the master tape. In addition, both VTRs need time for pre-roll, phase modification, and recording for each shot.

To avoid this, a non-linear image edition apparatus has been proposed, according to which images to be edited are digitalized and then stored to a randomly accessible disk.

Analog/digital conversion of image data in each frame is carried out by dividing the image data into small lattices with a number of vertical and horizontal lines and then digitizing the luminosity of each color of red, blue, and green. In case of audio data, audio signals in each time point are divided into a small range of frequency band to digitize its strength. Digital/analog conversion of image data is carried out in the reversed operations. Furthermore, both vidual and audio digitization has been developed.

Data to be edited, whether they are digital or analog, are usually specified by the storing positions of the starting and ending points, stored in correspondence with the storing position, and read out, based on its positional information.

A digital data storage device capable of randomly accessing based on address information is well known such as Maxtor Corporation MXT-1240S with sector access.

FIG. 7 is a block diagram showing the structure of a conventional non-linear video editing system, which edits digital video data stored in a randomly accessible digital data storage unit.

The system includes an AC channel shot link information memory 71, a BC channel shot link information memory 72, a storage unit 73 for source HD, an AC replay switch 74, a BC replay switch 75, a video effects information memory 76, a video effects unit 77, and a storage unit 78 for a master HD. Other components irrelevant to this invention are not illustrated.

The following is a description of editing Shots A1, A2, B1, and B2 according to this system by applying "wipe" effects shown in FIG. 6B. Shot A1 on the AC channel, which displayed first is gradually replaced by Shot B1 on the BC channel, Shot B1 is then replaced by Shot A2 on the AC channel, and Shot A2 is replaced by Shot B2 on the BC channel.

As shown in FIG. 8, the storage unit 73 for source HD holds Shot A1, A2, B1, and B2 on a single HD. The areas with slanting lines indicate frames excluded from edition. The reference numbers indicate frames adjacent to each Shot. In fact, the digitized image data are concentrically stored on a HD, where each frame corresponds to the circumference; however, it is illustrated in the form of a tape to make it easier to compare with conventional data.

The AC channel shot link memory 71 and the BC channel shot link memory 72 hold information on shots on AC channel and shots on BC channel as shown in FIGS. 9 and 10 respectively. The tables in FIGS. 9 and 10 show selected shots and frame Nos. which designate the start and termination of each shot on each of the source HD and the master HD.

FIG. 11 is a table showing video effects information stored in the video effects information memory 76. In the table, in-points and out-points indicate start frame Nos. and termination frame Nos. respectively on the master HD to apply video effects. The video effects Nos. indicate the types of video effects. The WIPE indicates the video effects "wipe", and each numeral 05, 14, and 07 indicates the types of the wipe.

The storage unit 73 for source HD receives information on the replay of Shot A1 from the AC channel shot link information memory 71 and reads out Shot A1 when the time to replay Shot A1 has come.

The AC replay switch 74 decodes the AC channel replay information sent from the AC channel shot link information memory 71 and is turned on when the time to replay Shot A1 has come, thereby transferring Shot A1 from the storage unit 73 for source HD to the video effects unit 77, and is turned off when the replay is completed.

Then, the storage unit 73 for source HD receives information on the replay of Shot B1 from the BC channel shot link information memory 72 and reads out Shot B1 when the time to replay Shot B1 has come.

The BC replay switch 75 decodes the BC channel replay information sent from the BC channel shot link information memory 72 and is turned on when the time to replay Shot B1 has come, thereby transferring Shot B1 from the storage unit 73 for source HD to the video effects unit 77, and is turned off when the replay is completed.

The video effects unit 77 applies Shots A1 and B1 with the wipe effects for replacing A1 by B1 as shown in FIG. 6B, based on the video effects information sent from the video effects information memory 76, thereby forwarding to the storage unit 78 for master HD.

In the same manner, the storage unit 73 for source HD receives information on the replay of Shot A2 from the AC channel shot link information memory 71 and reads out Shot A1 when the time to replay Shot A1 has come.

The AC replay switch 74 decodes the AC channel replay information sent from the AC channel shot link information memory 71 and is turned on when the time to replay Shot A2 has come, thereby transferring Shot A2 from the storage unit 73 for source HD to the video effects unit 77, and is turned off when the replay is completed.

The video effects unit 77 applies Shots B1 and A2 with the wipe effects for replacing B1 by A2 as shown in FIG. 6B, based on the video effects information sent from the video effects information memory 76, thereby forwarding to the storage unit 78 for master HD.

Then, the storage unit 73 for source HD receives information on the replay of Shot B2 from the BC channel shot link information memory 72 and reads out Shot B2 when the time to replay Shot B2 has come.

The BC replay switch 75 decodes the BC channel replay information sent from the BC channel shot link information memory 72 and is turned on when the time to replay Shot B2 has come, thereby transferring Shot B2 from the storage unit 73 for source HD to the video effects unit 77, and is turned off when the replay is completed.

The video effects unit 77 applies Shots A2 and B2 with the wipe effects for replacing A2 by B2 as shown in FIG. 6B, based on the video effects information sent from the video effects information memory 76, thereby forwarding to the storage unit 78 for master HD.

As a result of these operations, an edition shown in FIG. 6B is completed and the video thus produced is recorded to the storage unit 78 for master HD, thereby being displayed on CRT or the like.

However, when a plurality of shots are selected and rearranged with video effects according to this non-linear video editing system, the switches must be frequently changed over to keep correct start frames and termination frames. This demands timers and circuits, thereby enlarging the scale of the system resulting in undesirable increase in hardware.

When a device of another type is used as the storage unit 73 for source HD, consecutive replay may be impossible because their storage HDs have different performances from each other in memory density or rotation rate.

In order to read out data from a HD, it is necessary that a read out unit in the storage unit access the HD and transfer the accessed data. Therefore, the speed for transferring data is limited by a time required to access a start frame, a time to wait for a rotation of the disk, and a time to transfer data. As an approach to minimize the limitation for the purpose of synchronizing the data transfer speed with the process speed of other units such as CRT, image data constituting a frame are divided into odd-numbered scan line data and even-numbered scan line data, thereby being stored to different storage disks, which can operate in parallel. The approach allows the transfer speed to increase; however, the performance cannot be optimized with the consecutive replay parameter fixed.

When a plurality of storage disks, one of which is operable, is used, consecutive replay may be hindered by a disk with lower speed. This problem can be solved by providing a temporary storage unit to the lower-speed storage disk; however, this leads to the increase in the cost.

A hard disk or a photo-magnetic disk used as the storage disk often includes defective areas incapable of recording data. The defective areas are replaced by substitutive areas; however, the defective areas are not physically contiguous with adjacent areas, so that unexpected seek time or rotation wait time may be necessary, thereby hindering consecutive replay.

It is desired that the output of edited image is not interrupted by the user's operation to change the contents of the edition.

It is desired that data transfer from different HDs are synchronized and the difference in transfer speed between the HDs are adjusted by applying FIFO, when digital data are transferred from the storage unit for source HD to the video effects unit.

Furthermore, the efficient use of transmission buses for transmitting data or instructions for the data transmission is desired.

Also, speed up and automation of the edition and simplification of the operation are desired.

In addition, cost reduction of the video editing system by reducing both the capacity of FIFO and the expansion of CPU is desired.

To use old analog image for video edition by converting into digital data is desired.

To apply video effects to long hour videos such as movies is desired.

To edit audio information such as radio programs is desired.

SUMMARY OF THE INVENTION

In view of the foregoing conventional defects and desires, the object of this invention is to provide a high-speed, easily operable, inexpensive, general-purpose non-linear video editing system with the use of image data stored in a randomly accessible digital data storage device.

The above object can be achieved by a non-linear video editing system including the following units:

A source video storage unit for storing digital video data which are assigned unique storing position every predetermined amount and for outputting video data stored in desired storing position at desired time; an edition input operation unit for receiving the storing position of shots used for edition and time of the edition through an input operation of an operator; a shot information storage unit for storing information on a start point and an end point of each of the shots and the time of the edition; an edition contents storing unit for storing contents of an edition to be applied to the shots; a FIFO for temporarily storing inputted video data; a video data transfer unit for reading the shots, based on the information stored in the shot information storage unit, for dividing the read shots into blocks, and for transferring the blocks to the FIFO one by one; a video edition unit for applying an edition to the video data sent from the FIFO, based on the storing contents stored in the edition contents storing unit and the information stored in the shot information storage unit; and a data transfer control unit for controlling the shot reading performed by the video data transfer unit, the data transfer control unit comprising a threshold frame number memory, a block transfer request unit, a block transfer start/end frames storage unit, a transfer parameter calculation unit, and a designated transfer frame number memory. The threshold frame number memory stores a threshold of frames for a next transfer request to the FIFO, the threshold being set to prevent the FIFO from having no frames before receiving blocks based on the block transfer request. The block transfer request unit requests the transfer parameter calculation unit to transfer next blocks when the number of frames in the FIFO becomes below the threshold. The designated transfer frame number memory stores a designation transfer frame number, which is the number of frames composing a block, when the data transfer unit transfers blocks in response to the block transfer request, the designation transfer frame number being set to make the number of frames in the FIFO above the threshold when the next blocks are sent in response to the block transfer request. The block transfer start/end frames storage unit stores, as an initial value, the start point and the end point of each of the shots stored in the shot information storage unit and for storing a start point of a next block by one of adding and subtracting the number of transferred frames to and from a start frame number in a last transfer every time a start of a block transfer is informed. The transfer parameter calculation unit finds a start frame position and an end frame position of a block transfer in the block transfer start/end frames storage unit, the start frame position and the end frame position correspond to the shot requested block transfer start, thereby judging by calculation whether the number of frames between the positions is above a predetermined multiple of the designated transfer frame number, if the number is judged to be above the predetermined multiple, directs the data transfer unit to transfer the number of frames stored in the designated transfer frame number memory, and if the number is judged to be below the predetermined multiple, directs the data transfer unit to transfer blocks for the number of times determined by the predetermined multiple, the number of frames composing each of the blocks being determined by a function between the threshold frame number and the predetermined multiple.

The transfer parameter calculation unit may set the predetermined multiple to 1.5.

The transfer parameter calculation unit may make each block have frames which are determined by a function between the threshold frame number and the predetermined multiple, and set the number of transfer times to either 1 or 2.

The data transfer control unit may further include the following units:

A data transfer speed detection unit for finding an average of data transfer time by repeatedly transferring a great amount of data and then dividing a time needed for the transfer by transferred data, thereby finding a slowest data transfer speed; a rotation wait detection unit for finding an average rotation wait time by repeating to transfer a small amount of consecutive data and then subtracting clear transfer time from an entire time spent for the transfer operation and for further finding a longest rotation wait time by doubling the average rotation wait time; a longest seek time detection unit for first repeating to transfer a small amount of consecutive data in order to find a time needed for each of the repeated transfer and finding a value greater than the predetermined multiple, based on a value expected from the average transfer speed found by the data transfer speed detection unit and the average rotation wait time found by the rotation wait detection unit, thereby detecting a storing area having a non-consecutive sector, and further detecting a longest seek time; and a threshold frame calculation unit for finding a threshold from the longest data transfer speed, the longest rotation wait time, and the longest seek time, thereby either storing the found threshold to the threshold frame number memory, or determining a capacity of the FIFO.

The data transfer control unit may further include the following units:

A following shot detection unit for detecting whether each of the shots stored in the shot information storage unit is followed by another shot to be edited; a between-shots frame number calculation unit for, when the other shot is detected, finding the number of frames corresponding to a time needed after a termination frame in a preceding shot has been edited until a start frame in a following shot has been edited; and a between-shots fill-up unit for either extending a termination frame position of a preceding shot backwards or extending a start frame position of a following shot forwards, thereby adding frames between the preceding and following shots, the number of frames to be added being found by the between-shots frame number calculation unit, the between-shots fill-up unit further allowing the FIFO to read all the frames composing the preceding and following shots and the frames added therebetween, and prohibiting the video edition unit to output the added frames as frames to be edited.

The data transfer control unit may further include the following units:

A command FIFO for directing the data transfer unit for transferring a block which is composed of a predetermined number of frames and which starts from a frame position found by the transfer parameter calculator unit, in response to a block transfer request from the block transfer request unit, the command FIFO storing a command for the transfer; a threshold command number memory for storing a threshold command number determined by a time needed for a CPU to process a special operation of an operator, the number of frames outputted from the FIFO during the time, and the threshold frame number; a command transfer request unit for detecting the command number in the command FIFO when the command number becomes below the threshold stored in the threshold command number memory; and a transfer command parameter calculation unit for comparing, in response to a direction from the command transfer request unit, the number of frames determined by multiplying a command number of a predetermined number of times by a predetermined transfer frame number, with the number of frames which are not transferred yet, for inputting the command number of the predetermined number of times to the command FIFO when the former number in the comparison is larger, and for generating a block transfer command array composed of the number of blocks needed to transfer all the remaining frames, thereby inputting the generated block transfer command array to the command FIFO. The transfer command parameter calculation unit further finds a start frame which is supposed to be positioned first in a next block transfer, after each block transfer, and stores the found start frame to the block transfer start/end frames storage unit and the command FIFO.

The data transfer control unit may further include a threshold command number calculation unit for finding a threshold command number from the lowest data transfer speed, the longest rotation wait time, the longest seek time, the time needed for the CPU to process the special operation of the operator, the number of frames outputted from the FIFO during the time, and the threshold frame number, and for storing the found threshold command number to the threshold command number memory.

The data transfer control unit may further include the following units:

A defective area detection unit for detecting a defective area in the source video storage unit, based of information on the longest seek time sent from the longest seek time detection unit; and a spare frame storage unit for comparing the defective area and the information on a start point and an end point of each shot stored in the shot information storage unit and for, if ann shot to be edited exists in the defective area, making at least one of the block transfer request unit, threshold frame number calculation unit, and threshold command number calculation unit have a spare frame in the FIFO for a data transfer preceding to the transfer of the frame existing in the defective area.

The above object can be also achieved by another non-linear video editing system including a number of source video storage units and the above-mentioned other components provided for each of the source video units.

The above object can be also achieved by further another non-linear video editing system including a number of FIFOs and the above-mentioned other components provided for each of the FIFOs.

The above object can be also achieved by a still further another non-linear video editing system including a number of source video storage units and FIFOs, and the above-mentioned other components provided for each of the source video storage units and FIFOs.

The above object can be also achieved by a still further another non-linear video editing system including a number of source video storage units to store divided image data, and a unit for processing the divided image data in the same manner as non-divided image data and a unit for synthesizing the divided image data.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2A shows how shots on the source tape are rearranged on a new tape.

FIG. 2B shows the contents of shot information.

FIG. 5B shows shot information stored in a shot information memory.

FIG. 5C shows shot effects information.

FIG. 8 shows the contents of the storage unit 73 for source HD of the apparatus shown in FIG. 7.

FIG. 9 shows the contents of AC channel shot link information memory.

FIG. 10 shows the contents of BC channel shot link information memory.

FIG. 11 shows the contents of the video effects information memory.

FIG. 18 is a table showing block start frame Nos. and block termination frame Nos. in each of 29 block transfer request signals, obtained from the transfer parameter calculator unit 1210.

FIG. 22 shows information on a parent screen produced by the FIFO (AC)1221.

FIG. 23 shows information on a child screen produced by the FIFO (BC)1222.

FIG. 24 shows the output of block start frames and block termination frames from the FIFO(BC) 1222.

FIG. 31B shows the shot link information memory 1208 further including HD identification Nos.

FIG. 32 shows a block diagram of the video editing apparatus of Embodiment 6.

FIG. 33A shows shot link information for AC channel of Embodiment 6.

FIG. 33B shows shot link information for BC channel of Embodiment 6.

FIG. 35 shows information on command transfer request.

FIG. 36 shows the timing of CPU of Embodiment 1, where block transfer request occurs in the 7th and 15th frames.

FIG. 37 shows the contents of the operational timing of the CPU in 55th frame from the replay start.

FIG. 39 shows information on command transfer request.

FIG. 42 shows shot replay information stored in the shot link information memory of Embodiment 13.

FIG. 43 is a table showing video effects information stored in the video effects information memory of Embodiment 13.

FIG. 51 shows the contents of the shot replay information of Embodiment 14.

DESCRIPTION OF THE PREFERRED EMBODIMENTS

<EMBODIMENT 1>

This embodiment is described with reference to FIGS. 12–19.

Figure 12:
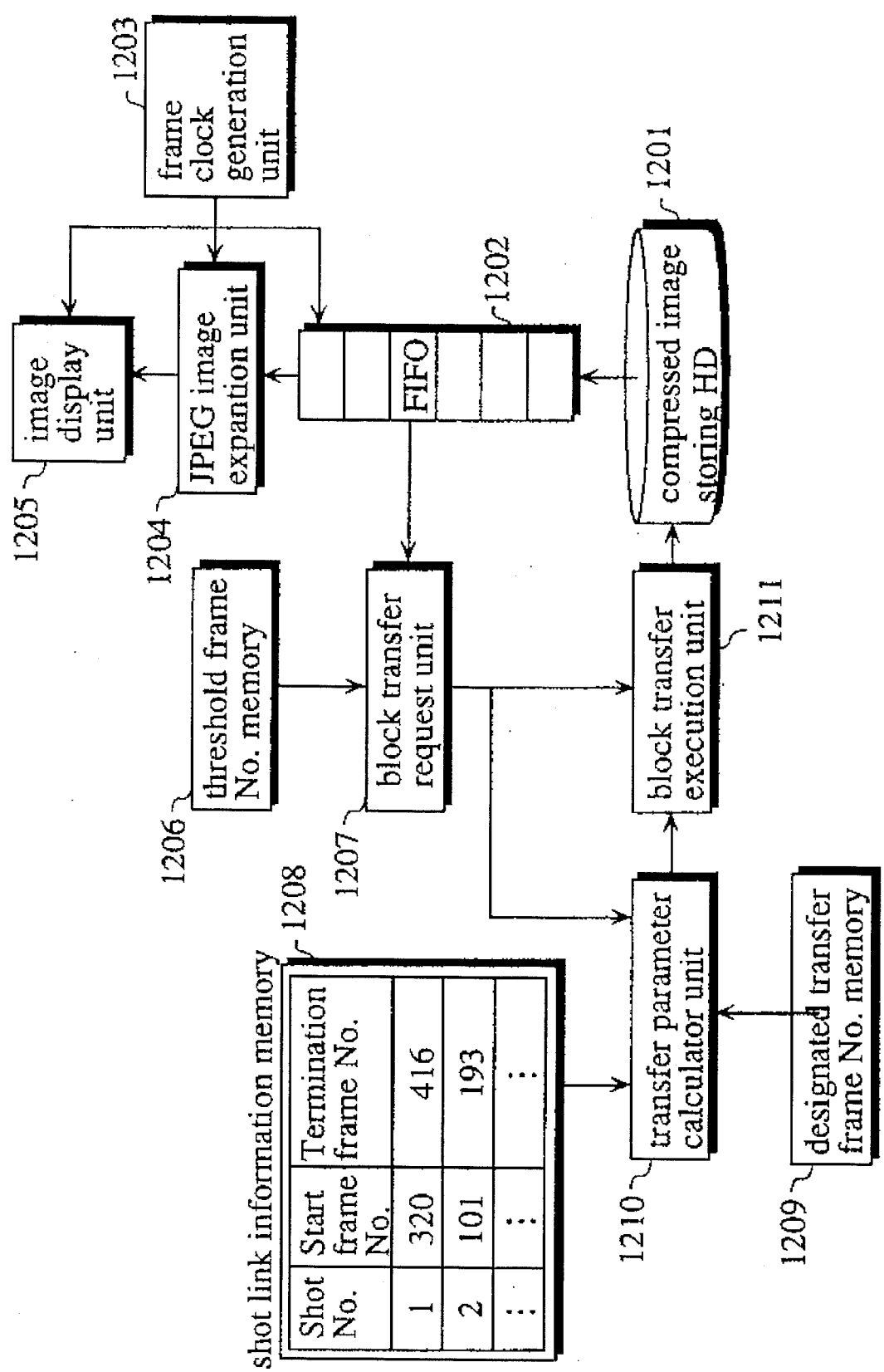
FIG. 12 shows the construction of the video editing apparatus of Embodiment 1.

FIG. 12 shows a block diagram of the non-linear video editing system of this embodiment. The system includes a compressed image storing HD 1201, a compressed image FIFO 1202, a frame clock generation unit 1203, a JPEG (JOINT PHOTOGRAPHIC EXPERTS GROUP) image expansion unit 1204, an image display unit 1205, a threshold frame No. memory 1206, a block transfer request unit 1207, a shot link information memory 1208, a designated transfer frame No. memory 1209, a transfer parameter calculator unit 1210, and a block transfer execution unit 1211.

Figure 1:
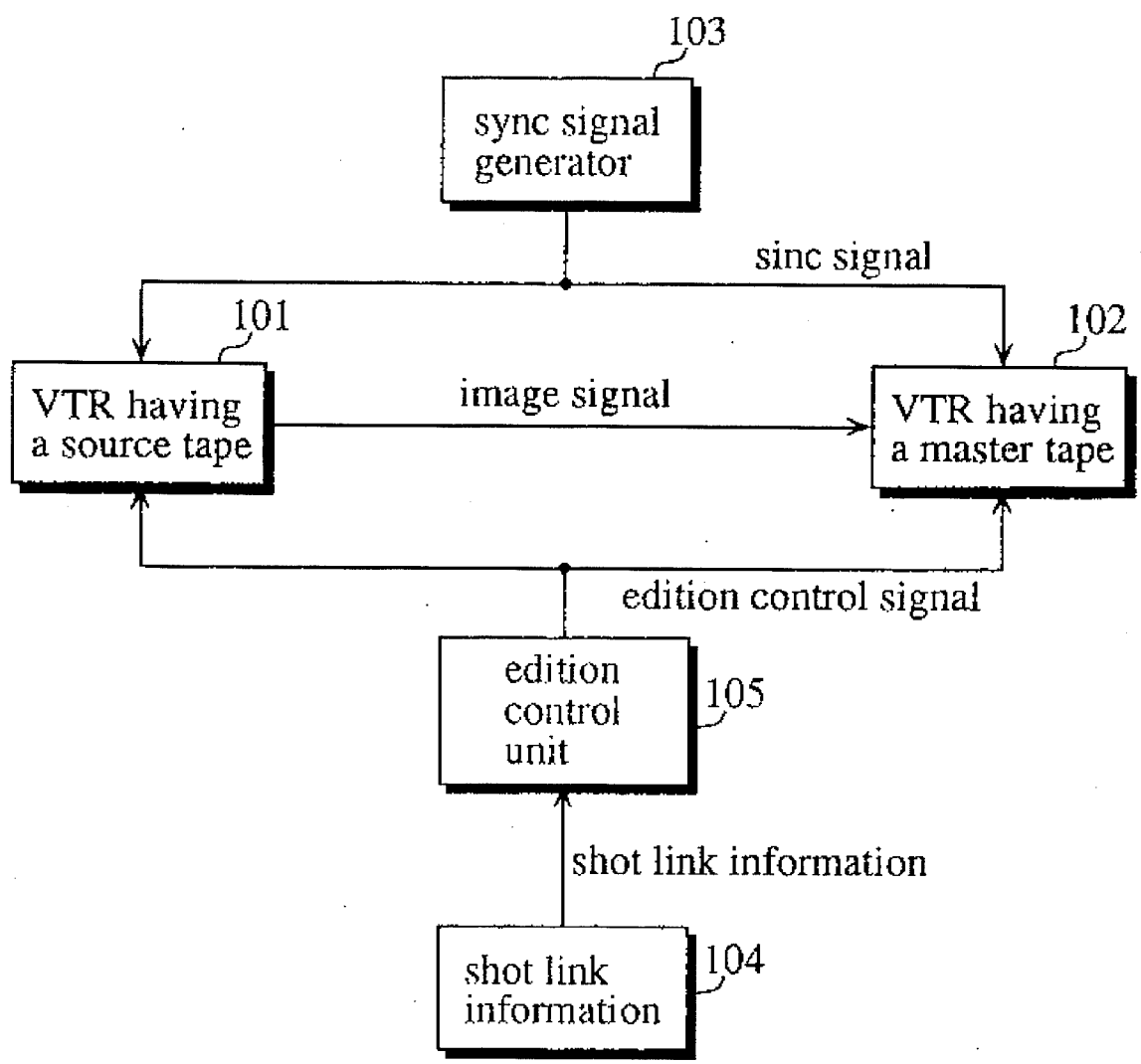
FIG. 1 shows a block diagram of a conventional image editing apparatus provided with a VTR for a source tape.
Figure 3A:
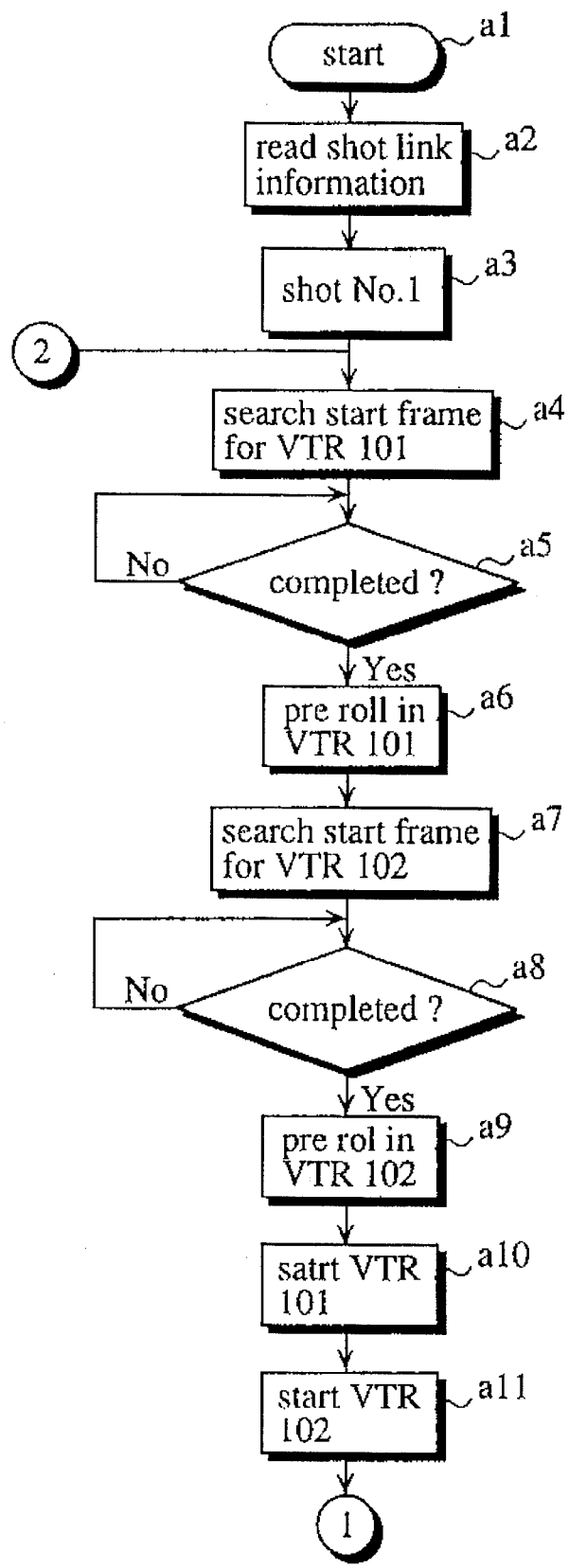
FIGS. 3A and 3B show a flowchart depicting a series of operations of an edition control unit 105 of the image editing apparatus.
Figure 3B:
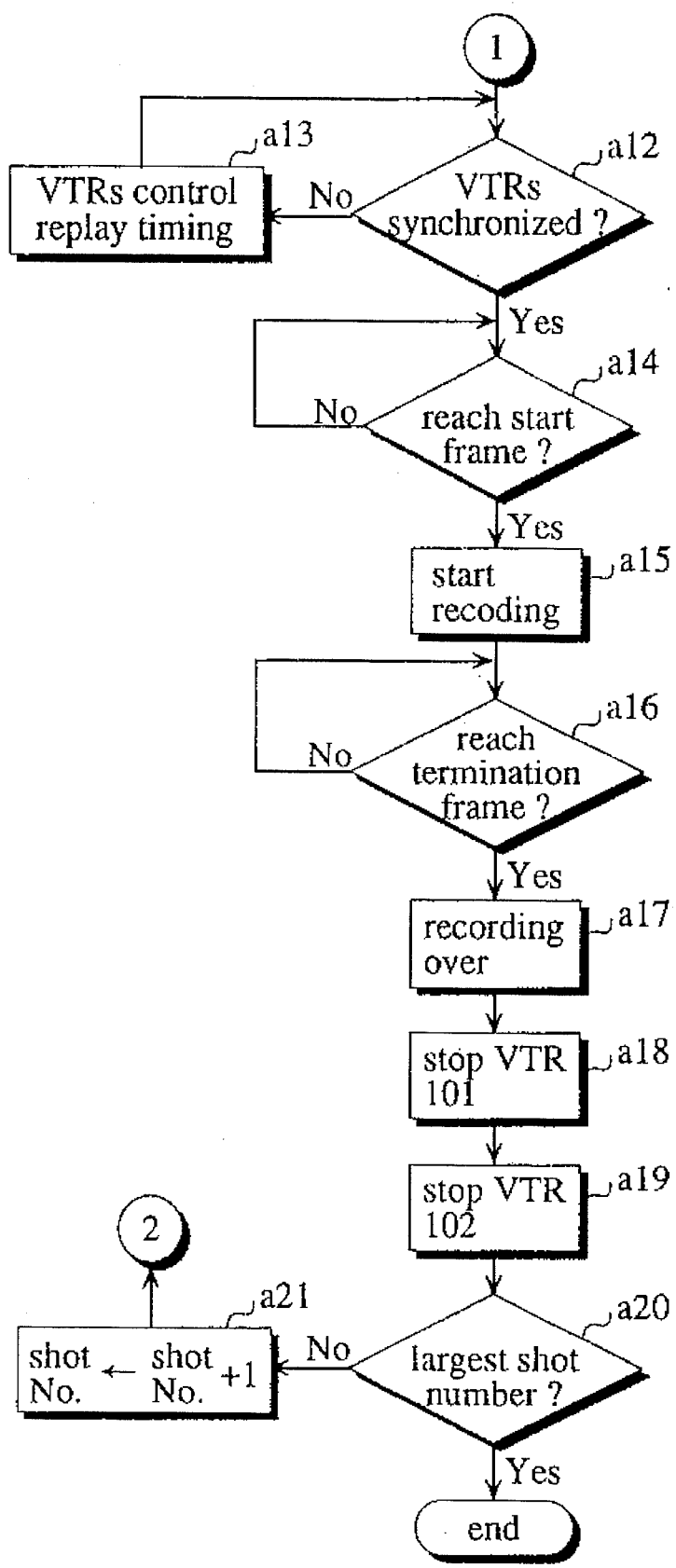
Figure 7:
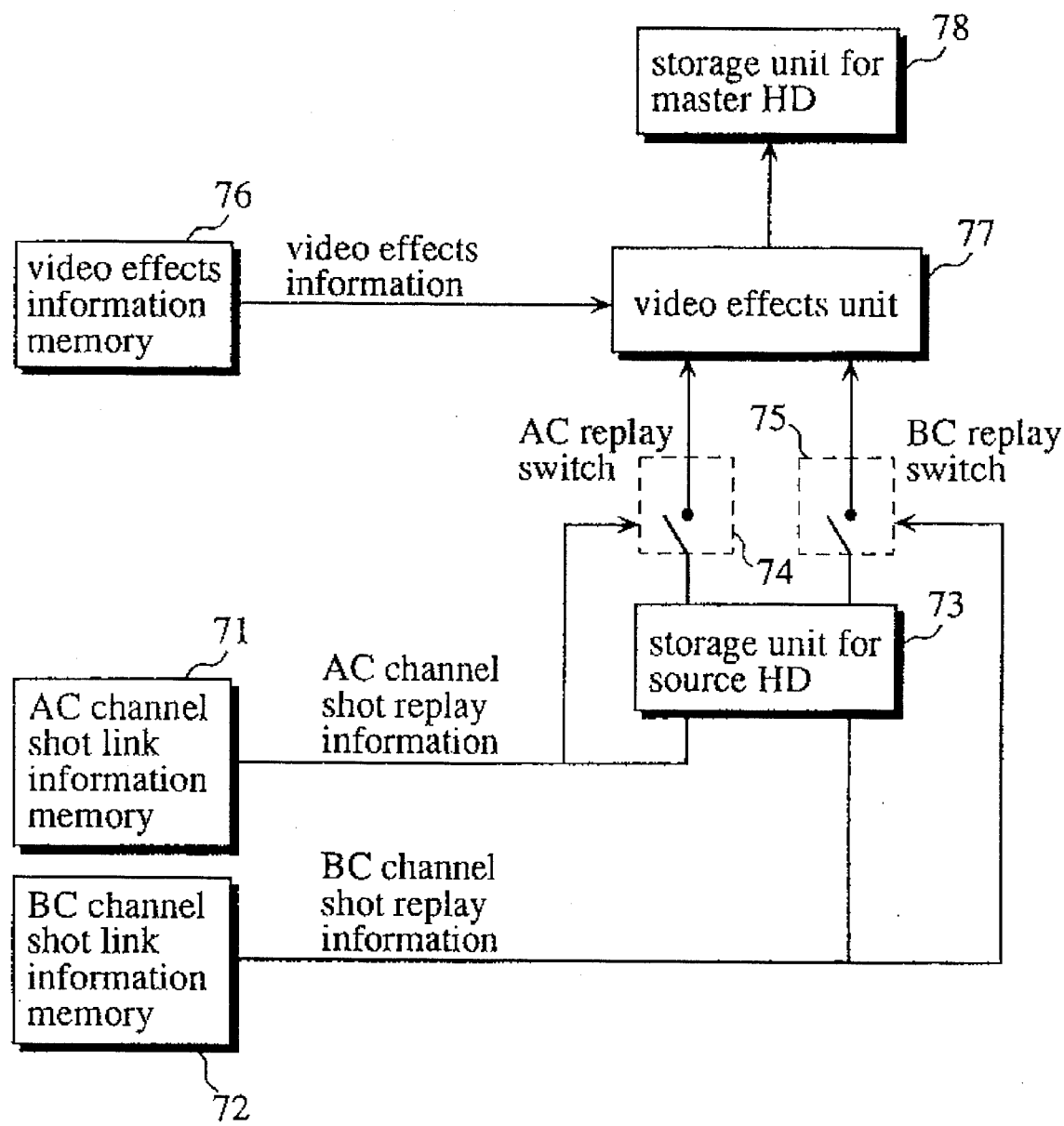
FIG. 7 shows a block diagram of a conventional video editing apparatus using digitalized image data.

The compressed image storing HD 1201 corresponds to the VTR 101 having a source tape shown in FIG. 1 or the storage unit 73 for source HD shown in FIG. 7. The frame clock generation unit 1203 corresponds to the sync signal generation unit 103 shown in FIG. 1. The threshold frame No. memory 1206, the block transfer request unit 1207, the designated transfer frame No. memory 1209, the transfer parameter calculator unit 1210, and the block transfer execution unit 1211 correspond to the edition control unit 105 shown in FIG. 1 or the AC replay switch 74 shown in FIG. 7. The compressed image FIFO 1202, the JPEG image expansion unit 1204, and the image display unit 1205 correspond to the VTR 102 for master tape shown in FIG. 1 or the storage unit 78 for a master HD in FIG. 7. Needless to say, the image display unit 1205 includes a storage unit for master HD to ease users' editing operation. The description for the other components such as a keyboard and switches irrelevant to the present invention are omitted.

Figure 13:
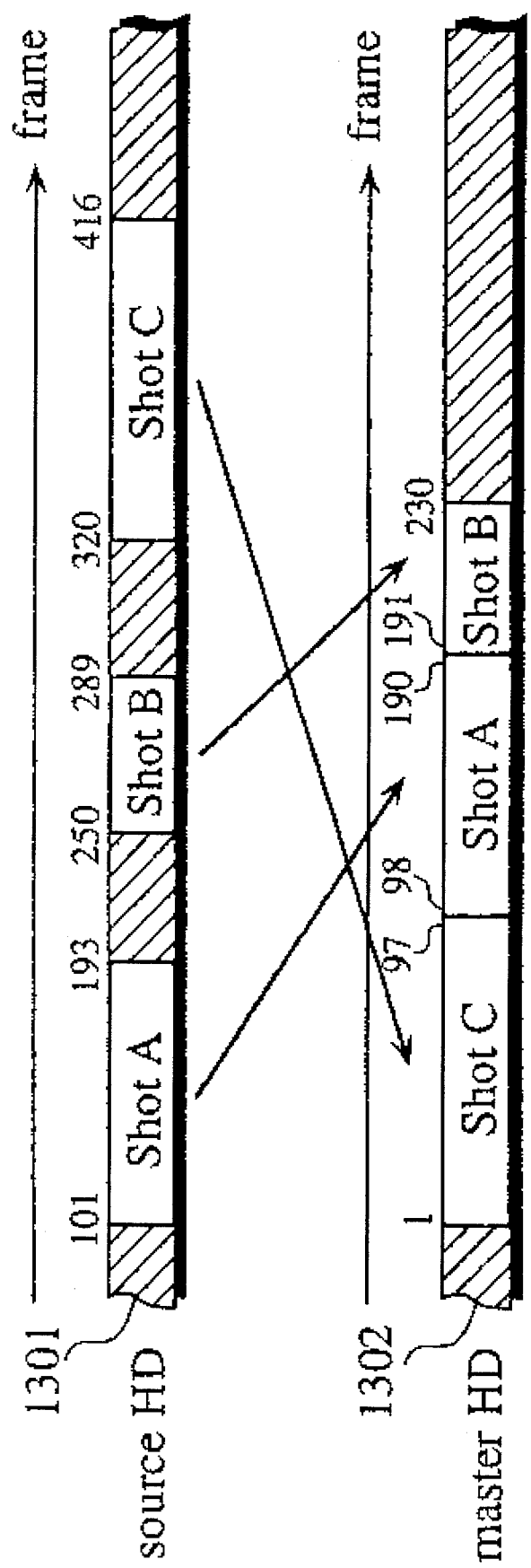
FIG. 13 shows the video editing operation of Embodiment 1.

FIG. 13 shows a source HD 1301 having Shots A, B and C corresponding to frames 101–193, 250–289, and 320–416 respectively, and a master HD 1302 on which Shots C, A, and B are recorded to correspond to frames 1–97, 98–190, and 191–230 respectively. As a result, on the master HD 1302, Shot C is replayed first and followed by Shots A and B. Thus, the contents shown in FIG. 13 is the same as that shown in FIG. 2.

The video edition shown in FIG. 13 is obtained by the following operations.

Figure 14:
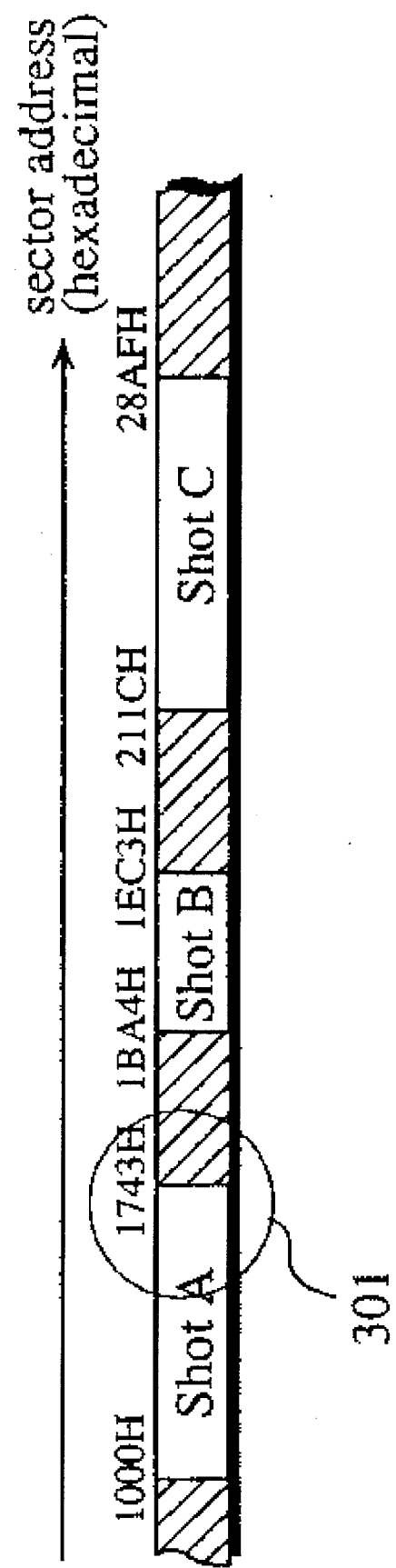
FIG. 14 shows the contents of the compressed image data storing HD.

The compressed image storing HD 1201 holds images compressed per frame in accordance with the image compression/expansion system described in "Draft (Revision 6) of the JPEG algorithm" (ISO/IEC JTC1/SC2/WG8 and CCITT SGVIII, Jun. 24, 1990). As shown in FIG. 14, the compressed image storing HD 1201 includes Shots A, B, and C, which are compressed to 10K ($K=2^{10}=1214$) byte per frame. The HD 1201 can be accessed per sector, which is assigned a unique address for random access.

Figure 15:
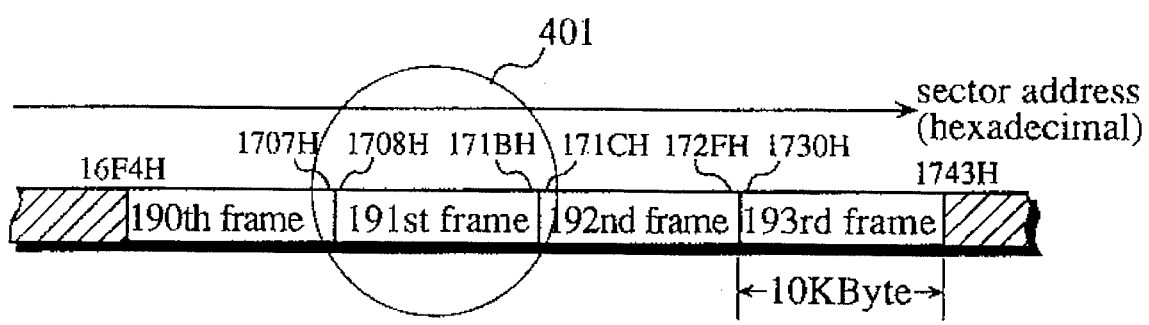
FIG. 15 shows an enlarged area of the contents shown in FIG. 14.
Figure 16:
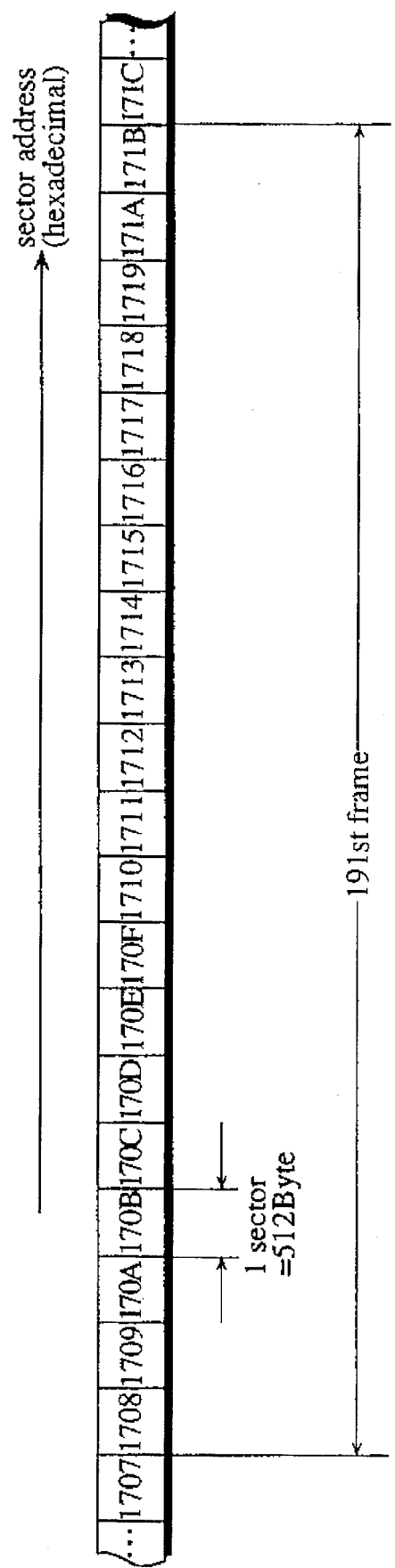
FIG. 16 shows an enlarged area of the contents shown in FIG. 15.

When Shot A is stored between 1000H–1743H (Hexadecimal) sector, Shot B and Shot C are stored between 1BA4H–1EC3H sector and between 211CH–28AFH sector respectively. The area 301 in FIG. 14 is magnified in FIG. 15 where data stored in the 190th–193rd frames corresponding to the rear-end of Shot A are shown. The area 401 in FIG. 15 is magnified in FIG. 16, which shows the 191st frame consisting of 20 sectors of 1708–171BH, each sector having a capacity of 512 byte. (a sector has a capacity of 512 byte, which means that one frame consists of 20 sectors.) Given a block transfer command having the start and termination sectors of a block as parameters, the readout unit in the HD 1201 executes random access to the start sector, thereby transferring consecutive 20 sectors as a transfer unit.

In the case of the HD 1201, it takes at worst 33 msec. corresponding to an entire frame replay time both to access a designated sector and to transfer 80 KByte compressed images corresponding to 8 frames.

Back to FIG. 12, the compressed image FIFO 1202 temporarily holds data transferred in blocks from the compressed image storing HD 1201, and is specifically Dual Port Random Access Memory.

The frame clock generation unit 1203 generates a 30 Hz frame clock to form NTSC images.

The compressed image FIFO 1202 outputs a frame or 10 KByte compressed images to the JPEG image expansion unit 1204 in synchronization with the frame clock.

The JPEG image expansion unit 1204 expands compressed images for one frame sent from the FIFO 1202 by JPEG. The image display unit 1205 displays the images thus expanded.

As explained hereinabove, the compressed images in the HD 1201 is sent to the FIFO 1202 and further sent to the JPEG image expansion unit 1204 in synchronization with the frame clock. The expanded images are sent to the image display unit 1205 where they are displayed as motion pictures. These operations are the same as those in the conventional systems.

This embodiment is characterized by the following constructions and effects.

The threshold frame No. memory 1206 keeps a value "3" as a predetermined value.

The block transfer request unit 1207 issues a signal for requesting a block transfer, when the frame No. in the FIFO 1202 becomes less than the threshold, that is, less than 3 frames.

The shot link information memory 1208 holds information on rearranging shots contained in the source HD 1201. The contents of the information to be stored by the user are the same as those shown in FIG. 2B.

The designated transfer frame No. memory 1209 holds a value "8" as a predetermined value in this embodiment.

Receiving the block transfer request signal, the transfer parameter calculator unit 1210 obtains the value "8" from the designated transfer frame No. memory 1209 and shot link information from the shot link information memory 1208, thereby outputting a start frame No. and a termination frame number of a block to be transferred, which are respectively converted into a block start sector and a block termination sector by the block transfer execution unit 1211.

The block transfer execution unit 1211 finds a block start sector and a block termination sector respectively from a block start frame No. and a block termination frame No. by applying the following equations:

block start sector=(block start frame No.–101)*20+1000H block termination sector=(block termination frame No.–100)*20+ FFFH The block transfer execution unit 1211 transfers compressed images between the block start and termination sectors in the HD 1201 to the FIFO 1202 in the form of blocks.

Figure 17:
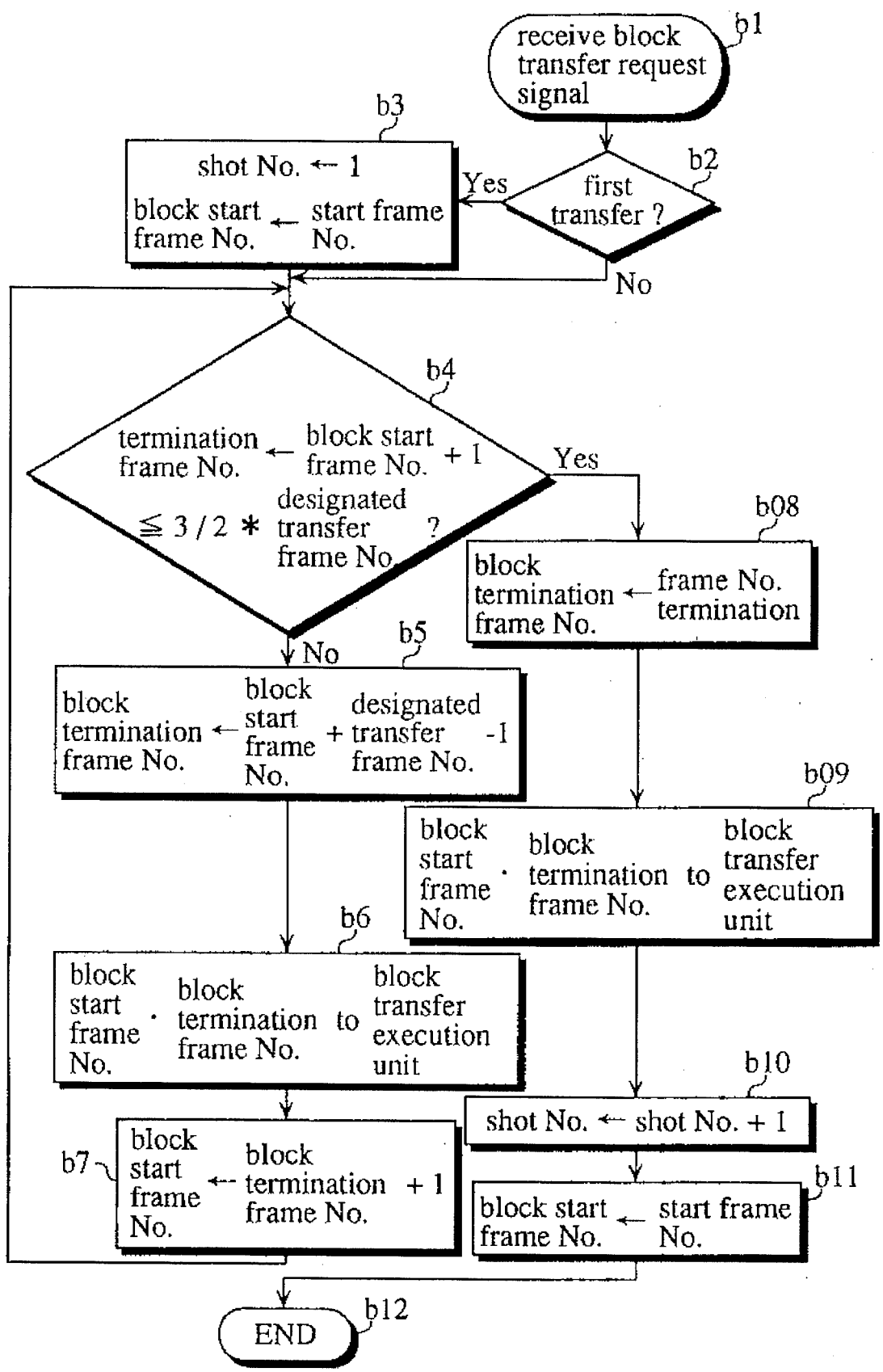
FIG. 17 shows a flowchart depicting a series of operations of the transfer parameter calculator unit 1210.

FIG. 17 shows a flowchart depicting a series of operations of the transfer parameter calculator unit 1210, as described below, for finding a block start frame and a block termination frame.

(b1) When the non-linear video editing system starts to replay, the FIFO 1202 has no data. Therefore, the block transfer request unit 1207 sends a first block transfer request signal to the transfer parameter calculator unit 1210, which is ready to receive the signal.

(b2) It is judged whether the block transfer is the first or not.

(b3) If it is the first block transfer, then the Shot No. is initialized to "1", and the block start frame No. is set to 320, which is the start frame No., based on the shot link information shown in FIG. 2B.

(b4) The value "320", the block start frame No. for Shot 1 is subtracted from the value "416", the termination frame No. for Shot 1 and then "1" is added thereto. Then, it is judged whether the result is smaller than 12, which corresponds to 3/2 of the threshold value "8".

(b5) The obtained value is 97, which is greater than 12, so that the value 327, which is obtained by adding the designated transfer frame No."8" to the block start frame No. "320" and subtracting "1" therefrom is made the block frame termination No.

(b6) The block start frame No. 320 and the block termination frame No. 327 are outputted to the block transfer execution unit 1211.

(b7) To prepare for the next block transfer request signal, the block start frame No. is updated to "328", and returns to Step (b4). As a result of having repeated these operations, the block start frame No. is supposed to become "408" when the 12th block transfer request signal is sent. Subtracting 408 from and adding 1 to the termination frame No. for Shot 1 results in 9, which is smaller than 12.

(b8) According to the judgement of Step (b4), the block termination frame No. is set to 416, which corresponds to the shot termination frame No.

(b9) The block start frame No. 408 and the block termination frame No. 416 are outputted to the block transfer execution unit 1211.

(b10) The shot No. is incremented by one.

(b11) The block start frame No. is set to 101, which corresponds to the start frame number for Shot No. 2.

(b12) The process for Shot No. 1 in the transfer parameter calculator unit 1210 is terminated.

FIG. 18 is a table showing block start frame Nos. and block termination frame Nos. in each of 29 block transfer request signals, obtained from the transfer parameter calculator unit 1210.

The process in the transfer parameter calculator unit 1210, which is performed with the use of high-speed CPU and memory, is as fast as can be ignored, compared with access time or transfer time in the HD 1201.

Figure 19:
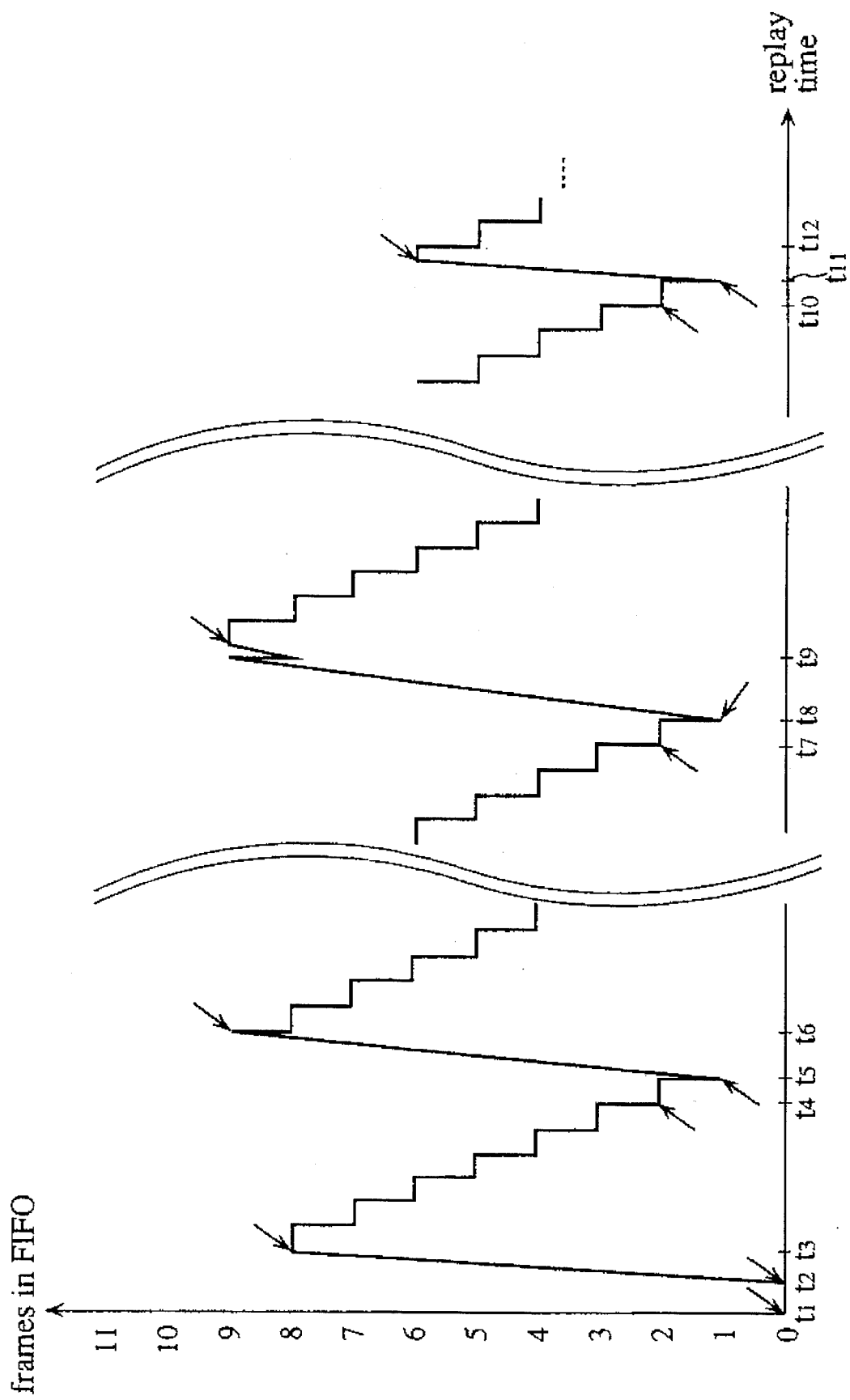
FIG. 19 shows the transition of the number of frames stored in the FIFO 1202.

FIG. 19 shows the transition of the number of frames stored in the FIFO 1202 according to this embodiment. The transition is described as follows.

(t1) The start of replay is directed.

(t2) The FIFO 1202 is vacant, so that the transfer parameter calculator unit 1210 is directed to calculate the frame number of blocks (b4) for block transfer, and based on the direction, random access to the sector corresponding to the block start frame No. is executed within a time for replaying at worst a frame.

(t3) After that, it takes a time for replaying at worst a frame to transfer compressed image data for 8 frames to the FIFO 1202. As a result, the FIFO 1202 becomes full when a time corresponding to 2 frames has passed from (t1). Then, the frame clock generation unit 1203 is directed to generate a clock, and the compressed image data begin to be outputted from the FIFO 1202 to the JPEG image expansion unit 1204.

(t4) Since two frames are left in the FIFO 1202 when six frames are sent to the JPEG image expansion unit 1204, the block transfer request unit 1207 requests the next block transfer.

(t5) The parameter calculator unit 1210 again calculates transfer parameter. It takes at worst a time corresponding to a frame to access the block start sector.

(t6) Soon after the FIFO 1202 has received compressed image data for next 8 frames, the number of frames in the FIFO 1202 becomes 9, and then becomes 8 because one frame is transferred soon. The change in the number of frames is repeated while compressed image data for 8 frames is carried out.

(t7) The 12th block transfer request is issued.

(t8) The random access is completed.

(t9) The remaining frames for Shot 1 is 9, which is below 12. Therefore, the FIFO 1202 has compressed image data for 9 frames. Hereinafter, transfer of compressed image data for 8 frames is continued, repeating the change shown in (t3)–(t6).

(t10) The 24th block transfer request is issued.

(t11) The random access is completed.

(t12) The remaining frames for Shot 1 is 9, so that compressed image data for 5 frames are transferred, so that the number of remaining frames 1202 becomes 6 and then becomes 5. The number of remaining frames in FIFO 1202 never become 0, though the time between the 24th and 25th block transfer request becomes shorter.

As explained above, the transfer of compressed image data from the FIFO 1202 to the JPEG image expansion unit 1204 is never interrupted. Therefore, it seems that the HD 1201 shown in FIG. 13 is replaying on the image display unit 1205. Thus, according to this embodiment, the user can watch edited video only by setting the contents of the shot link information memory 1208, without duplicating an original video.

As shown in FIG. 18, in the transfer parameter calculator unit 1210 of this embodiment, compressed image data are transferred in accordance with the number of the designated transfer frames except for the last transfer for each shot.

With respect to the last transfer for a shot which has longer than the designated transfer frames, there are following relations.

When the designated number of transfer frames is an even number, 3/2*designated transfer frames–0.5 to 1/2*designated transfer frames+1 are transferred.

When the designated number of transfer frames is an odd number, 3/2*designated transfer frames–0.5 to 1/2*designated transfer frames+0.5 are transferred.

In block transfer containing a termination frame, the numbers of frames to be transferred can be evenly between the largest and the smallest. In this embodiment, the average number of the block transfer containing a termination frame can be found by (the largest number of frames+the smallest number of frames/2). Therefore, when the designated number of transfer frames is an even number, the average number of the frames is the designated number of frames+ 0.5, and when the designated number of transfer frames is an odd number, the average number of the frames is the designated number itself.

As explained hereinbefore, according to this embodiment, compressed image data can be almost every time transferred in the designated number of frames even a termination frame. As a result, the size of the FIFO can be reduced and the interruption of the output from the FIFO can be avoided by continuous transfer of small number of frames.

<EMBODIMENT 2>

Figure 20:
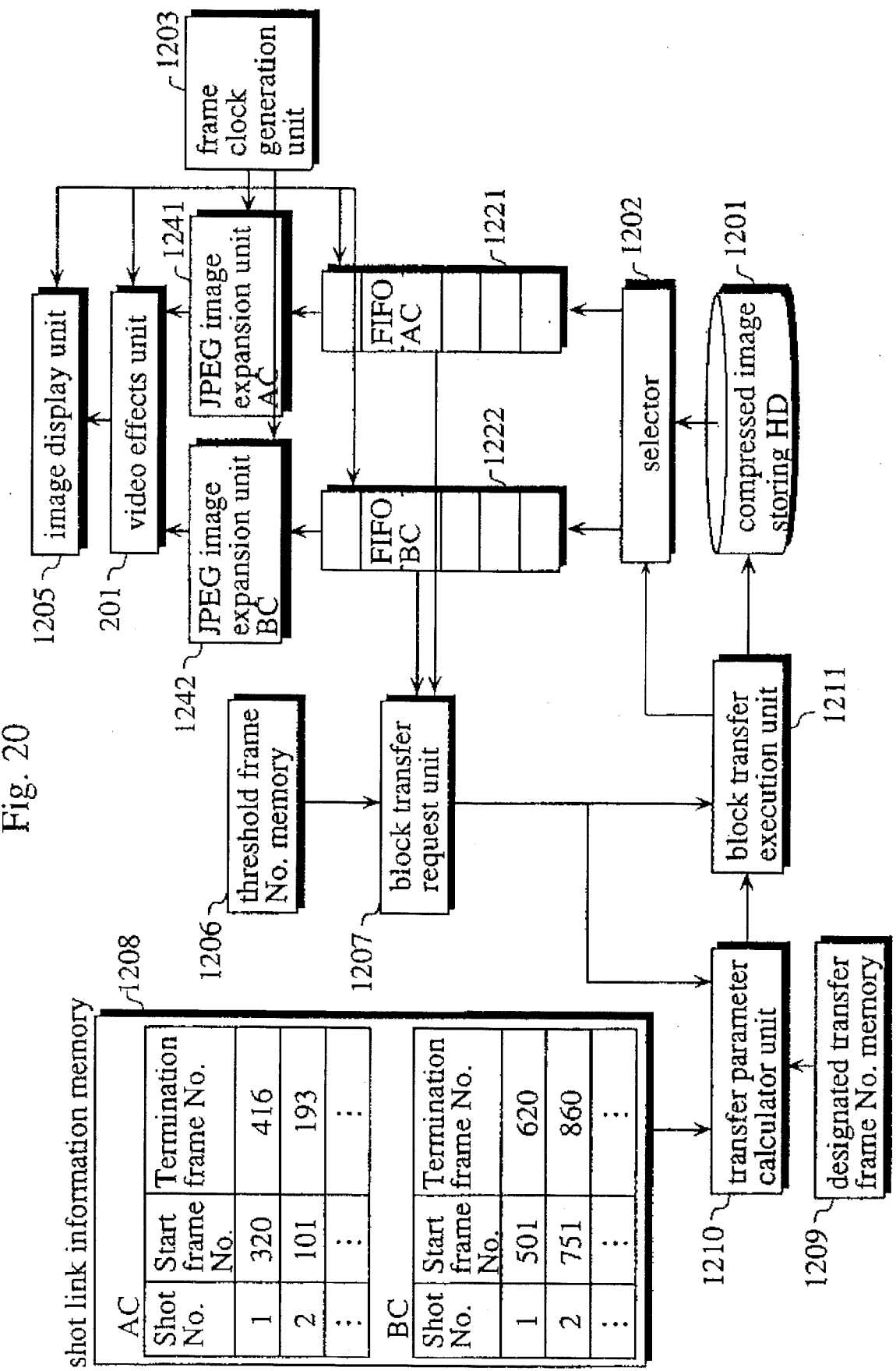
FIG. 20 shows a block diagram of the non-linear video editing system of Embodiment 2.

The non-linear video editing system of this embodiment is shown as a block diagram in FIG. 20. The construction of the system is the same as that of Embodiment 1 so that like components are labeled with like reference numerals with respect to Embodiment 1. In Embodiment 2, the compressed image data storage HD 1201 holds two channels, and additional components are provided therefor.

The components featuring this embodiment are a selector 1202, a compressed image FIFO(AC)1221 for AC channel, a compressed image FIFO(BC)1222 for BC channel, a JPEG image expansion unit 1241 for AC channel, a JPEG image expansion unit 1242 for BC channel, and a video effects unit 201. The selector 202 and the FIFOs 1221 and 1222, the JPEG image expansion units 1241 and 1242, and the video effects unit 201 have functions similar to the video effects units 1013 or 77 shown in FIGS. 4 and 7 respectively.

Figure 5A:
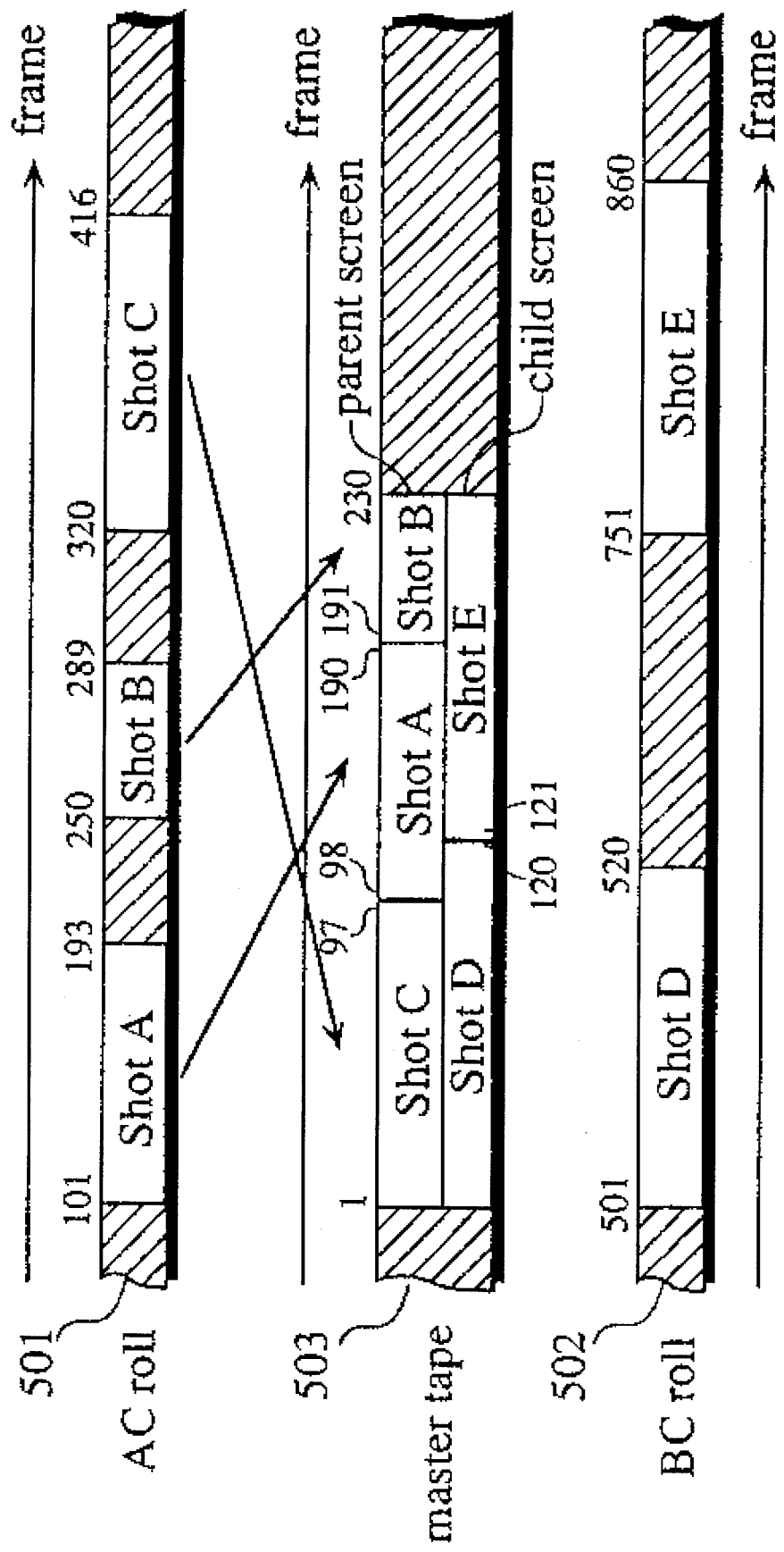
FIG. 5A shows how shots on each source tape are rearranged on a new tape when the "picture in picture" effects are applied by the image editing apparatus shown in FIG. 4.

The following is a description to explain how the same results as shown in FIG. 5A can be obtained.

Figure 21:
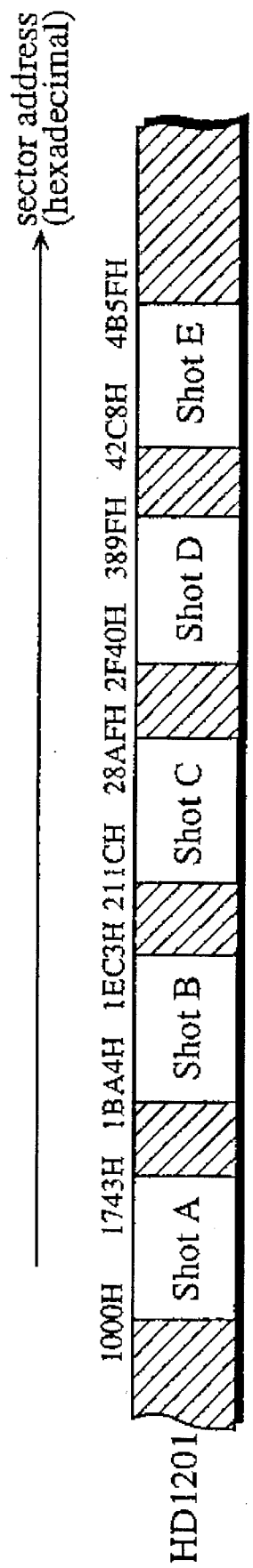
FIG. 21 shows the contents of the compressed image data storage HD of Embodiment 2.

As shown in FIG. 21, the HD 1201 holds image data on the AC and BC rolls 501 and 502, the data being compressed to 10 KByte per frame.

When Shot A is stored between 1000H–1743H sector, Shots B, C, D, and E are stored between 1BA4H–1EC3H sector, between 211CH–28AFH sector, between 2F40H–389FH sector, and 42C8H–4B5FH sector respectively.

Given a block transfer command having the start and termination sectors of a block as parameters, the readout unit in the HD 1201 executes random access to the start sector, thereby transferring the consecutive sectors.

The selector 1202 distributes data transferred from the HD 1201 between the FIFO (AC)1221 and the FIFO (BC) 1222, according to a FIFO selection signal, which will described below.

These FIFOs (AC)1221 and (BC)1222 temporarily hold compressed image data in blocks sent from the selector 1202.

The frame clock generation unit 1203 generates a 30 Hz frame clock to form NTSC images, the 30 Hz being in response to TV broadcast or CRT where data for 30 frames are displayed.

The FIFOs (AC)1221 and (BC)1222 output compressed image data for frame or 10 KByte in synchronization with the frame clock.

The compressed image data outputted from the FIFOs (AC)1221 and (BC)1222 are expanded in accordance with JPEG.

The image data outputted from the JPEG image expansion units (AC)1241 are synthesized into a parent screen and the image data outputted from the JPEG image expansion unit (BC)1242 are synthesized into a child screen by the video effects unit 201, thereby being outputted to the image display unit 1205 to be displayed as motion pictures.

In this embodiment, the threshold frame No. memory 1206 keeps a value "5" as a predetermined value.

The block transfer request unit 1207 issues a signal for requesting a block transfer for FIFO (AC)1221, when the frame No. in the FIFO (AC) 1221 becomes less than the threshold, that is, less than 3 frames. In the same manner, the block transfer request unit 1207 issues a signal for requesting a block transfer for FIFO (BC) 1222, when the frame No. in the FIFO(BC) 1222 becomes less than the threshold, that is, less than 3 frames. Whether a transfer request is for the FIFO (AC) 1221 or for the FIFO (BC) 1222 is determined by whether the voltage for the request signal is +5 V or –5 V. However, if the FIFOs (AC)1211 and (BC)1222 both have data for 3 frames or less, the FIFO (AC) 1211 has a priority. A block transfer request for one of the FIFOs (AC) 1211 and (BC)1222 is recognized when the other gets more frames than the threshold.

The shot link information memory 1208 holds information on rearranging shots contained in the source HD 1201. The contents of the information to be stored by the user are shown in FIG. 22 and 23. FIG. 22 shows information on a parent screen produced by the FIFO (AC)1211 and FIG. 23 shows information on a child screen produced by the FIFO (BC)1222.

The designated transfer frame No. memory 1209 keeps a value "8" as a predetermined value in this embodiment.

Receiving the block transfer request signal, the transfer parameter calculator unit 1210 checks whether the request is sent from the FIFO (AC)1211 or the FIFO (BC)1222 and then obtains the value "8" from the designated transfer frame No. memory 1209 and shot link information from the shot link information memory 1208, thereby outputting a start frame No. and a termination frame No. of a block to be transferred. In this embodiment, the transfer parameter calculator unit 1210 further outputs a FIFO selection signal. The FIFO selection signal indicates to select AC channel by +5 V voltage and to select BC channel by −5 V voltage.

The start frame No. and the termination frame No. outputted from the transfer parameter calculator unit 1210 are respectively converted into a block start sector and a block termination sector by the block transfer execution unit 1211, by applying the equations shown in Embodiment 1.

The block transfer execution unit 1211 transfers compressed image data between the block start and termination sectors in the HD 1201 to the FIFO 1202 in the form of blocks.

At the same time, the block transfer execution unit 1211 applies the FIFO selection signal with the selector 202, thereby transferring compressed image data to a respective FIFO 1201 and 1202. Then, the transfer parameter calculator unit 1210 calculates the block start frame and the block termination frame for each channel, based on the flowchart shown in FIG. 17. As compressed image data for AC channel, a block start frame and a block termination frame on the table shown in FIG. 18 are outputted according to the number of times of the transfer request. In the same manner, as compressed image data for BC channel, a block start frame and a block termination frame on the table shown in FIG. 24 are outputted according to the number of times of the transfer request.

Figure 25:
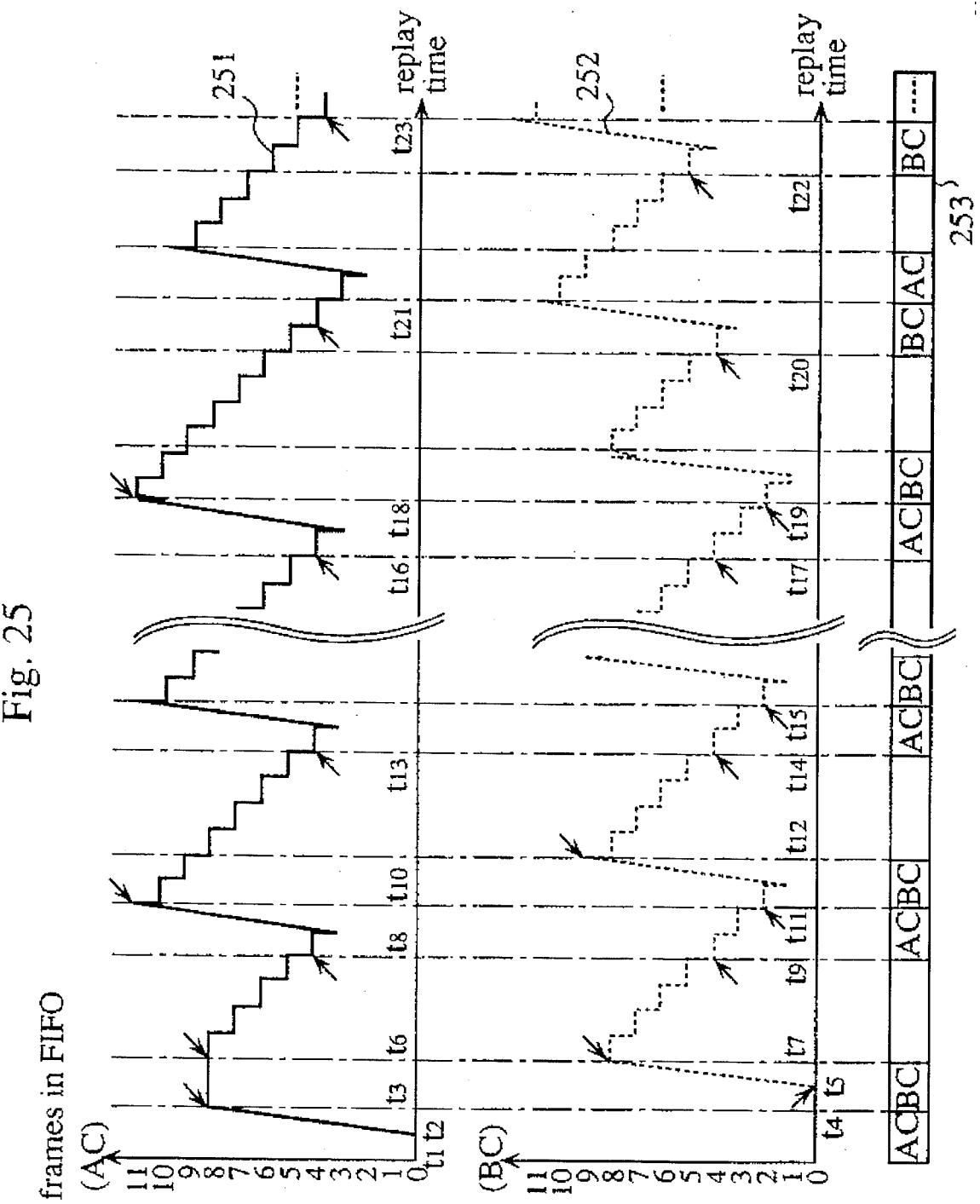
FIG. 25 is a graph showing the transition of the number of frames stored in the FIFOs (AC)1221 and (BC)1222.
Figure 26:
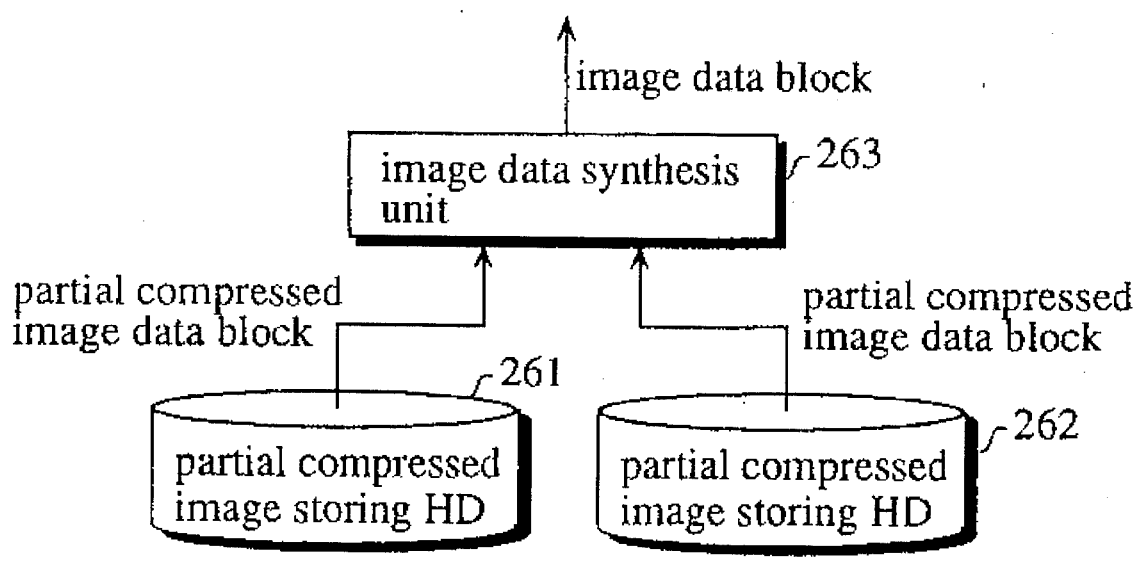
FIG. 26 shows a block diagram of the video editing apparatus of Embodiment 3.

FIG. 25 is a graph showing the transition of the number of frames stored in the FIFOs (AC)1211 and (BC)1222, which is indicated respectively by a full line 251 and a short-dashed line 252, and the transition of channels between AC and BC.

The transition is described as follows.

(t1) The start of replay is directed. The FIFOs (AC)1221 and (BC)1222 are both vacant so that they try to request a block transfer; however, the block transfer request unit 1207 issues the request to the FIFO (AC) 1221, which has a priority. The transfer parameter calculator unit 1210 directs the block transfer execution unit 1211 to transfer image data corresponding to 320–327 frames for the FIFO (AC) 1221. As a result, the FIFO (AC) 1221 is selected by the selector 202.

(t2) Random access to the HD 1201 is completed.

(t3) The transfer of image data for 8 frames is completed. Since the FIFO (AC) 1221 becomes full, the block transfer request unit 1207 issues a block transfer request signal to the FIFO (BC)1222. The transfer parameter calculator unit 1210 directs the block transfer execution unit 1211 to transfer image data corresponding to 501–508 frames for the FIFO (BC) 1222.

(t4) As a result, the FIFO (BC) 1222 is selected by the selector 1202.

(t5) Random access to the HD 1201 is completed.

(t6) The transfer of image data for 8 frames is completed.

(t7) The frame clock is directed to generate a clock, and the FIFOs (AC)1221 and (BC)1222 start to output compressed image data respectively to the JPEG image expansion units (AC)1241 and (BC) 1242.

(t8 and t9) The FIFOs (AC) 1211 and (BC)1222 both keep image data for 4 frames, which satisfied the requirement for the block transfer request. However, the block transfer request unit 1207 issues the request to the FIFO (AC) 1211, which has a priority. Therefore, the transfer parameter calculator unit 1210 directs the block transfer execution unit 1211 to transfer image data corresponding to 328–335 frames for the FIFO (AC) 1221. As a result, the FIFO (AC) 1221 is selected by the selector 202.

(t10) The transfer of image data for 8 frames is completed. Since the FIFO (AC) 1221 becomes full, the block transfer request unit 1207 issues a block transfer request signal to the FIFO (BC)1222. The transfer parameter calculator unit 1210 directs the block transfer execution unit 1211 to transfer image data corresponding to 509–516 frames for the FIFO (BC) 1222.

(t11) As a result, the FIFO (BC) 1222 is selected by the selector 202.

(t12) The transfer of image data for 8 frames is completed.

Hereinafter, transfer of compressed image data for 8 frames is continued, repeating the change shown in (t3)–(t12).

(t16) When the 12th block transfer request is issued to the FIFO (AC)1211, compressed image data for 9 frames are transferred.

(t18) There are compressed image data for 11 frames remained in the FIFO (AC)1221.

(t17) Prior to (t18), the FIFO (BC)1222 is ready to send the block transfer request.

(t19) However, the FIFO (BC) 1222 starts random access to the HD 1201 at this point. The FIFO (BC)1222 may output compressed image data for a frame to the JPEG image expansion unit (BC) 1242 before the block transfer is started. This may result in that data for only one frame is remained. However, there are data for 8 frames are left in the FIFO (BC) 1222 when the transfer is completed.

(t20) The FIFO (BC)1202 becomes ready to send the block transfer request earlier than the FIFO (AC)1221. The block transfer request unit 1207 issues a block transfer request signal to the FIFO (BC)1222.

(t21) The transfer of compressed image data to the FIFO (BC)1222 is completed and the transfer to the FIFO (AC)1221 is started.

The repetition of these operations can prevent the FIFOs (AC)1221 and (BC)1222 from being vacant. As a result, the transfer of compressed image data from the FIFOs 1221 and 1222 to the JPEG image expansion units 1241 and 1242 is never interrupted. Therefore, it seems that the HD 1201 shown in FIG. 13 is replaying on the image display unit 1205. Thus, according to this embodiment, the user can watch edited video only by setting the contents of the shot link information memory 1208, without duplicating an original video. In addition, images displayed on the image display unit 1205 can be recorded for sale or future use.

<EMBODIMENT 3>

The non-linear video editing system of this embodiment is constructed the same as that in Embodiment 1 except that the HD 1201 is replaced by two HDs 261 and 262, which can operate in parallel and a compressed image synthesis unit 263 is provided for synthesizing image data stored in these HDs 261 and 262. In Embodiment 3, image data for a frame are divided into odd-numbered scan lines and even-numbered scan lines, thereby being stored to the HD 261 and the HD 262 respectively. Each frame is divided into two partly because images are usually compressed per horizontal scan line and partly because CRTs for TV broadcast display odd-numbered scan lines followed by even-numbered scan lines to avoid flicker on a display. In order to form a frame, the images compressed per scan line may be assigned End of Line signal and another signal indicating whether the scan line is an odd numbered line or an even numbered line. Or, the compressed image synthesis unit 263 may be provided with a judging device for time sharing control.

Figure 27:
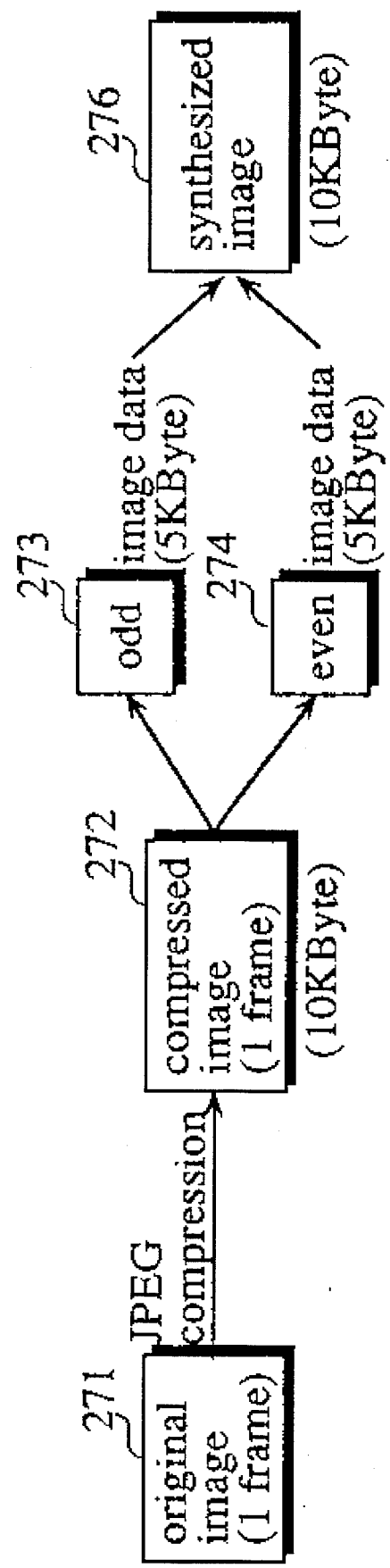
FIG. 27 shows the division and synthesis of compressed images.

The division and synthesis of compressed images are shown in FIG. 27.

An original image 271 is compressed in accordance with JPEG to become a compressed image 272 having 10 KByte per frame, The compressed image 272 is further divided into a partial compressed image 273 and a partial compressed image 274 each having 5 KByte. These partial compressed images 273 and 274 are stored in the HDs 261 and 262 respectively.

The compressed image synthesis unit 263 synthesizes these partial compressed images 273 and 274 into a synthesized image 275. The HDs 261 and 262 have the same random access performance as the HDs used Embodiments 1 and 2, which means it takes at worst one frame time to random access because of the half transfer performance, so that it takes at worst two frame time to transfer 80 KByte data.

Figure 28:
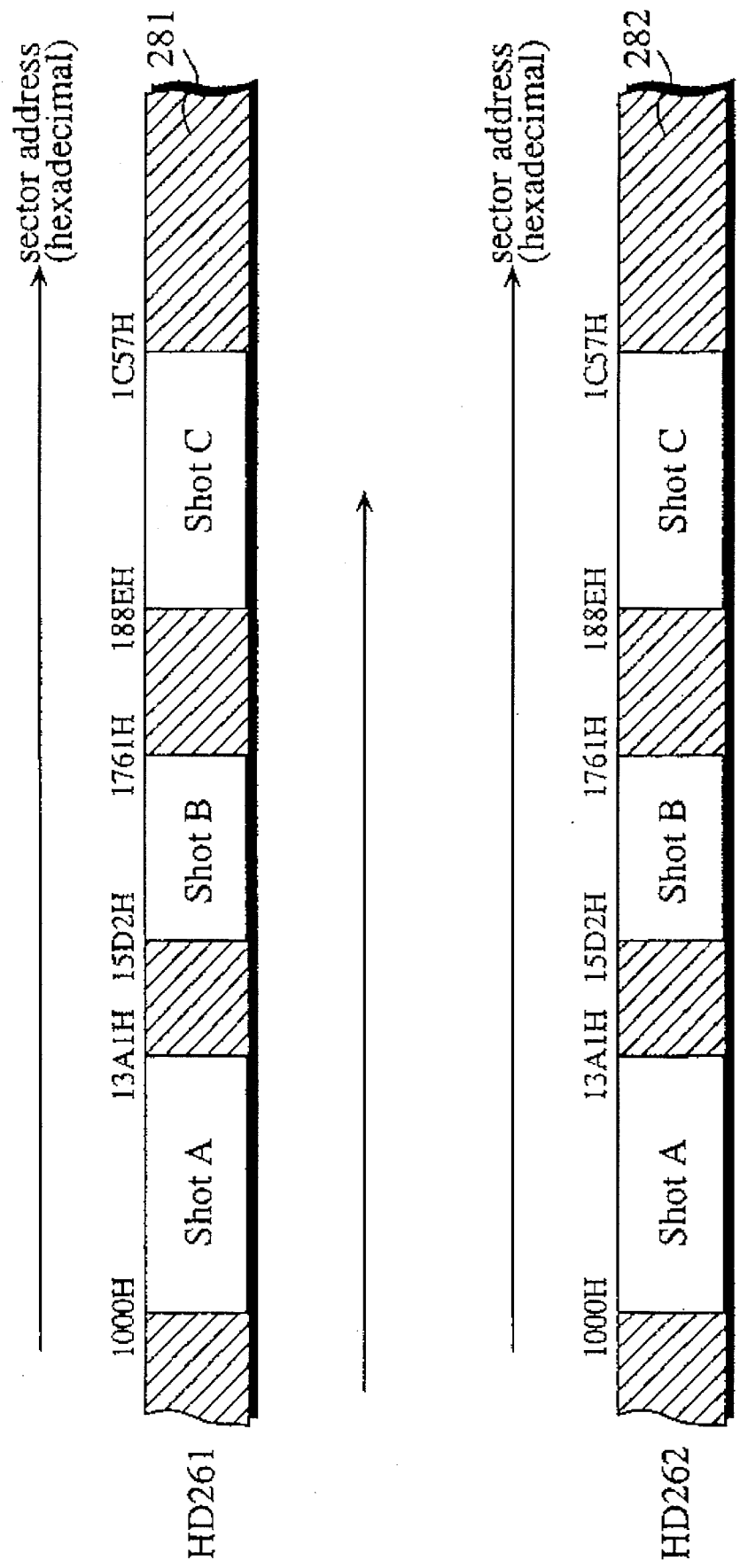
FIG. 28 shows partial compressed image data 281 and 282 respectively stored in the HDs 261 and 262 when the edition shown in FIG. 13 is performed.

FIG. 28 shows partial compressed image data 281 and 282 respectively stored in the HDs 261 and 262 when the edition shown in FIG. 13 is performed. In the HD 261, data corresponding to odd-numbered lines in Shot A are stored between 1000H–13A1H sector, data corresponding to odd-numbered lines in Shots B, and C are stored between 15D2H–1761H sector and between 188EH–1C57H sector respectively. In the same manner, in the HD 262, data corresponding to even-numbered lines in Shot A are stored between 1000H–13A1H sector, data corresponding to even-numbered lines in Shots B, and C are stored between 15D2H–1761H sector and between 188EH–1C57H sector respectively.

The block transfer execution unit 1211 of this embodiment finds a block start sector and a block termination sector by applying the following equations:

block start sector=(block start frame No.−101)*10+1000H block termination sector=(block termination frame No.−100)*10+ FFFH In this embodiment, as compressed data for 8 frames, partial compressed image data for 8 frames are transferred from each of the HDs 261 and 262. Since the partial compressed image data of 8 frames are 8*10/2=40 KByte, each transfer can manage with only one frame time. As a result, these partial compressed image data can be treated as data stored in a single HD.

Since two HDs are provided in this embodiment, it is possible to use HDs which are inferior in their performance to those used in Embodiments 1 and 2.

To provide a video effects unit with excellent performance allows the display of less compressed images which are close to analog data images as stored in films or tapes.

<EMBODIMENT 4>

The non-linear video editing system of this embodiment is constructed by replacing the compressed image data storage HD 1201 of Embodiment 2 by the partial compressed image data storage HDs 261 and 262 of Embodiment 3. The components featuring this embodiment only are described as follows.

Figure 29:
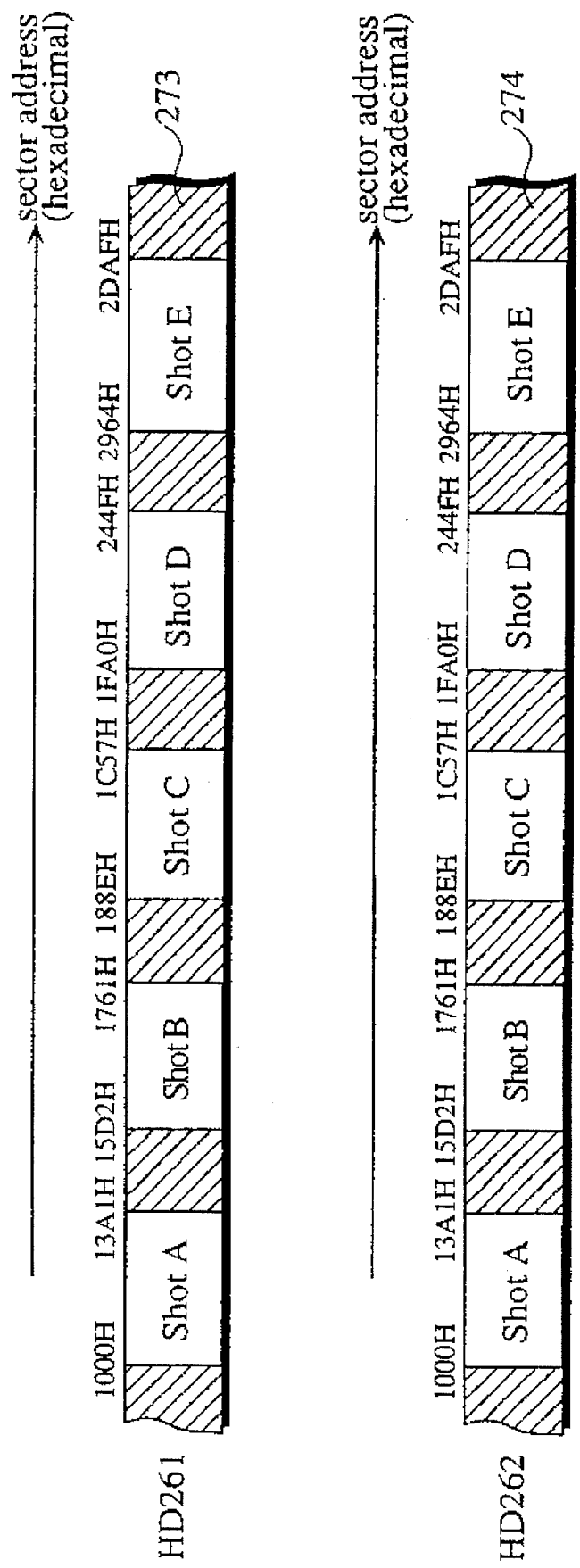
FIG. 29 shows partial compressed image data 2101 and 2102 respectively stored in the HDs 261 and 262 when the edition shown in FIG. 5A is performed.

FIG. 29 shows partial compressed image data 273 and 274 respectively stored in the HDs 261 and 262 when the edition shown in FIG. 5A is performed. In the HD 261, data corresponding to odd-numbered lines 273 in Shot A are stored between 1000H–13A1H sector, data corresponding to odd-numbered lines in Shots B, C, D, and E are stored between 15D2H–1761H sector, between 188EH–1C57H sector, between 1FA0H–244FH sector, and between 2964H–2DAFH sector respectively. In the same manner, in the HD 262, data corresponding to even-numbered lines 274 in Shot A are stored between 1000H–13A1H sector, data corresponding to even-numbered lines in Shots B, C, D, and E are stored between 15D2H–1761H sector, between 188EH–1C57H sector, between 1FA0H–244FH sector, and between 2964H–2DAFH sector respectively.

The block transfer execution unit 1211 of this embodiment finds a block start sector and a block termination sector by applying the following equations:

block start sector=(block start frame No.−101)*10+1000H block termination sector=(block termination frame No.−100)*10+ FFFH In this embodiment, as compressed data for 8 frames, partial compressed image data for 8 frames are transferred from each of the HDs 261 and 262. Since the partial compressed image data of 8 frames are 8*10/2=40 KByte, each transfer can manage with only one frame time.

Furthermore, it is possible to use partial compressed image storage HDs which are inferior in their performance to that used in Embodiment 2.

To provide a video effects unit with excellent performance allows the display of less compressed images which are close to analog data images as stored in films or tapes.

<EMBODIMENT 5>

Figure 30:
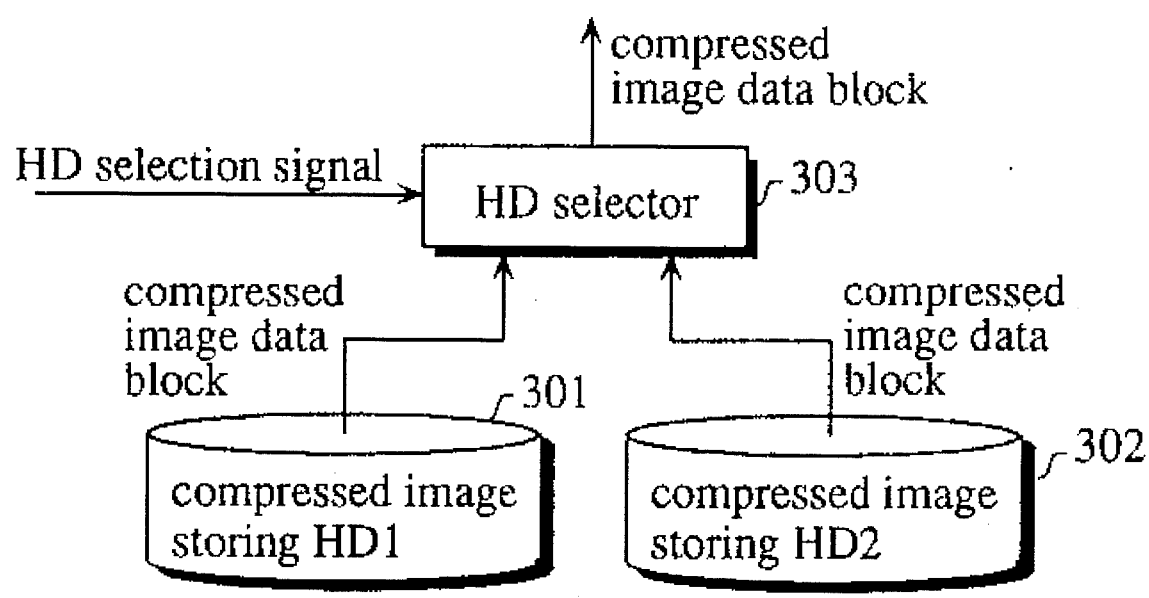
FIG. 30 shows a block diagram of the non-linear video editing system of Embodiment 5.

The non-linear video editing system of this embodiment is constructed the same as Embodiment 1 as shown in FIG. 30 except the compressed image data storage HD 1201 of Embodiment 1 is replaced by two compressed image data storage HDs 301 and 302 each having the same performance as the HD 1201. The components featuring this embodiment only are described as follows.

In FIG. 30, the HDs 301 and 302 can operate selectively and a HD selector 303 selects between the HD 301 and the HD 302 to output image data therefrom.

Figure 31A:
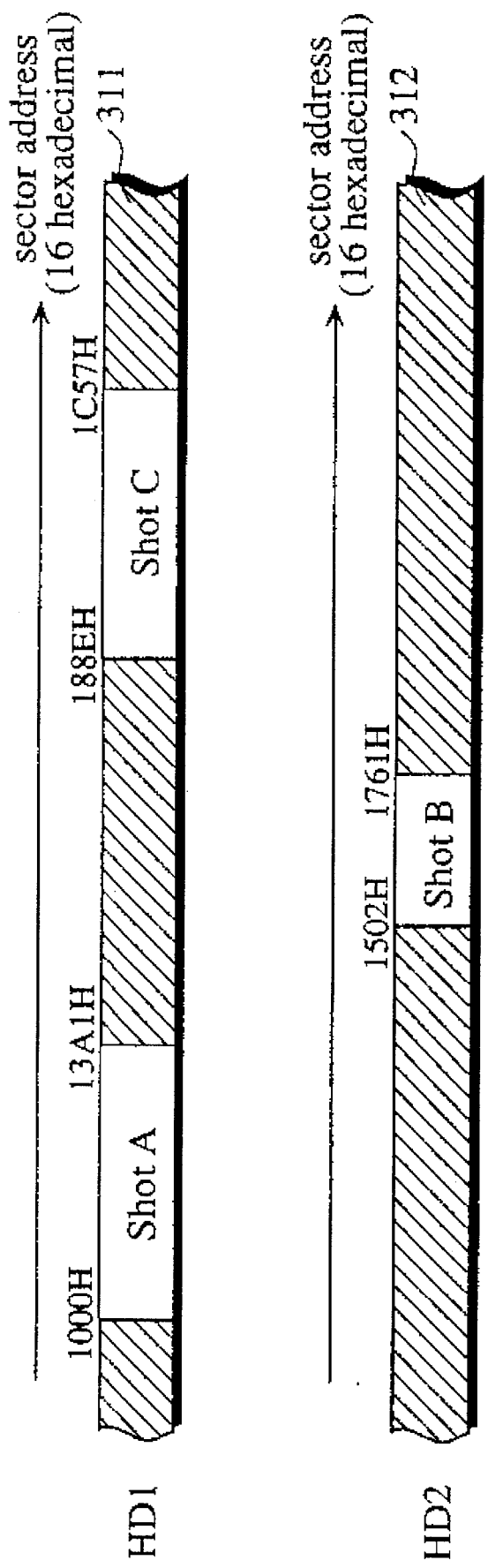
FIG. 31A shows compressed image data 301 and 302 respectively stored in the HDs 1 and 2 when the edition shown in FIG. 2A is performed.

FIG. 31A shows compressed image data 311 and 312 respectively stored in the HDs 301 and 302 when the edition shown in FIG. 2A is performed. In the HD 301, compressed data corresponding to Shot A are stored between 1000H–13A1H sector and data corresponding to Shot C are stored between 188EH–1C57H sector. In the HD 302, compressed data corresponding to Shot B are stored between 15D2H–1761H sector.

As shown in FIG. 31B, the shot link information memory 1208 further includes HD identification Nos. Therefore, the transfer parameter calculator unit 1210 has an additional function of outputting the HD identification Nos. together with a block start frame Nos. and a block termination frame Nos.

The block transfer execution unit 1211 selects the HD designated by the HD identification No. to transfer data and at the same time, inputs the HD identification No. to the HD selector 303 as an HD selection signal. The block transfer execution unit 1211 further makes the selected HD output data to the FIFO 1202.

As described hereinbefore, according to this embodiment, the user can watch edited video only by providing identification information to the HDs 301 and 302. In addition, data storage period can be longer than in Embodiment 1 because more than one HDs are provided.

<EMBODIMENT 6>

The non-linear video editing system of this embodiment is constructed by replacing the compressed image data storage HD 1201 of Embodiment 2 by the compressed image data storage HDs 301 and 302 of Embodiment 5.

The HD selector 303 distinguishes between data in the HD 301 and data in the HD 302 data, based on an HD selection signal sent from the transfer parameter calculator unit 1210 (not shown).

FIG. 32 shows the edition performed in this embodiment which is basically the same as FIG. 5A.

In the HD 301, compressed data corresponding to Shot A are stored between 1000H–13A1H sector and data corresponding to Shots C and E are stored between 188EH–1C57H sector and between 2964H–2DAFH sector respectively. In the HD 302, compressed data corresponding to Shots B and D are stored between 15D2H1761H sector and between 1FA0H–244FH sector.

FIGS. 33A and 33B are tables showing information stored in the shot link information memory 1208 respectively for AC channel and BC channel. These tables include HD identification Nos. in addition to the information described in Embodiment 2. The transfer parameter calculator unit 1210 has an additional function of outputting the HD identification Nos. together with a block start frame Nos. and a block termination frame Nos.

Therefore, the transfer parameter calculator unit 1210 selects the HDs 301 and 302 having a designated HD identification number for block transfer and outputs the HD identification number to the HD selector 303 as an HD selection signal. As a result, the output of the selected HD is supposed to be sent to the write FIFO.

As described hereinbefore, according to this embodiment, the plurality of HDs can be handled in the same way as the HD in Embodiment 2 by providing identification information to each of the HDs. In addition, data storage period can be longer than in Embodiment 1 because more than one HDs are provided.

<EMBODIMENT 7>

Figure 34:
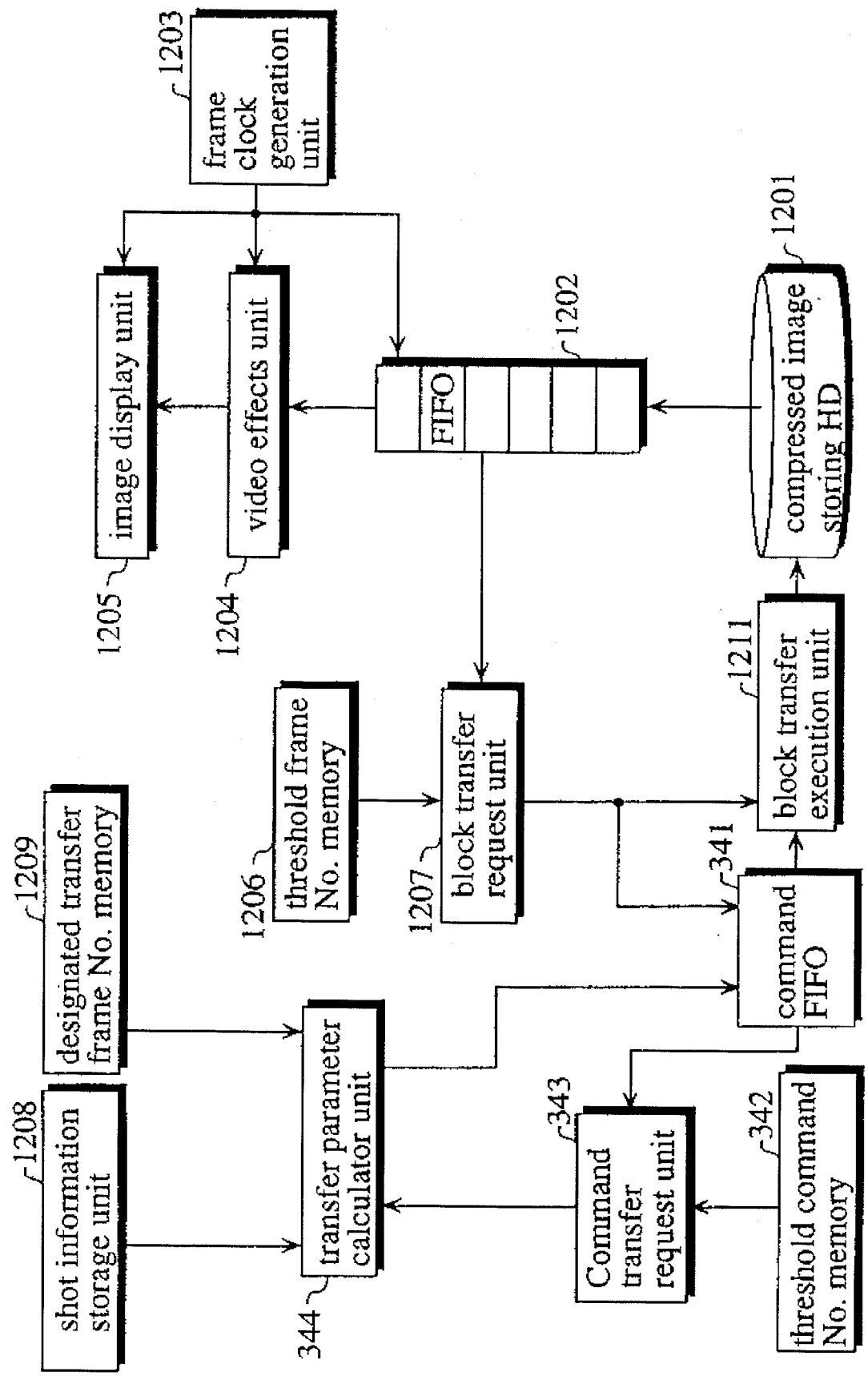
FIG. 34 shows a block diagram of the video editing apparatus of Embodiment 7.

The non-linear video editing system of this embodiment is constructed basically the same as Embodiment 1 as shown in FIG. 34, where the like components are labeled with like reference numerals with respect to Embodiment 1.

The components featuring this embodiment only are described as follows.

The block diagram of FIG. 34 includes a command FIFO 341, a threshold command No. memory 342, a command transfer request unit 343, and a transfer parameter calculator unit 344.

Receiving a block transfer request signal, the command FIFO 341 outputs a block transfer command request signal to the block transfer execution unit 1211.

The threshold command No. memory 342 holds a threshold value "3".

The command transfer request unit 343 checks the number of command request signals stored in the command FIFO 341 and sends a command transfer request signal to the transfer parameter calculator unit 344 when the number is smaller than the threshold value "3".

Responding to the command transfer request signal, the transfer parameter calculator unit 344 generates block transfer request signals for at most 10 times, and generates parameter needed for transfer smaller number of frames between all the frames remained and 10 frames. The transfer parameter calculator unit 344 is composed of a high-speed CPU and memory, which can calculate within micro seconds.

FIG. 35 shows information on command transfer request. The comparison between FIGS. 35 and 18 indicates that the transfer command generated in Embodiment 1 can be generated in this embodiment. When the number of command transfer requests in the command FIFO 341 becomes 2, two block transfer requests generated in frame replay time can be managed. Meanwhile, the transfer parameter calculator unit 344 can generate at most 10 command transfer requests at once, thereby sending to the command FIFO 341.

This construction contributes to prevent the command FIFO 341 from lacking transfer parameter to respond to block transfer request signal, which will described below. The following is a description on differences between this embodiment and Embodiment 1.

FIG. 36 shows the timing of CPU in Embodiment 1, where block transfer request occurs in the 7th and 15th frames. The period in which the transfer parameter calculation is not performed is the time for replay frames. During the period, the CPU performs other processes such as window plot process. In Embodiment 1, it takes about one second to complete some process, which may result in that the transfer parameter cannot be calculated even the block transfer request signal is sent. As a result, consecutive replay becomes impossible. However, in this embodiment, 10 transfer commands makes it possible to continue to send the number of frames corresponding to one second process to the FIFO 1202, thereby keeping the consecutive replay.

FIG. 37 shows the timing of CPU in this embodiment where when the command transfer request corresponding to the 8th block transfer request signal in 55th frame is outputted from the command FIFO 341, the CPU in the transfer parameter calculator unit 344 calculates the transfer parameter group corresponding to the 2nd command request.

As described hereinbefore, the CPU in the transfer parameter calculator unit 344 can use about 1 second for other process.

<EMBODIMENT 8>

Figure 38:
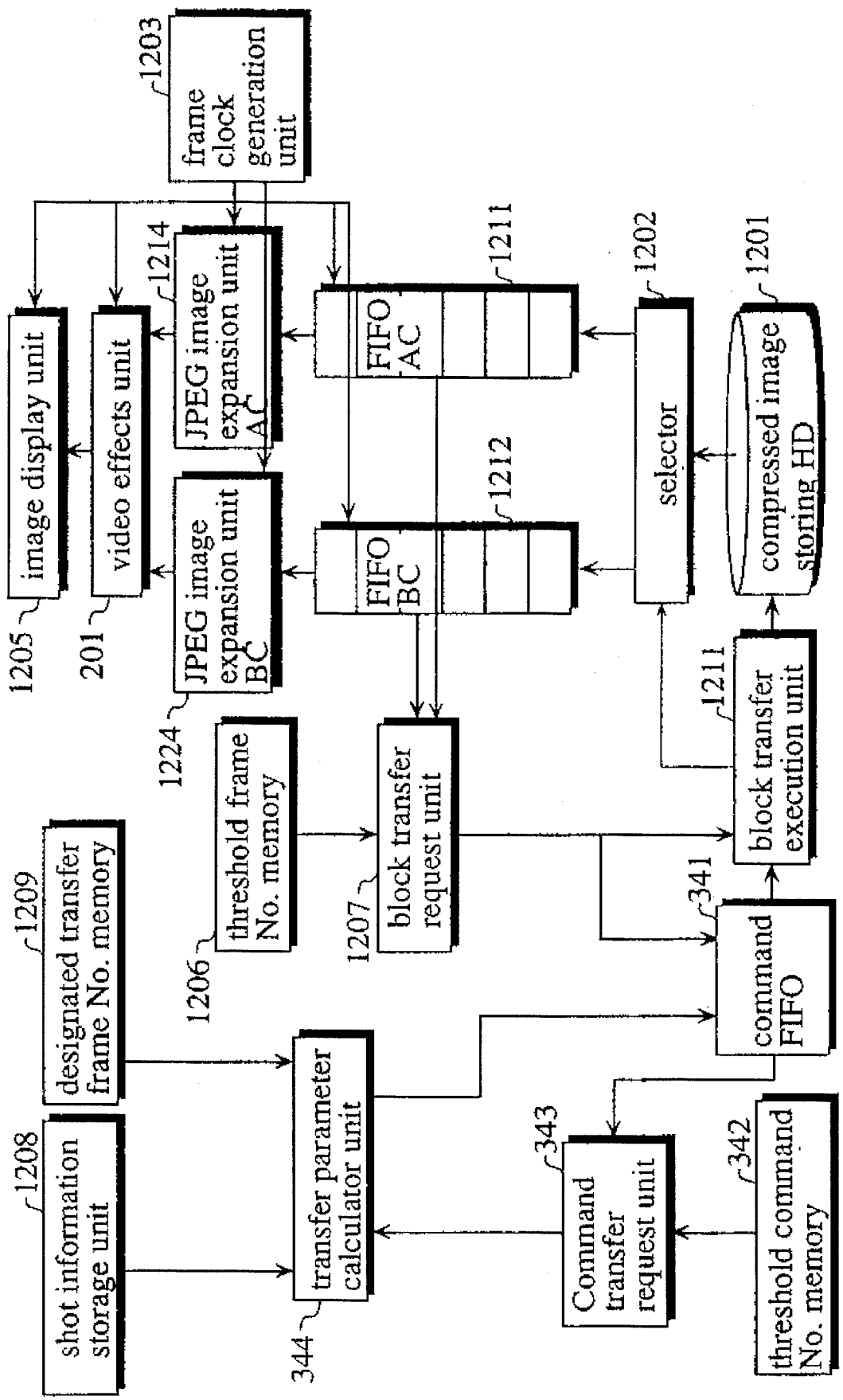
FIG. 38 shows a block diagram of the video editing apparatus of Embodiment 8.

The non-linear video editing system of this embodiment is constructed basically the same as Embodiment 2, as shown in FIG. 38, where the like components are labeled with like reference numerals with respect to Embodiment 2.

The components featuring this embodiment only are described as follows.

The block diagram of FIG. 38 includes a command FIFO 381, a threshold command No. memory 382, a command transfer request unit 383, and a transfer parameter calculator unit 384.

Receiving a block transfer request signal, the command FIFO 381 outputs a block transfer command request signal to the block transfer execution unit 1211.

The threshold command No. memory 382 holds a threshold value "3".

The command transfer request unit 383 checks the number of command request signals stored in the command FIFO 381 and sends a command transfer request signal to the transfer parameter calculator unit 384 when the number is smaller than the threshold value "3".

Responding to the first command transfer request, the transfer parameter calculator unit 384 generates block transfer request signals for at most 10 times after simulating the block transfer request signals for the FIFO (AC)1211 and (BC)1212 in a feasible order. A parameter is generated, which is needed to transfer smaller number of frames between all the frames remained and 10 frames. The transfer parameter calculator unit 384 is composed of high-speed CPU and memory, which can calculate within micro seconds.

FIG. 39 shows information on command transfer request. The comparison between this figure and FIGS. 18 and 24 indicates that the transfer command generated in Embodiment 2 can be generated in this embodiment. When the number of command transfer requests in the command FIFO 381 becomes 2, two block transfer requests generated in frame replay time can be managed. Meanwhile, the transfer parameter calculator unit 384 can generate at most 10 command transfer requests at once, thereby sending to the command FIFO 381.

This construction contributes to prevent the command FIFO 381 from lacking corresponding transfer parameter to respond to block transfer request signal.

Therefore, like in Embodiment 2, edited images can be replayed without interruption. In addition, like in Embodiment 7, there are time intervals of more than one second during which the CPU does not perform calculation. This interval allows the CPU to perform other processes such as window plot process.

<EMBODIMENT 9>

The non-linear video editing system of this embodiment is constructed the same as Embodiment 3 except the transfer parameter calculator unit 1210 in FIG. 12 is replaced by the command FIFO 341, threshold command No. memory 342, command transfer request unit 343, and transfer parameter calculator unit 344.

Therefore, like in Embodiment 3, edited images can be replayed without interruption. In addition, like in Embodiment 7, there are time intervals of more than one second during which the CPU does not perform calculation. This interval allows the CPU to perform other processes such as window plot process.

<EMBODIMENT 10>

The non-linear video editing system of this embodiment is constructed by replacing the transfer parameter calculator unit 1210 in FIG. 20 of Embodiment 4 by the command FIFO 381, threshold command No. memory 382, command transfer request unit 383, and transfer parameter calculator unit 384.

Therefore, like in Embodiment 4, edited images can be replayed without interruption. In addition, like in Embodiment 8, there are time intervals of more than one second during which the CPU does not perform calculation. This interval allows the CPU to perform other processes such as window plot process.

<EMBODIMENT 11>

The non-linear video editing system of this embodiment is constructed by replacing the transfer parameter calculator unit 1210 in FIG. 12 of Embodiment 5 by the command FIFO 341, threshold command No. memory 342, command transfer request unit 343, and transfer parameter calculator unit 344 of Embodiment 7.

Therefore, like in Embodiment 5, edited images can be replayed without interruption. In addition, like in Embodiment 7, there are time intervals of more than one second during which the CPU does not perform calculation. This interval allows the CPU to perform other processes such as window plot process.

<EMBODIMENT 12>

The non-linear video editing system of this embodiment is constructed by replacing the transfer parameter calculator unit 1210 in FIG. 20 of Embodiment 6 by the command FIFO 381, threshold command No. memory 382, command transfer request unit 383, and transfer parameter calculator unit 384 of Embodiment 8.

Therefore, like in Embodiment 5, edited images can be replayed without interruption. In addition, like in Embodiment 7, there are time intervals of more than one second during which the CPU does not perform calculation. This interval allows the CPU to perform other processes such as window plot process.

<EMBODIMENT 13>

Figure 4:
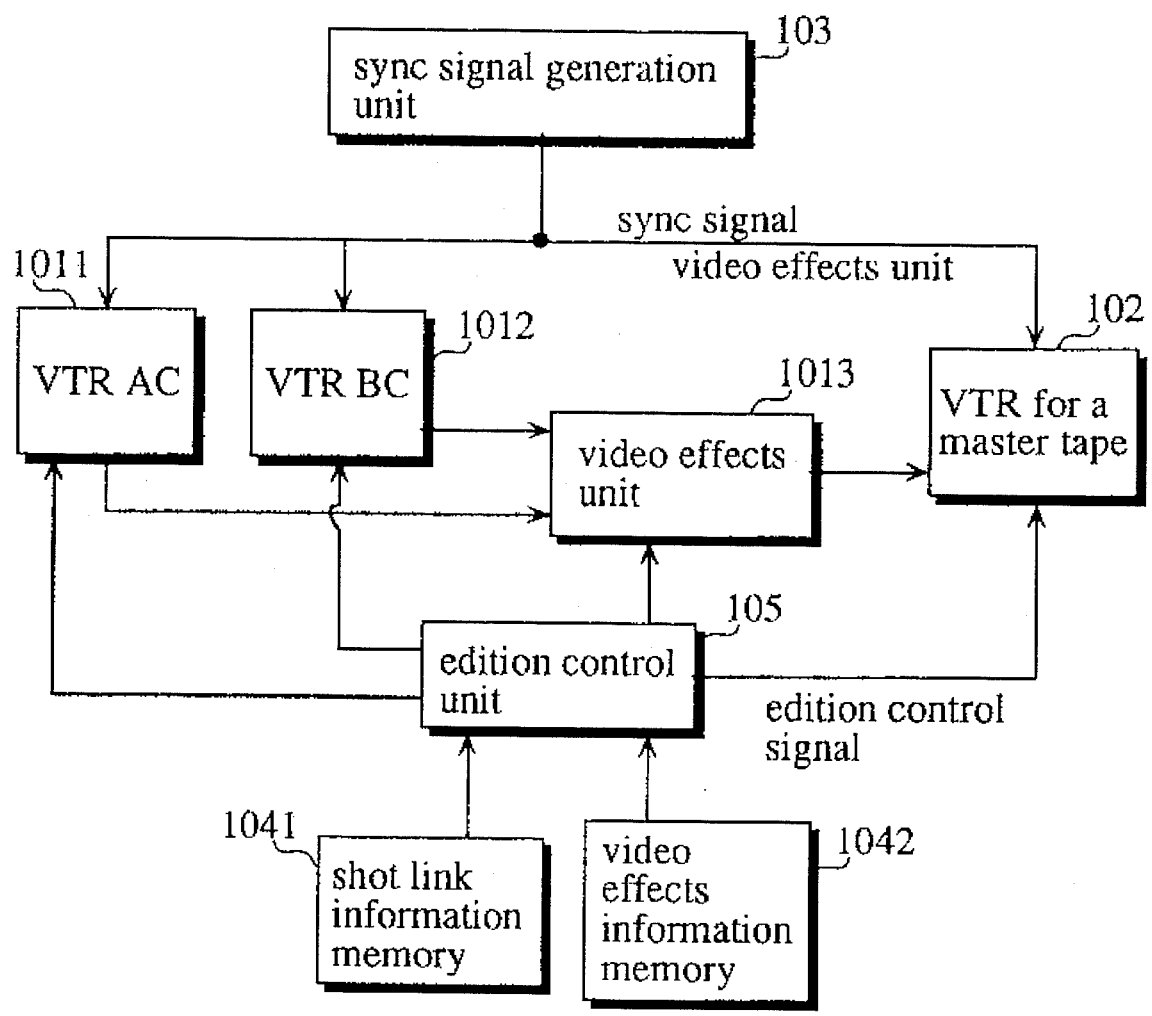
FIG. 4 shows a block diagram of a conventional image editing apparatus provided with two VTRs for source tapes.
Figure 40:
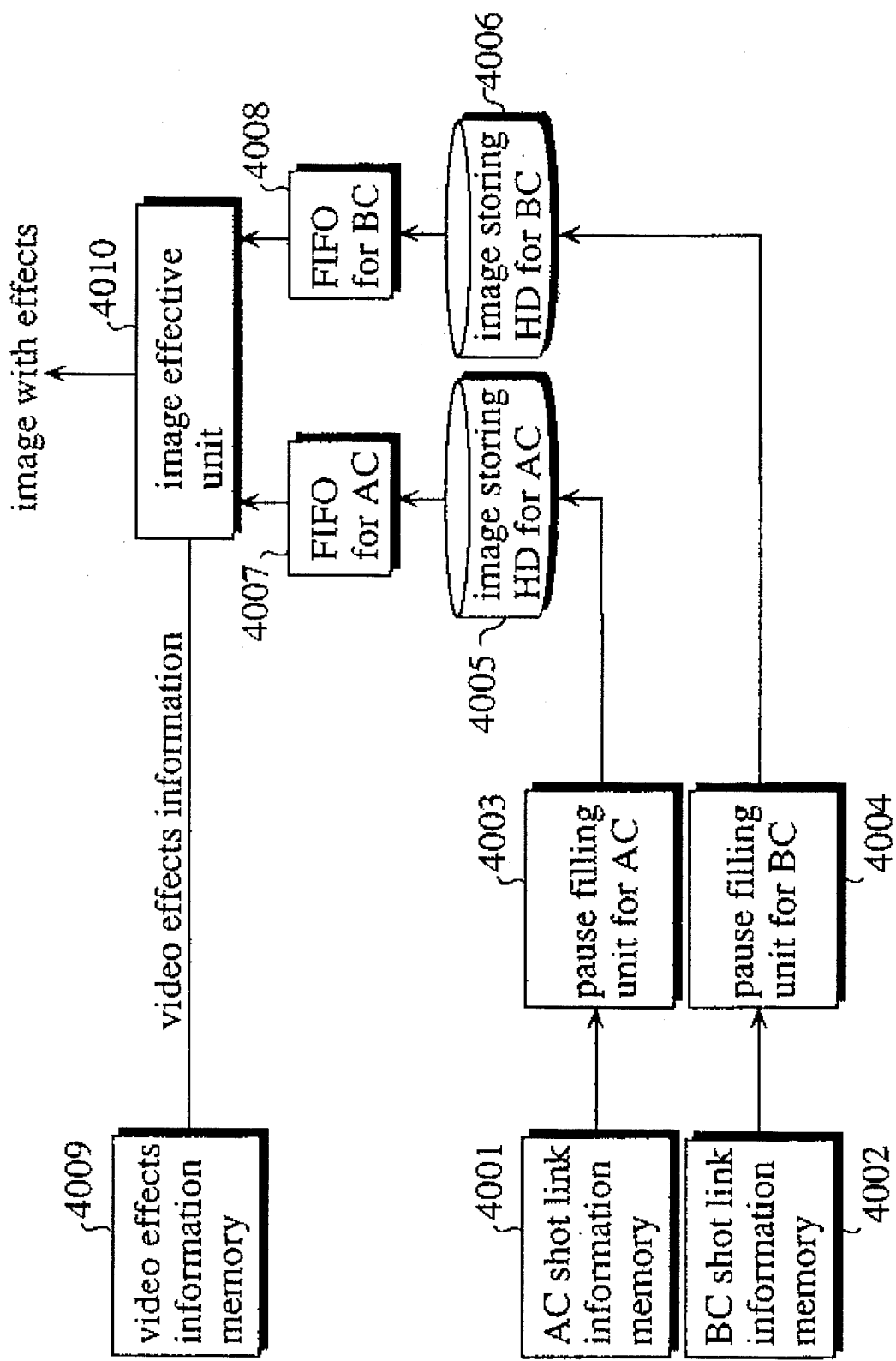
FIG. 40 shows a block diagram of the video editing apparatus of Embodiment 13.

The non-linear video editing system of this embodiment is shown as a block diagram in FIG. 40, which is similar to that shown in FIG. 4. The system includes an AC shot link information memory 4001, a BC shot link information memory 4002, a AC pause filling unit 4003, a BC pause filling unit 4004, an AC image data storage HD 4005, a BC image data storage HD 4006, an AC FIFO 4007, an BC FIFO 4008, a video effects information memory 4009, and a video effects unit 4010 for AC/BC channels.

The AC image data storage HD 4005 (hereinafter referred to as AC HD 4005) and the AC FIFO 4007 correspond to the VTR AC 1011, and the BC image data storage HD 4006 (hereinafter referred to as BC HD 4006) and the BC FIFO 4008 correspond to the VTR BC 1012.

The AC shot link information memory 4001 and the BC shot link information memory 4002 correspond to the shot link information memory 1041. The video effects information memory 4009 correspond to the video effects information memory 1042. The video effects unit 4010 corresponds to the video effects unit 1013 and the edition control unit 105. The other components are not illustrated to simplify the diagram.

This embodiment is similar to Embodiment 6 whose construction is shown in FIG. 20, but is different in that the AC and BC pause filling unit 4003 and 4004 are provided and block transfer units 1207, 1206 and 1211 and transfer parameter calculator units 1208, 1209, and 1210 are not provided.

Each of the FIFOs 4007 and 4008 is composed of a ring buffer with dual port RAM. The AC and BC shot link memories 4001 and 4002 and video effects information memory 4009 are composed of high-speed semi-conductor memory.

Based on the information on display and video effects inputted by the user, the CPU of the AC and BC pause filling units 4003 and 4004 checks whether there is a pause between adjacent frames, and if there is, calculates the pause in terms of frames. The calculation is performed by the MCPU in accordance with a predetermined program. According to the calculation, it is judged whether there is a pause between two adjacent frames, the pause being longer than the time to process one frame. Therefore, the time is contained in the program in the MCPU.

When the contents of a display or video effects are modified by the user, not only the channel or frame to be read out but the number of frames to be outputted from the pause filling units 4003 and 4004 are modified. In the case, if the process speed of the video effects unit 4010 is changed, the number of frames added by the pause filling units 4003 and 4004 is reflected on the calculation by the MCPU. More precisely, if the wipe effects applied over the last 4 frames on the AC channel and the first 4 frames on the BC channel are deleted and the display of the AC channel only is extended 2 frames backward and the display of the BC channel only is extended 2 frames forward so that the display is switched from AC channel to BC channel without the wipe effects, the last 2 frames on the AC channel and the first 2 frames on the BC channel are not read out.

The operation of the video effects unit 4010 in this embodiment is described as follows.

When the video effects unit 4010 has different storing methods for the AC channel and the BC channel, image data are temporarily written to the VRAM by uniting the different storing methods into one method. The VRAM area in which to write image data on the AC channel and the BC channel is determined according to the contents of the video effects per frame.

Figure 6A:
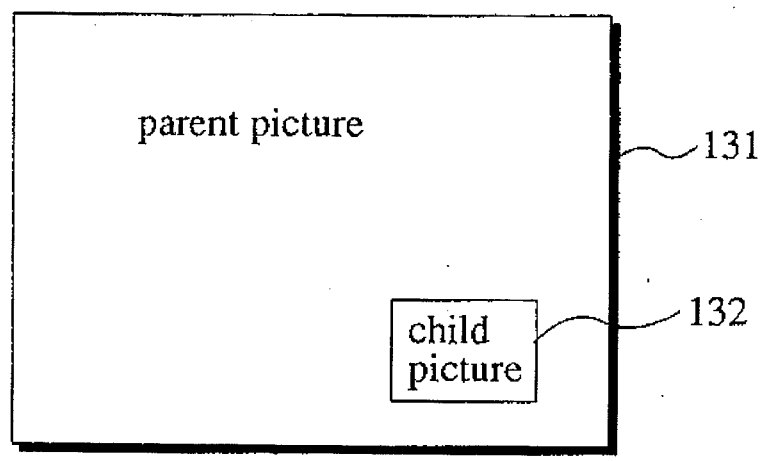
FIG. 6A shows "picture in picture" effects.
Figure 6B:
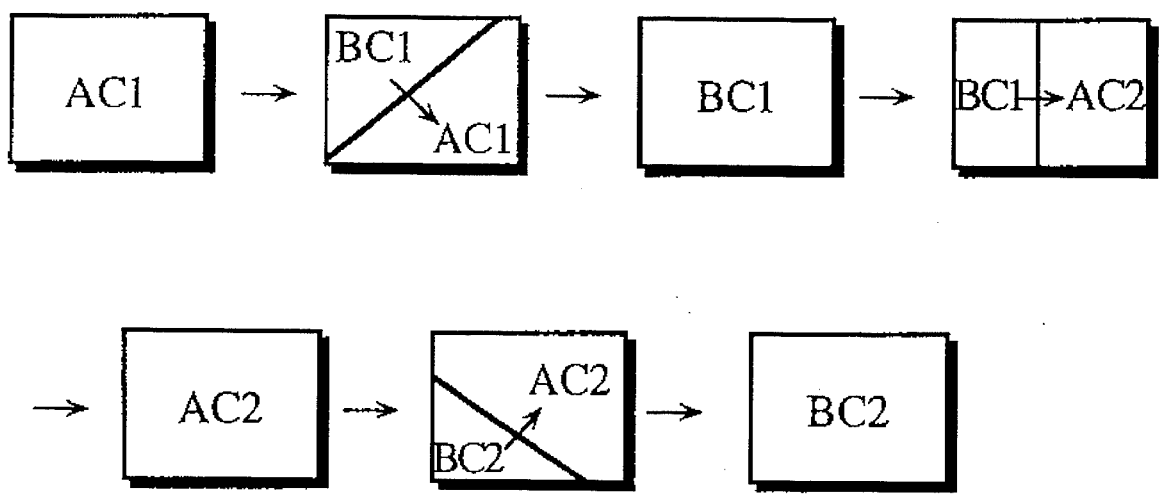
FIG. 6B shows "wipe" effects.

The system of this embodiment operates as follows when the edition with the wipe effects shown in FIG. 6B is performed.

Figure 41A:
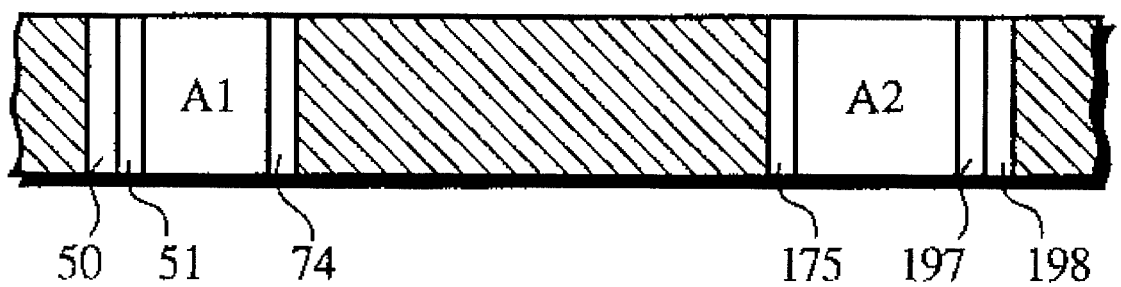
FIG. 41A shows Shot A1 and Shot A2 included in the AC HD 4005.
Figure 41B:
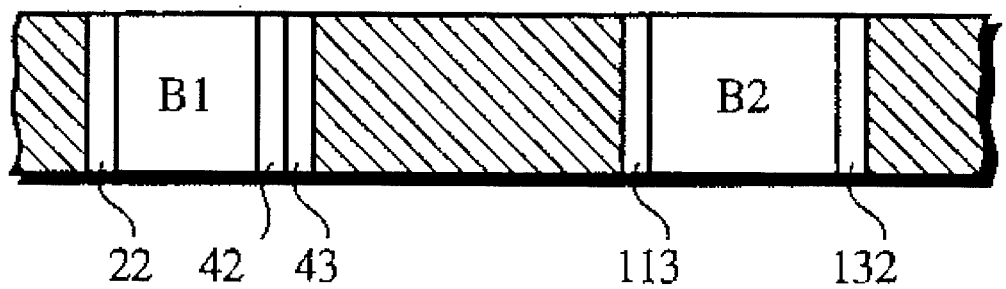
FIG. 41B shows Shot B1 and Shot B2 included in the BC HD 4006.

FIG. 41A shows Shot A1 and Shot A2 included in the AC HD 4005 and FIG. 41B shows Shot B1 and Shot B2 included in the BC HD 4006.

FIGS. 42A and 42B are shot information stored in the AC shot link information memory 4001 and the BC shot link information memory 4002.

FIG. 43 is a table showing video effects information stored in the video effects information memory 4009. In the table, in-points and out-points indicate start frame Nos. and termination frame Nos. respectively on the master HD to apply video effects. The video effects Nos. indicate the types of video effects. The WIPE indicates the video effects "wipe", and each numeral 05, 15, and 27 indicates the time and types of the wipe.

Figure 44A:
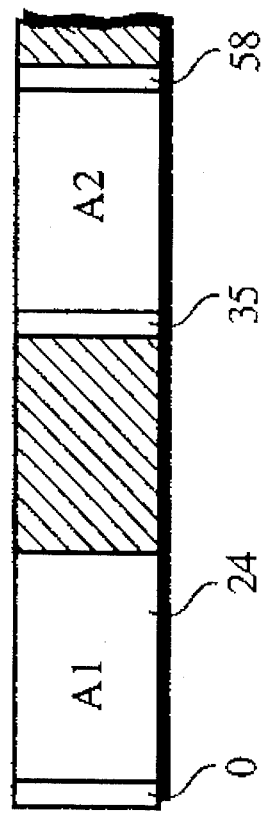
FIG. 44 shows pauses between shots on the AC channel and the BC channel.
Figure 44B:
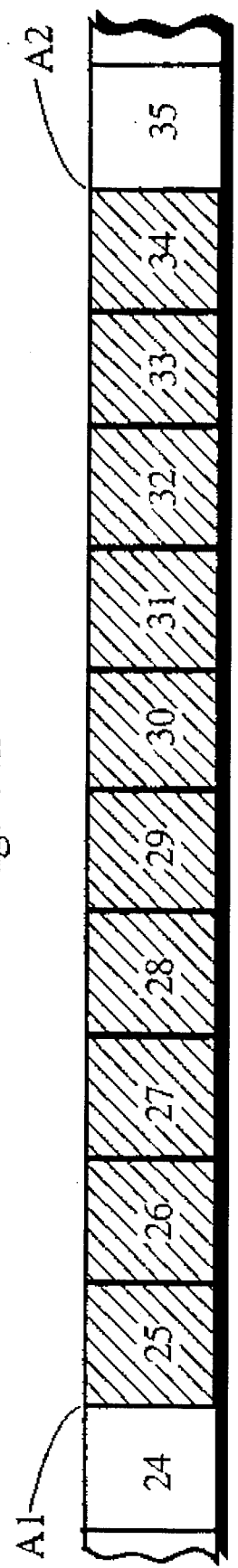

The AC pause filling unit 4003 first checks whether there is a pause between Shot A1 and Shot A2. If there is, the pause is calculated in terms of frames. In this case, there is a pause indicated by slanting lines in FIG. 44A. The pause is magnified in FIG. 44B which indicates there are 10 frames between Shots A1 and A2.

The AC pause filling unit 4003 slides the termination frame No. of Shot A1 5 frames backwards and the start frame No. of Shot A2 5 frames forwards, thereby deleting the pause therebetween. Then, the unit 4003 converts the start frame Nos. and the termination frame Nos. of Shots A1 and A2 to revised start frame Nos. and revised termination frame Nos. respectively.

Figures 45A, 45B:
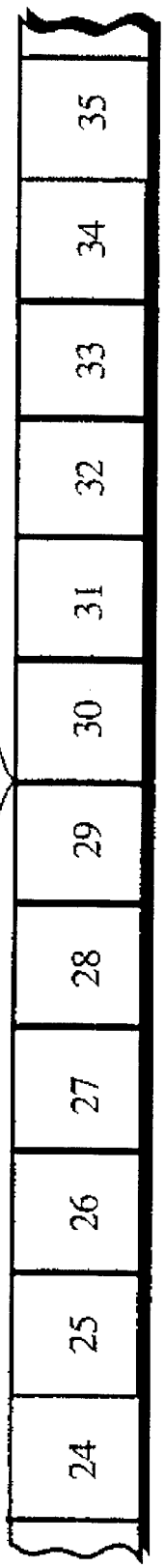
FIG. 45 shows the deleted pauses on the AC channel.

The conversion from a start frame No. and a termination frame No. into a revised start frame No. and a revised termination frame No. respectively can be found by applying the following equations.

revised start frame No.=start frame No.=start frame No. −the number of frames slid forward revised termination frame No.=termination frame No.=termination frame No.+the number of frames slid backward As shown in FIG. 45B, Shots A1 and A2 are made to be composed of 30 frames and 29 frames respectively. The AC FIFO 4007 holds frames 0–58, as will described below.

Figure 46A:
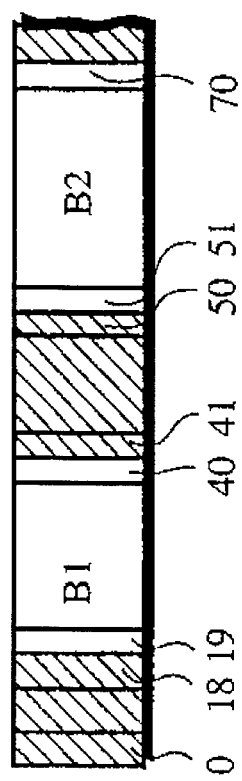
FIG. 46AB show the interval between adjacent shots in the BC channel.
Figure 46B:
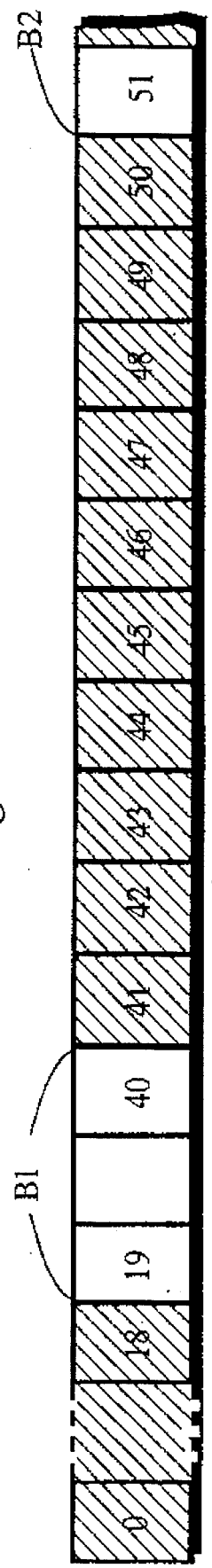

The BC pause filling unit 4004 first checks whether there is a pause between Shot B1 and Shot B2. If there is, the pause is calculated in terms of frames. In this case, there are two pauses indicated by slanting lines in FIG. 46A. The pauses are magnified in FIG. 46B which indicates there are 19 frames between the start position and Shot B1 and 10 frames between Shots B1 and B2.

Figures 47A, 47B:
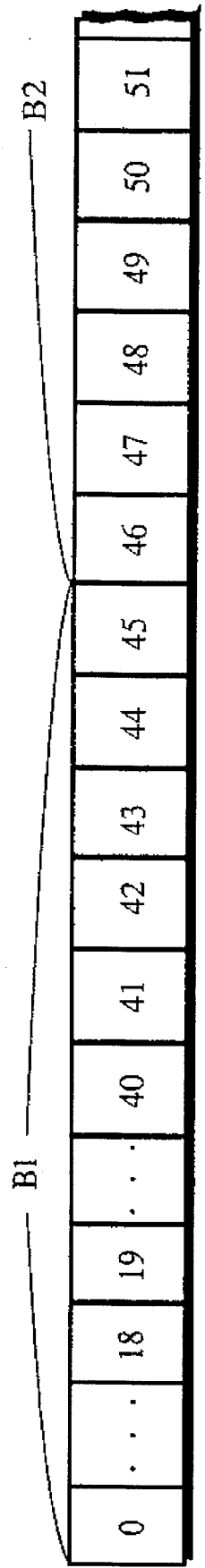
FIG. 47 shows the deleted pauses on the BC channel.

As shown in FIG. 47A, the BC pause filling unit 4004 slides the start frame and the termination frame No. of Shot B1 respectively 19 frames forward and 5 frames backwards, then slides the start frame No. of Shot B2 5 frames forwards, thereby deleting these pauses. Then, the unit 4004 converts the start frame Nos. and the termination frame Nos. of Shots B1 and B2 to revised start frame Nos. and revised termination frame Nos. respectively.

The conversion from a start frame No. and a termination frame No. into a revised start frame No. and a revised termination frame No. respectively can be found by applying the same equations as used for A channel.

FIG. 47B shows BC shot replay information.

In FIGS. 45B and 47B, the start frame Nos. and the termination frame Nos. are used to specify each area in the AC HD 4005. The replay start frame Nos. and the replay termination Nos. indicate the number of frames between the start point and the end point of a replay.

Figure 48A:
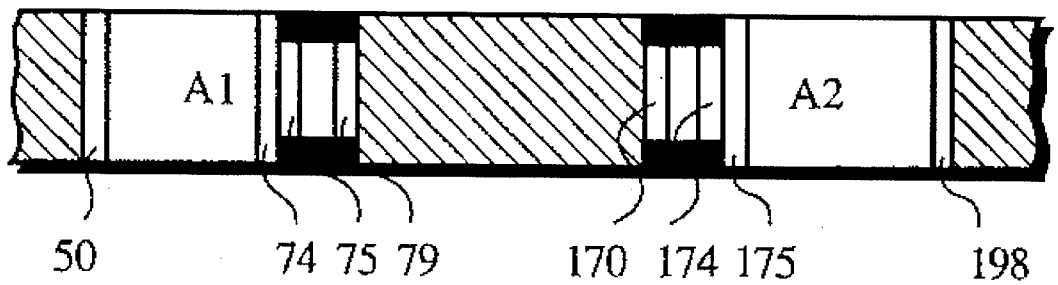
FIG. 48A shows areas read from the AC HD 4005.

Referring to the AC shot replay information, the AC HD 4005 informs the AC FIFO 4007 of the position of Shots A1 and A2 on a recording medium. The areas read from the AC HD 4005 are shown in FIG. 48A. Each area added to a shot to delete a pause between two shots is indicated by thick lines.

The AC FIFO 4007 receives image data corresponding to frames 50–79 followed by frames 174–198 and outputs these image data to the video effects unit 4110 at a high speed.

Figure 48B:
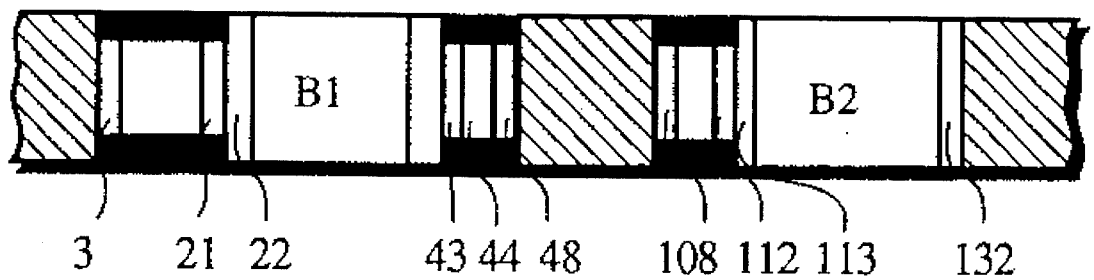
FIG. 48B shows areas read from the BC HD 4006.

Referring to the BC shot replay information, the BC HD 4006 informs the BC FIFO 4008 of the position of Shots B1 and B2 on a recording medium. The areas read from the BC HD 4006 are shown in FIG. 48B. Each area added to a shot to delete a pause between two shots is indicated by thick lines.

The BC FIFO 4008 receives image data corresponding to frames 3–48 followed by frames 108–132 and outputs these image data to the video effects unit 4110 at a high speed.

The video effects unit 4110 receives video effects information shown in FIG. 43 from the video effects information memory 4009 and starts to apply the effects designated by the effects No. at the in-point and terminates the application at the out-point. The image data corresponding to the added area to delete a pause is cancelled by multiplying the data by zero. Even a frame belonging to a shot in a time can be used as area to be added to another shot in another time, without being applied video effects.

In FIG. 6B, video effects are applied three times without switching operation.

Figure 49:
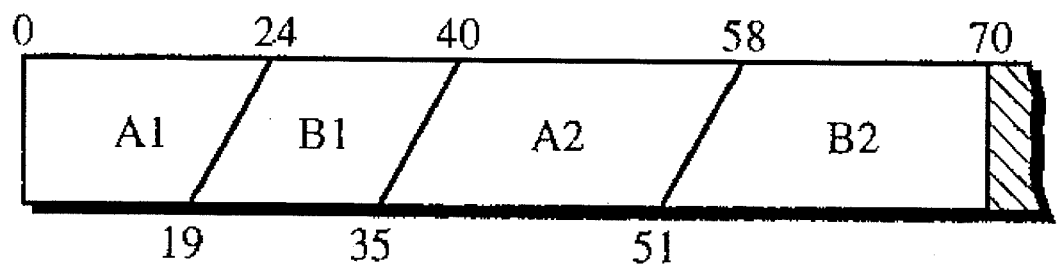
FIG. 49 shows frames applied the video effects.

In FIG. 49, the slanting lines indicate the frames applied the video effects. In this case, wipes are applied to between Shots A1 and B1, between Shots B1 and A2, and between Shots A2 and B2.

<EMBODIMENT 14>

Figure 50:
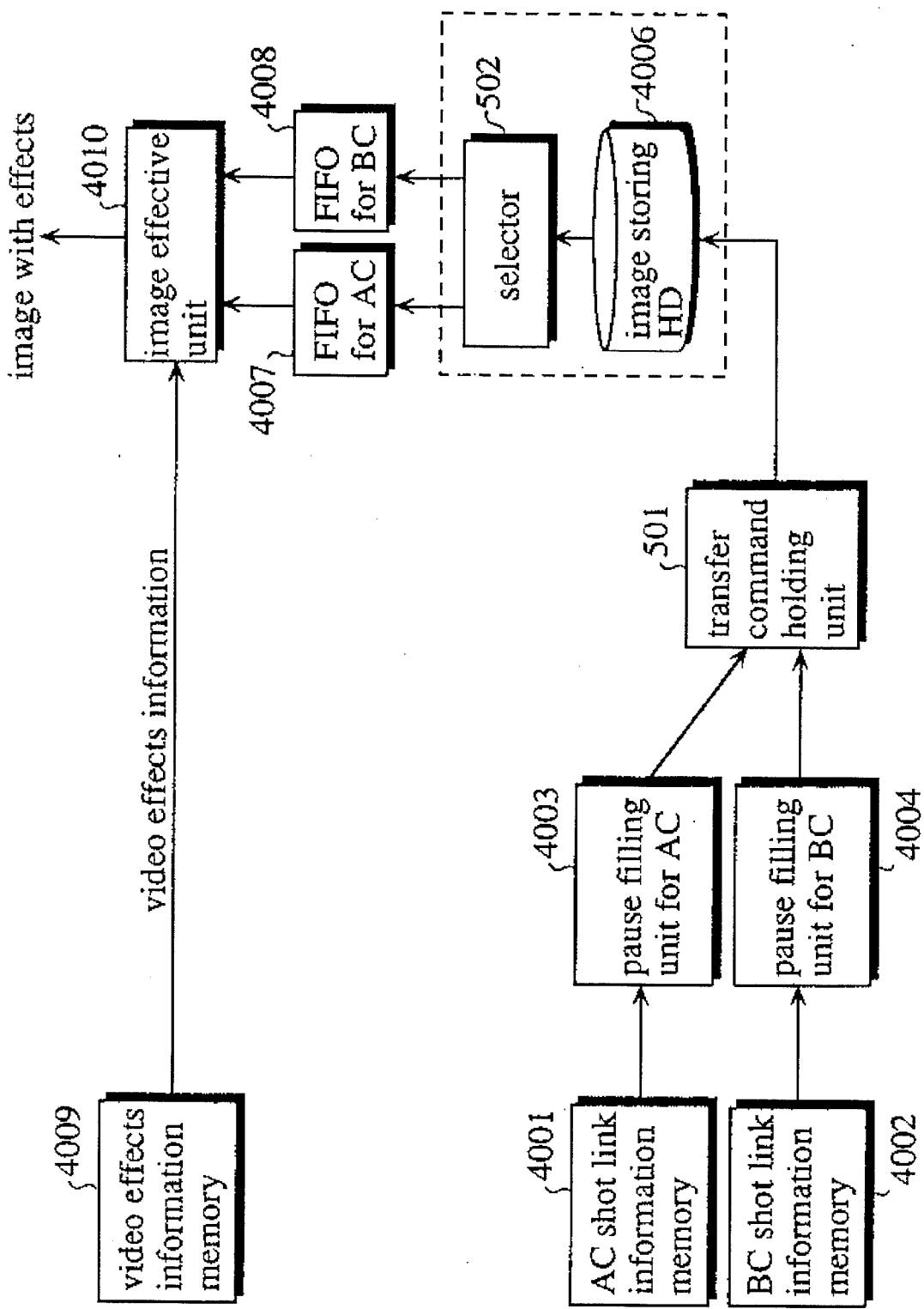
FIG. 50 shows a block diagram of the video editing apparatus of Embodiment 14.

The non-linear video editing system of this embodiment is constructed the same as Embodiment 13, as shown in FIG. 50 except that the image data storage HD 4006 is designed to hold image data both on the AC and BC channels and there are a transfer command holding unit 501 and a selector 502 provided.

The following is a description on the selector 502.

The AC channel and the BC channel have the same frequency, so that it is necessary to distinguish to which channel each frame belongs. One method for the distinction is that to add a channel identifier to each frame signal. Another is to judge from the position of a sector from which a frame is taken, or to judge from the time when the frame is taken. The other is to receive a judging signal from a transfer command holding unit 501. In this embodiment, the last-mentioned method is used so that any type of image data can be stored to a storing medium.

The following is a description on the transfer command holding unit 501.

Referring to the AC shot replay information sent from the AC pause filling unit 4003 and the BC shot replay information sent from the BC pause filling unit 4004, the transfer command holding unit 501 rearranges A1, A2, B1, and B2 in a replayed order, thereby forming shot replay information. The transfer command holding unit 501 forwards the shot replay information and at the same time informs the selector 502 of the channel the shot belongs to.

The system of this embodiment operates as follows when 4 shots are edited as shown in FIG. 49.

Like in Embodiment 13, the HD 4006 can be accessible per sector, which is assigned a unique address for random access and unlike Embodiment 13, Shots A1, A2, B1, and B2 are stored in sectors, which are away from each other as shown in FIG. 8.

The AC shot link information memory 4001, BC shot link information memory 4002, AC pause filling unit 4003 and BC pause filling unit 4004 operate in the same manner as in Embodiment 13, thereby sending AC shot replay information and BC shot replay information to the transfer command holding unit 501.

In FIG. 51, the start frame NOs. and the termination frame Nos. are used to specify each area in the image storing HD 4006. The replay start frame Nos. and the replay termination Nos. indicate the number of frames between the start point and the end point of a replay.

Figure 52:
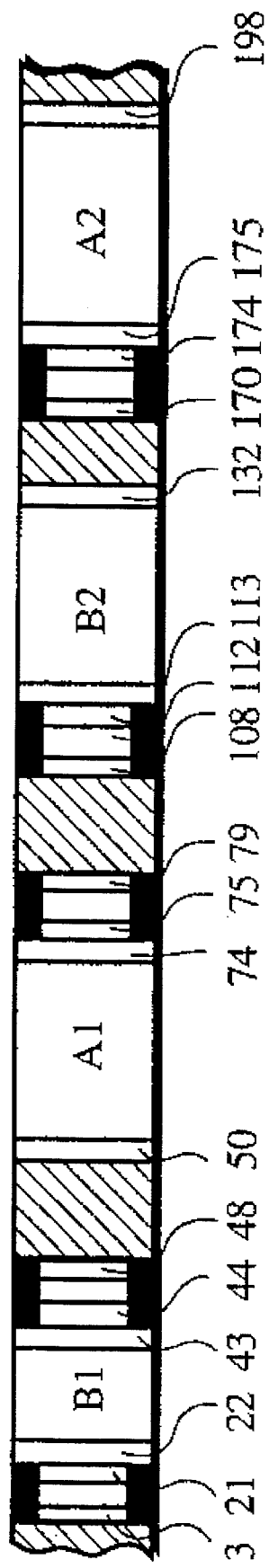
FIG. 52 shows areas read from the HD in Embodiment 14.
Figure 53:
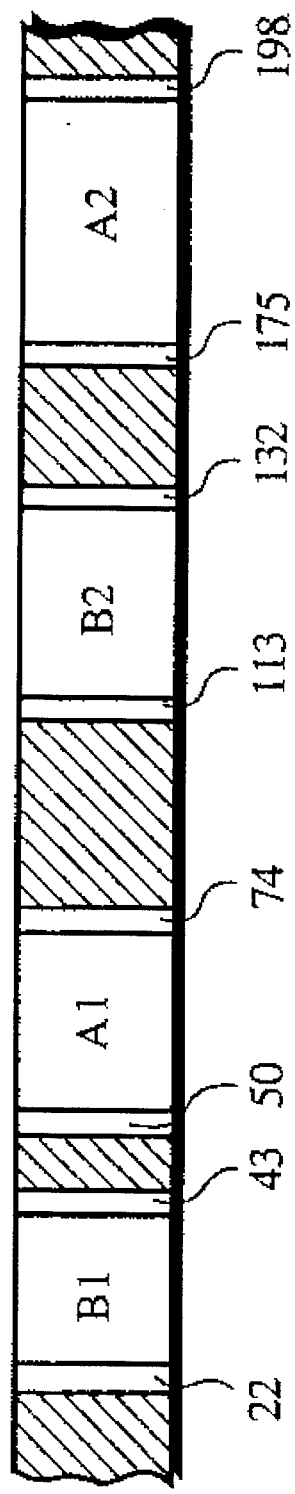
FIG. 53 shows areas of shots to be edited.

Referring to the shot replay information, the transfer command holding unit 501 sends Shots A1, B1, A2, and B2 to the image storing HD 4006. The areas read from the image storing HD 501 are shown in FIG. 52. Each area added to a shot to delete a pause between two shots is indicated by thick lines. Like in Embodiment 13, the start frame and the termination frame No. of Shot B1 are extended respectively 19 frames forward and 5 frames backwards, and the start frame Nos. of Shots A1, B2, A2 are extended 5 frames backwards.

Informed that the shot replay information is for AC channel, the selector 502 outputs image data sent from the image storing HD 501 to the AC FIFO 4007. In the same manner, the selector 502 outputs shot replay information for BC channel to the BC FIFO 4008.

The AC and BC FIFOs 4007 and 4008 and video effects information memory 4009 and video effects unit 4010 operate the same as in Embodiment 13, thereby obtaining the results shown in FIG. 49.

<EMBODIMENT 15>

Figure 54:
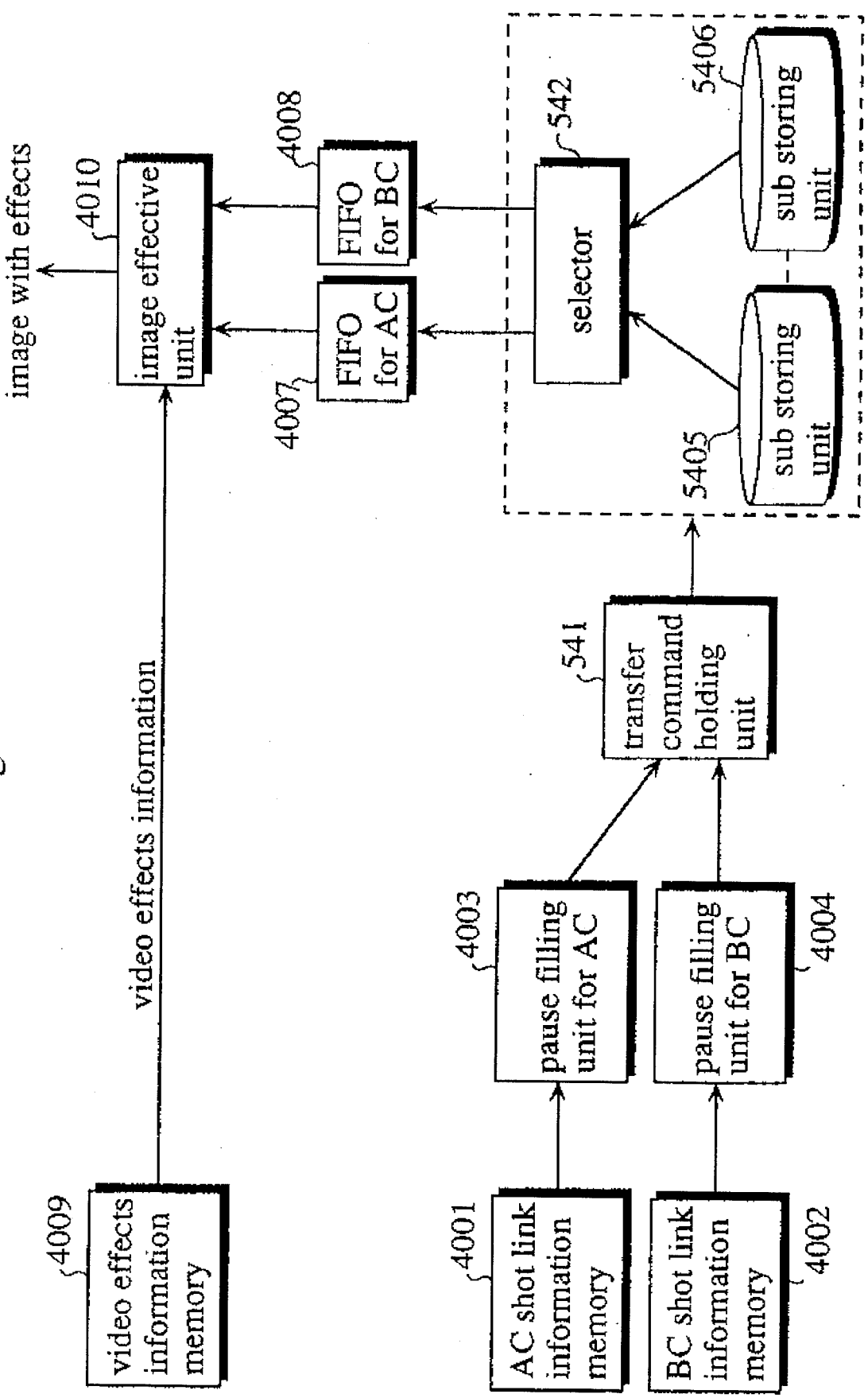
FIG. 54 shows a block diagram of the video editing apparatus of Embodiment 15.
Figure 55:
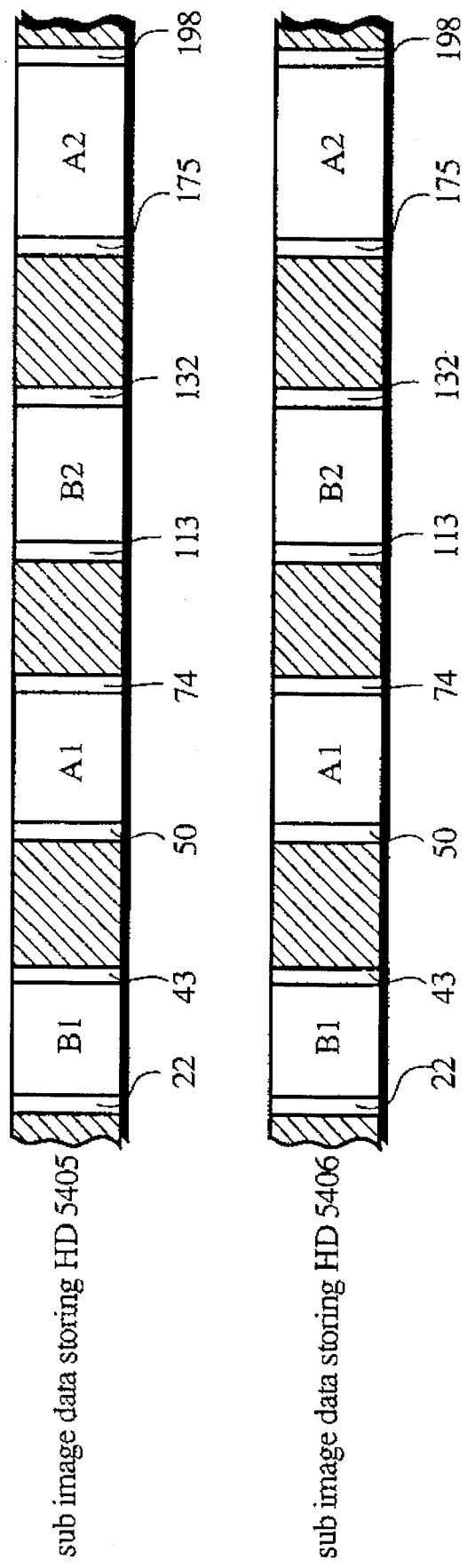
FIG. 55 shows the contents of image data stored in the sub HDs 5405 and 5406.

The non-linear video editing system of this embodiment is constructed the same as Embodiments 13 and 14, as shown in FIG. 54 except that there are sub image data storage HDs 5405 and 5407 are provided which can be accessed randomly and operate in parallel, and that data for one frame occupy two sectors. The transfer command holding unit 541 and the selector 542 correspond to the transfer command holding unit 501 and the selector 502 of FIG. 50.

The system of this embodiment operates as follows when 4 shots are edited as shown in FIGS. 6B and 49.

The sub HDs 5405 and 5406 respectively hold odd-numbered scan lines and even-numbered scan lines of each of Shots A1, A2, B1, and B2.

The AC shot link information memory 4001, the BC shot link information memory 4002, the AC pause filling unit 4003, and the BC pause filling unit 4004 operate the same as in Embodiment 13 and the transfer command holding unit 541 does the same as in Embodiment 14, thereby sending shot replay information shown in FIG. 51 to the sub HDs 5405 and 5406 and channel identification information to the selector 542.

The image data divided into channels are sent to the FIFOs 4007 and 4008 as follows.

Figure 56:
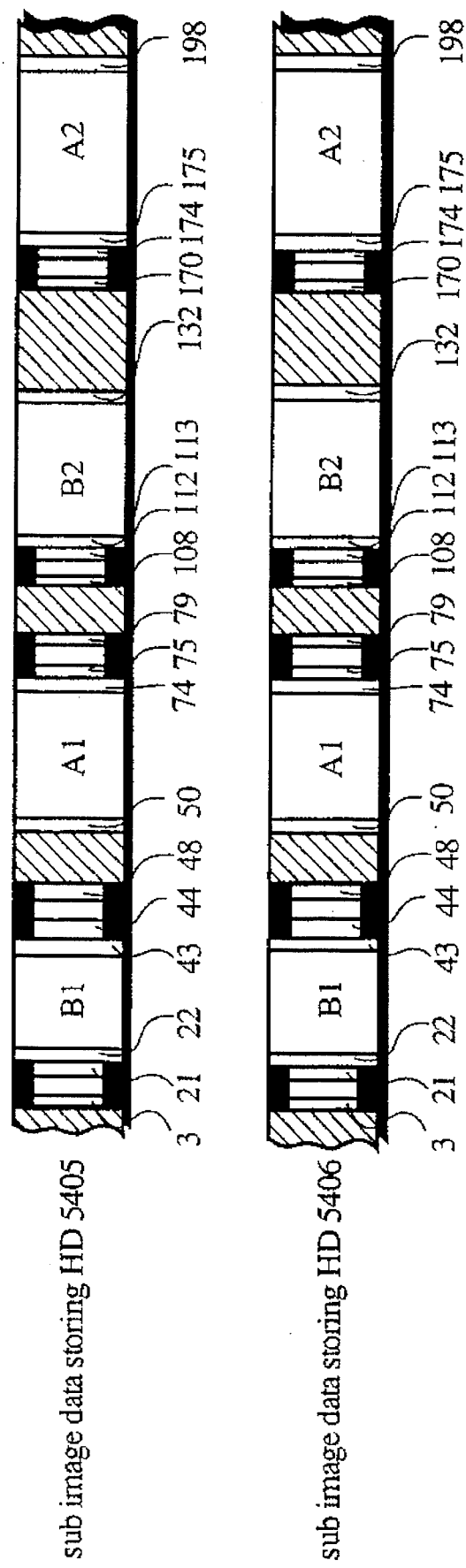
FIG. 56 shows areas read from the sub HDs 5405 and 5406.

Referring to the shot replay information sent from the transfer command holding unit 541, the sub HDs 5405 and 5406 output Shots A1, B1, A2, and B2 on a recording medium. The areas read from the sub HDs 5405 and 5406 are shown in FIG. 56. Each area added to a shot to delete a pause between two shots is indicated by thick lines.

The selector 542 synthesizes image data on the odd-numbered scan lines and image data on the even-numbered scan lines sent from the sub HDs 5405 and 5406 into a single image. In addition, informed that the shot replay information is for AC channel, the selector 542 outputs image data sent from the sub HDs 5405 and 5406 to the AC FIFO 4007. In the same manner, the selector 542 outputs shot replay information for BC channel to the BC FIFO 4008. As a result, Shots A1 and A2 are sent to the AC FIFO 4007 while Shots B1 and B2 are sent to the BC FIFO 4008 as shown in FIG. 51.

The AC and BC FIFOs 4007 and 4008, the video effects information memory 4009, and the video effects unit 4010 operate the same as Embodiment 13, thereby obtaining the results shown in FIG. 49.

<EMBODIMENT 16>

Figure 57:
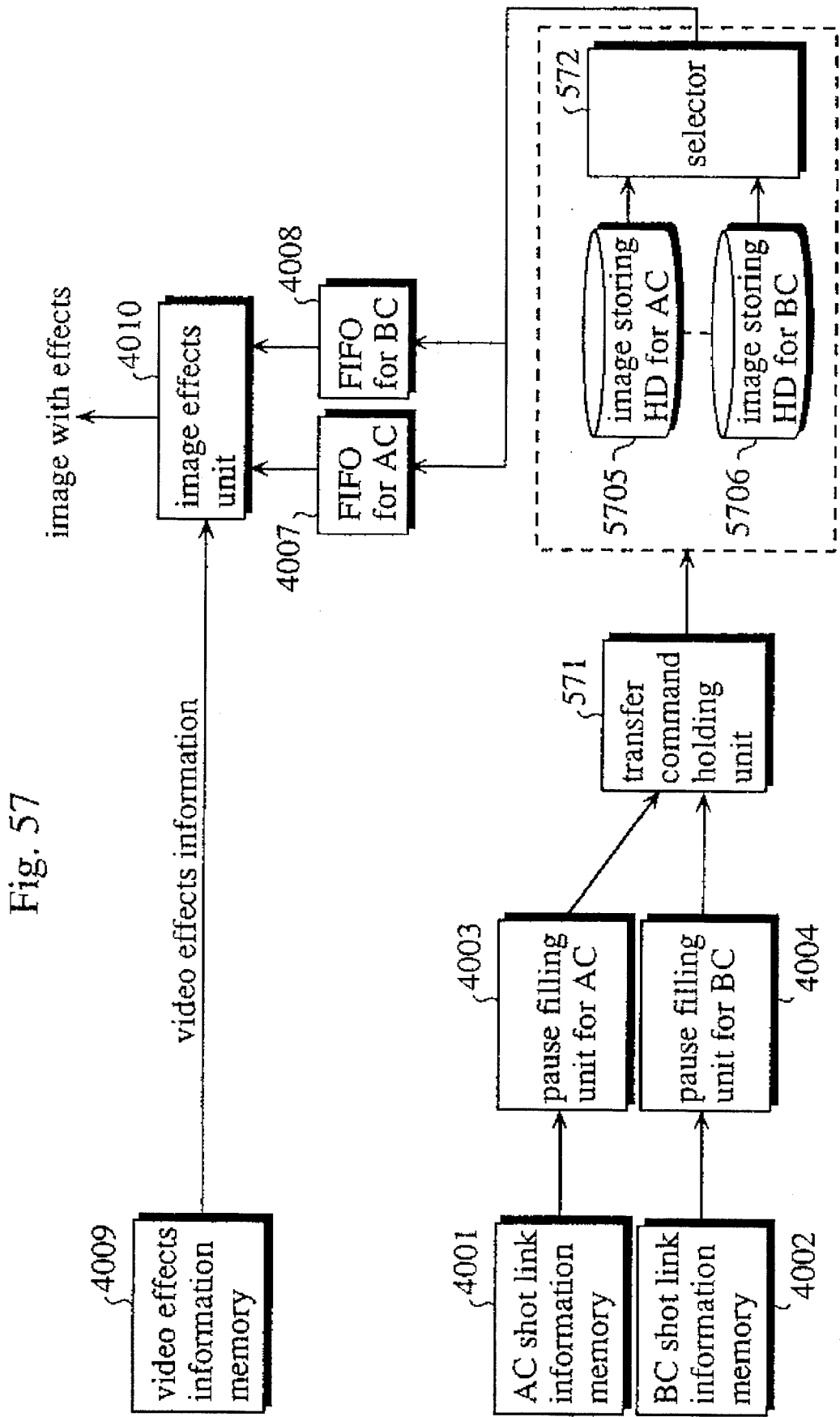
FIG. 57 shows a block diagram of the video editing apparatus of Embodiment 16.
Figure 58:
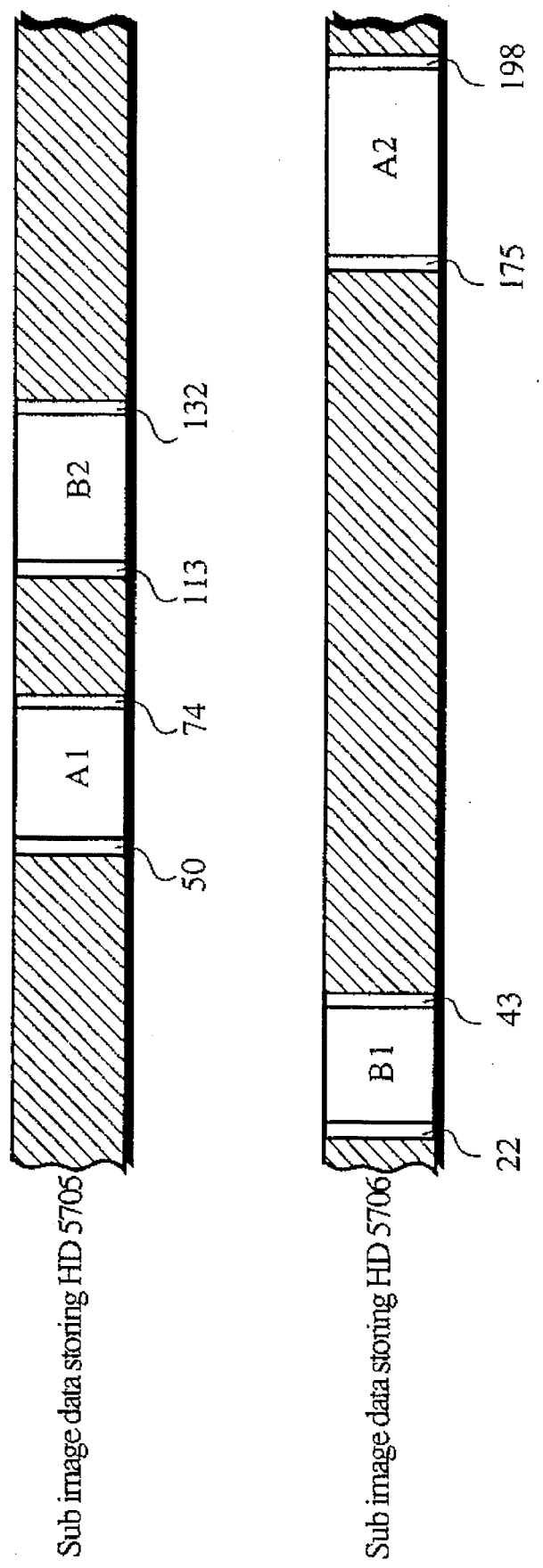
FIG. 58 shows the contents of the sub HDs 5705 and 5706.

The non-linear video editing system of this embodiment is constructed basically the same as Embodiments 13, as shown in FIG. 57, where the transfer command holding unit 571, the sub image data storage HDs 5705 and 5706, and the selector 572 are basically the same as their equivalences in Embodiments 13–15. The image data stored in the sub HDs 5705 and 5706 occupy one sector per frame.

The system of this embodiment operates as follows when 4 shots are edited as shown in FIGS. 6B.

The sub HD 5705 has Shots A1 and B2, and the sub HD 5706 has Shots B1 and A2.

The AC shot link information memory 4001, BC shot link information memory 4002, AC pause filling unit 4003, BC pause filling unit 4004 operate the same as those in Embodiment 13, the transfer command holding unit 571 operate the same as that in Embodiment 14. As a result, shot replay information shown in FIG. 51 is sent to the sub HD 5705 and 5706, and a judging signal for identifying an HD is sent to the selector.

The video effects unit 4010 operates as follows to output image data.

The transfer command holding unit 571 makes the sub HDs 5705 and 5706 output Shots A1, B2, B1, and A2, based on the shot replay information on Shots A1, B2, B1, and A2.

Figure 59:
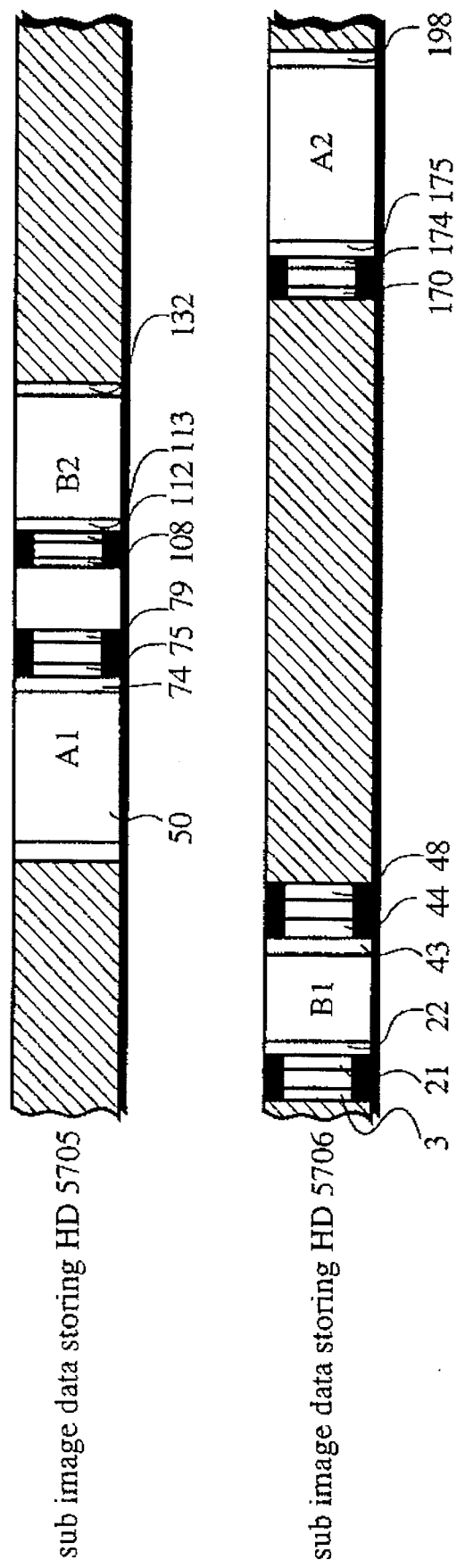
FIG. 59 shows areas read from the sub HDs 5705 and 5706.

The areas read from the sub HDs are shown in FIG. 59. Each area added to a shot to delete a pause between two shots is indicated by thick lines.

Informed that the shot replay information is for AC channel, the selector 571 outputs image data sent from the sub HDs 5705 and 5706 to the AC FIFO 4007. In the same manner, the selector 571 outputs shot replay information for BC channel to the BC FIFO 4008. As a result, Shots A1 and A2 are sent to the AC FIFO 4007 while Shots B1 and B2 are sent to the BC FIFO 4008 as shown in FIG. 51.

The AC and BC FIFOs 4007 and 4008, the video effects information memory 4009, and the video effects unit 4010 operate the same as Embodiment 15, thereby obtaining the results shown in FIG. 49.

<EMBODIMENT 17>

Figure 60:
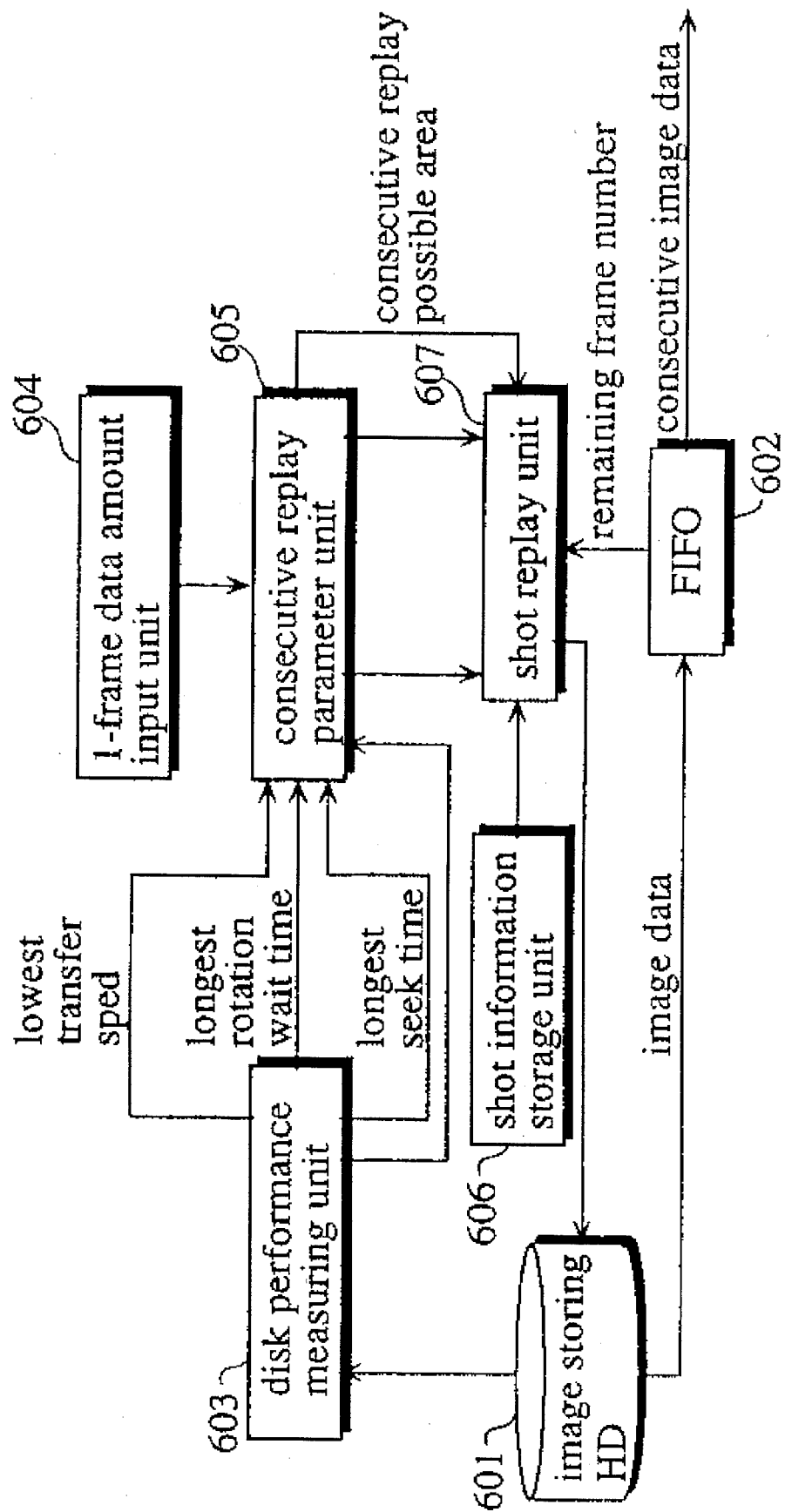
FIG. 60 shows a block diagram of the video editing apparatus of Embodiment 17.

The non-linear video editing system of this embodiment is shown as a block diagram in FIG. 60. The system includes an image data storage HD 601, an image FIFO 602, a disk performance measuring unit 603, a 1-frame data amount input unit 604, a consecutive replay parameter calculator unit 605, a shot information storage unit 606, and a shot replay unit 607. The other components such as synch signal generator, display unit, and CPU are not described because they are well known.

Unlike the above-mentioned embodiments, to clarify the feature of this embodiment, image data are described as being concentrically stored in the HD 601 where each frame corresponds to the circumference.

The disk performance measuring unit 603 measures the performance of the image data storage HD 601, thereby outputting the lowest speed of data transfer, the longest rotation wait time, the longest seek time, and information on defective areas in the image data storage HD 601.

The 1-frame data amount input unit 604 holds data amount per frame.

The shot information storage unit 606 holds shot information including the start time and the termination time for consecutive data. The editing operation in this embodiment is carried out by rearranging the shot information. Each shot has a length corresponding to (the number of frames to be transferred/2).

This embodiment has the following features.

The disk performance measuring unit 603 measures disk performance as follows.

(c1) A large amount of data is transferred, so that clear data transfer time occupy most of the time. Then, the longest time period spent for the transfer is made the lowest transfer speed.

(c2) To avoid data seek time, a small amount of consecutive data are transferred individually. The transfer is repeated so that clear transfer time and rotation wait time occupy some time of the time. The average rotation wait time can be found by subtracting a transfer time from the transfer speed obtained in (c1). Since the time needed for seeking is about half circumference of the disk in average, the worst case can be obtained by doubling this.

(c3) The longest data seek time can be measured by repeating to seek the head sector and the end sector.

(c4) To avoid data seek time, a small amount of consecutive data are transferred individually. The transfer is repeated so that clear transfer time and rotation wait time occupy some time of the time. Then, an expectation time is found from the transfer speed obtained in (c1) and the average rotation wait time obtained in (c2). When the measured time is far larger than the expectation time, it means that there are non-consecutive sectors somewhere in the small consecutive area, thereby producing an unexpected seek.

For the above-mentioned measurement, a time measuring device or a number measuring device are provided to cooperate the unillustrated CPU or clock signal generator.

Figure 61:
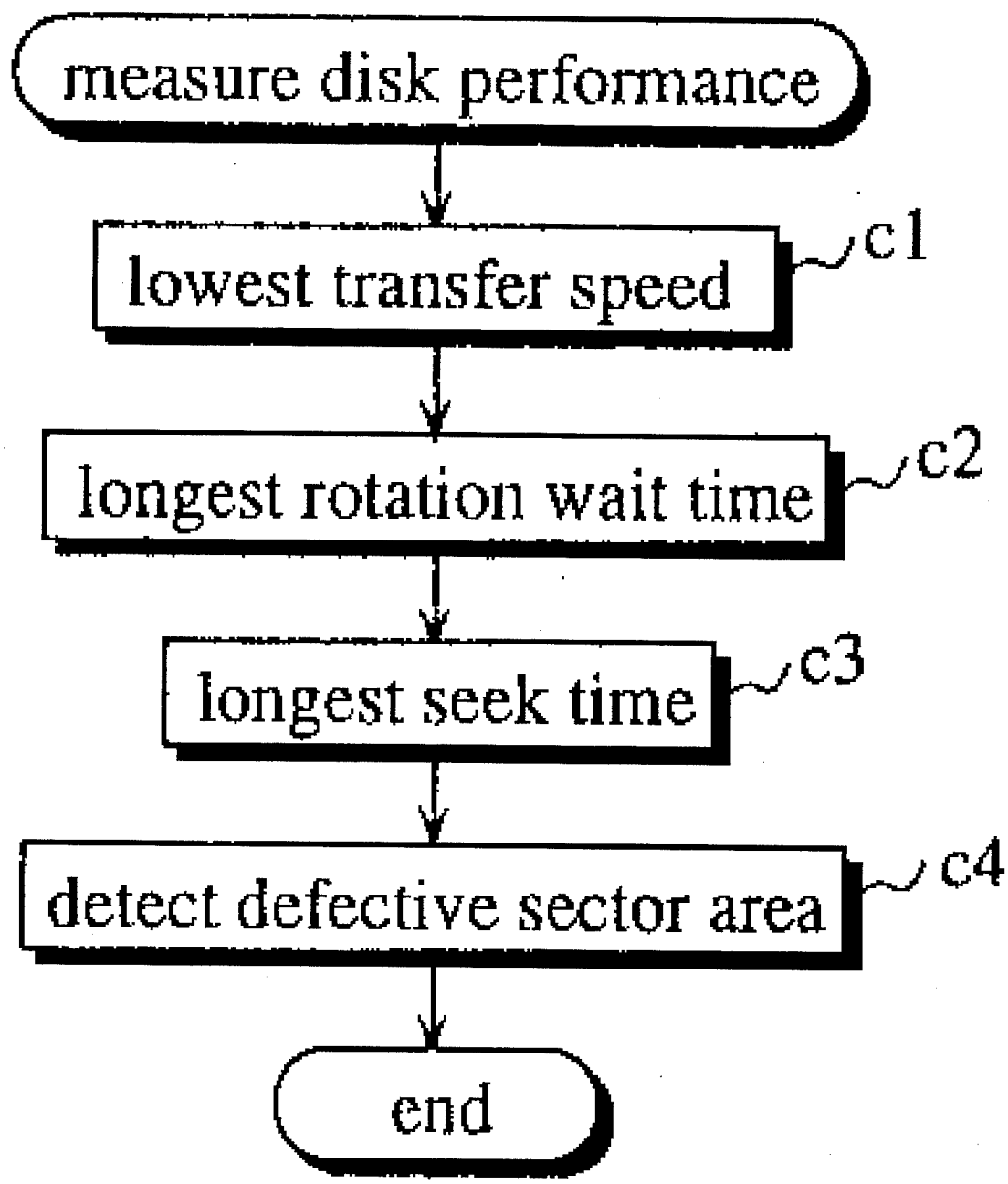
FIG. 61 is a flowchart showing a series of operations of the disk performance measuring unit 603.

FIG. 61 is a flowchart showing a series of operations from (c1) to (c4).

Figure 62:
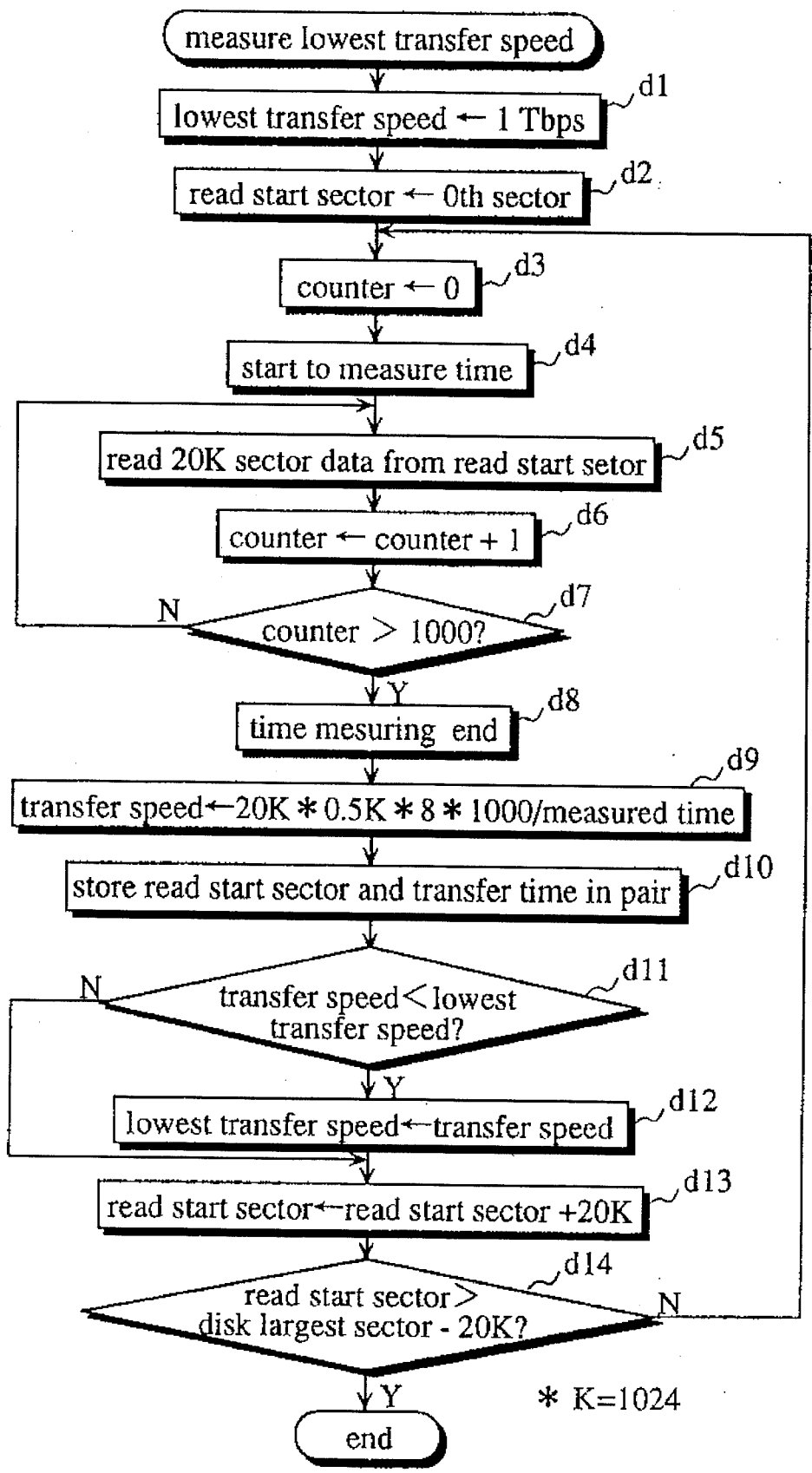
FIG. 62 is a flowchart showing the more detailed operation of measuring the lowest data transfer speed.

FIG. 62 is a flowchart showing the more detailed operation in (c1). Since the procedure is rather simple, the main part in the flowchart only is explained.

(d1) 1 Tbps represents 1 Tera bit per second, which is used to obtain the lowest data transfer speed without fail by setting, as an initial value, a large value which does not seem to obtained however the data transfer performance is improved in the future.

(d5) K represents $1024(=2^{10})$ (d7) 1000 means to repeat the transfer of a large amount of data 1000 times (d9) 20k*0.5k*8*1000 indicates the number of bits transferred in 1000 times because 20*1024 sectors are transferred at one time, one sector consists of 512 byte, and one byte consists of 8 bits.

Figure 63:
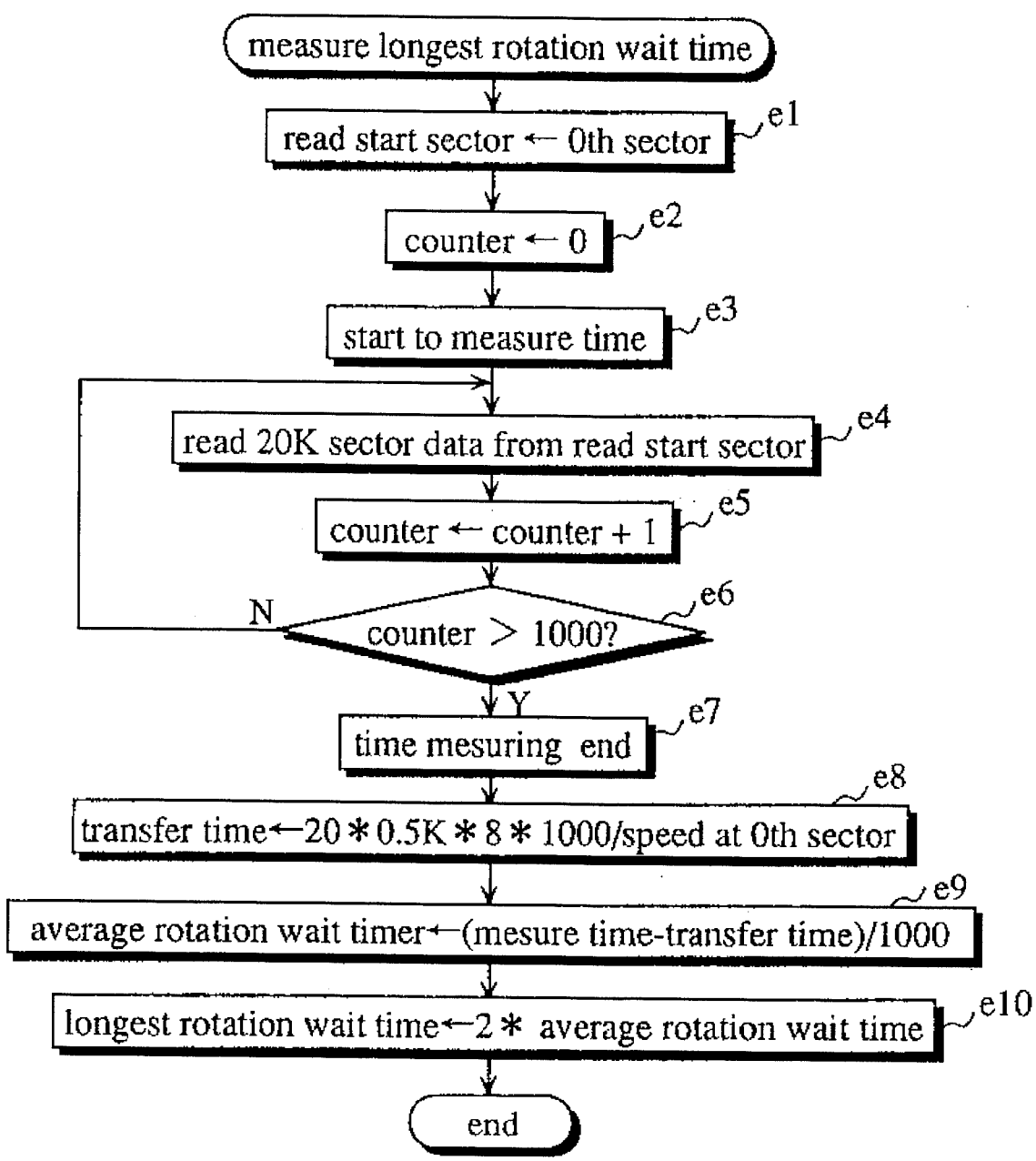
FIG. 63 is a flowchart showing the more detailed operation of measuring the longest rotation wait time.

FIG. 63 is a flowchart showing the more detailed operation in (c2).

Figure 64:
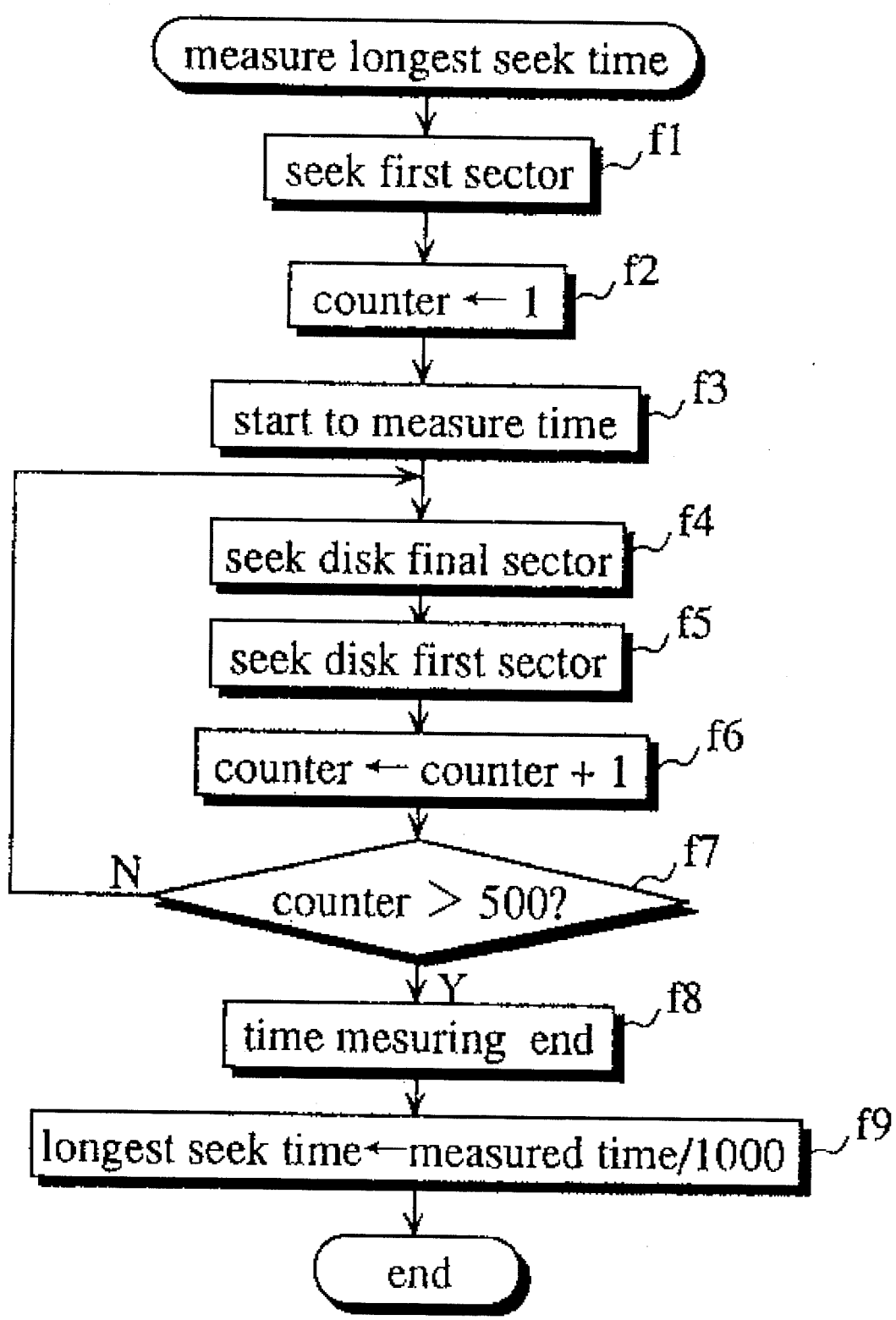
FIG. 64 is a flowchart showing the more detailed operation of measuring the longest seek time.

FIG. 64 is a flowchart showing the more detailed operation in (c3). In (f2), the initial value is set to 1 to make the seek time 1000.

Figure 65:
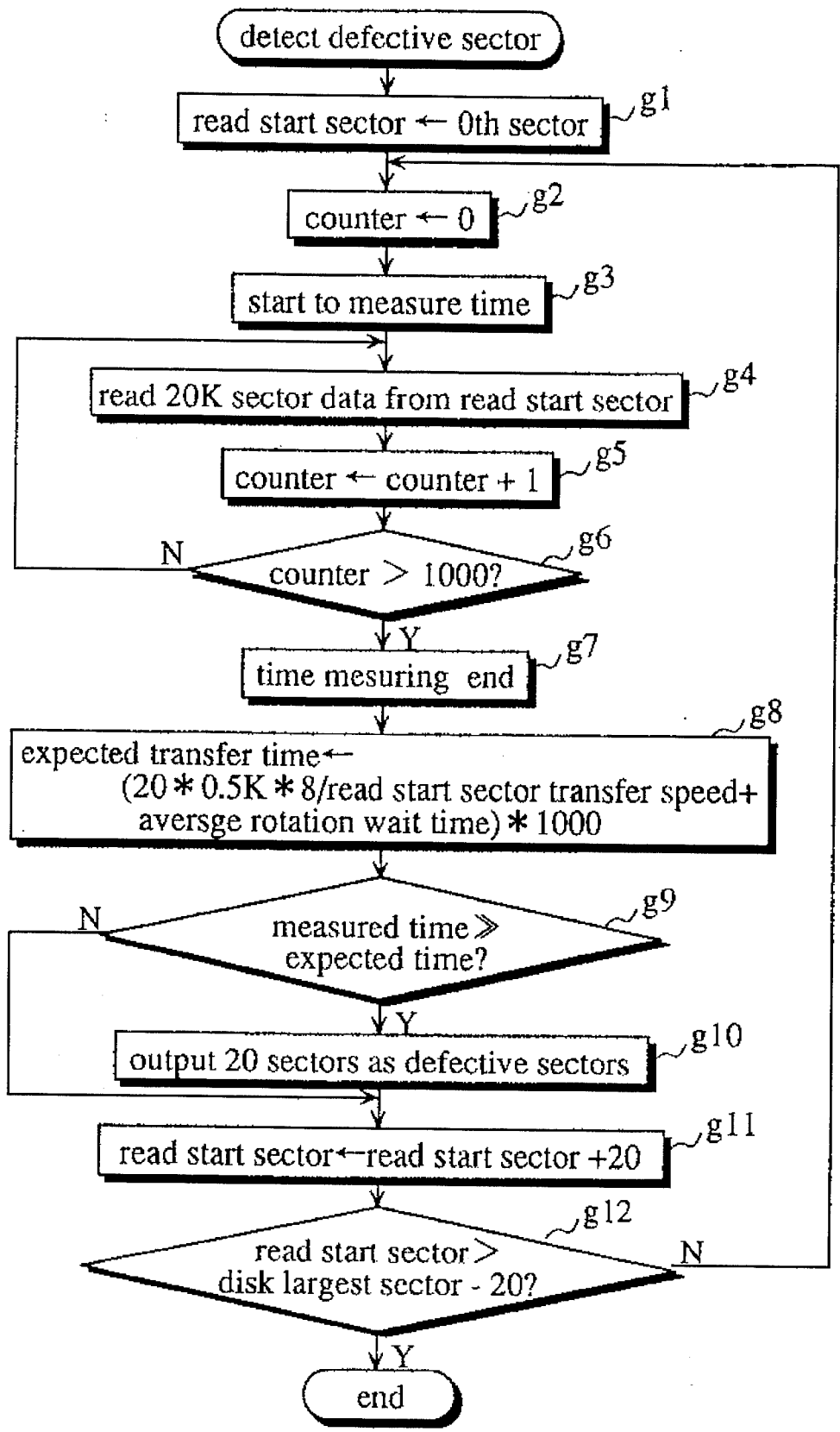
FIG. 65 is a flowchart showing the more detailed operation of detecting defective sectors.

FIG. 65 is a flowchart showing the more detailed operation in (c4).

The consecutive replay parameter calculator unit 605 perform calculation based on the following under the conditions that the lowest data transfer speed is made D, the longest rotation wait time L, the longest seek time S, and the amount of data for one frame is made F.

To achieve replay without interruption, the seek of the head of the x frames+rotation waiting+the transfer of the first frame must be carried out within the period the previous x frames are replaying. Calculations are performed to find the number of frames x per block, FIFO 602 length m(frame), and the number of remaining frames t.

First of all, to achieve replay without interruption, the following equation must be satisfied: $x/30 > S+L+F/D$ Then, the smallest natural number "x" is made the number of frames to be transferred at one time.

The number of remaining frames is found as follows.

transfer time for x frames=x*F/D (second)

When the transfer is completed, data in the FIFO 602 are supposed to increase by x frames; however, 30*(x*F/D) frames are lost for replay. As a result, data in the FIFO 602 are increased by x(1−30*F/D). Therefore, the number of remaining frames to start next readout is made the smallest natural number over x*(1−30*F/D).

By setting the number of remaining frames for starting readout as above, when the data transfer for x frames are completed, the FIFO 602 has exactly the number of remaining frames for starting readout. Thus, it becomes possible to start random access of data right after the completion of the preceding data.

The number of remaining frames for starting readout is made t.

The following is a description of the required FIFO length.

The number of frames in the FIFO when random access is started is t. The FIFO has the largest number of frames in the next data transfer when random access is completed very soon and (3/2)*x frames of data is transferred at the highest transfer speed.

The shortest random access time can be regarded as 0. The highest transfer speed can be set to 3D because it is within three times of the lowest transfer speed in the existing apparatuses.

When (3/2)*x frames are transferred at the rate of 3D, the time becomes (3/2x*F/3D).

At this time, the number of frames in the FIFO 602 is found by (the number of frames before transfer)+(the number of frames increased by the transfer)−(the number of frames replayed before the transfer time). Therefore, the result will be t+(3/2)x−30[(3/2)*x*F/(3D)]. When the smallest natural number above the value is made "m", it is proved that the FIFO 602 does not need to be larger than to accommodate m-frame data.

Once the values for x, m, and t are found as above, the consecutive replay parameter calculator unit 605 finds consecutive replay area information from the defective area information.

After this, the shot replay unit 607 determines the next transfer data based on the shot information of the shot information storage unit 606 when the number of frames remained in the FIFO 602 becomes smaller than the number of remaining frames for starting readout. When the reminder of the shot is smaller than 3/2* the number of transfer frames, it is all transferred. Then, the FIFO 602 replay the transferred image data in synchronization with frame cycle, consecutive data corresponding to the edited results are replayed.

<EMBODIMENT 18>

Figure 66:
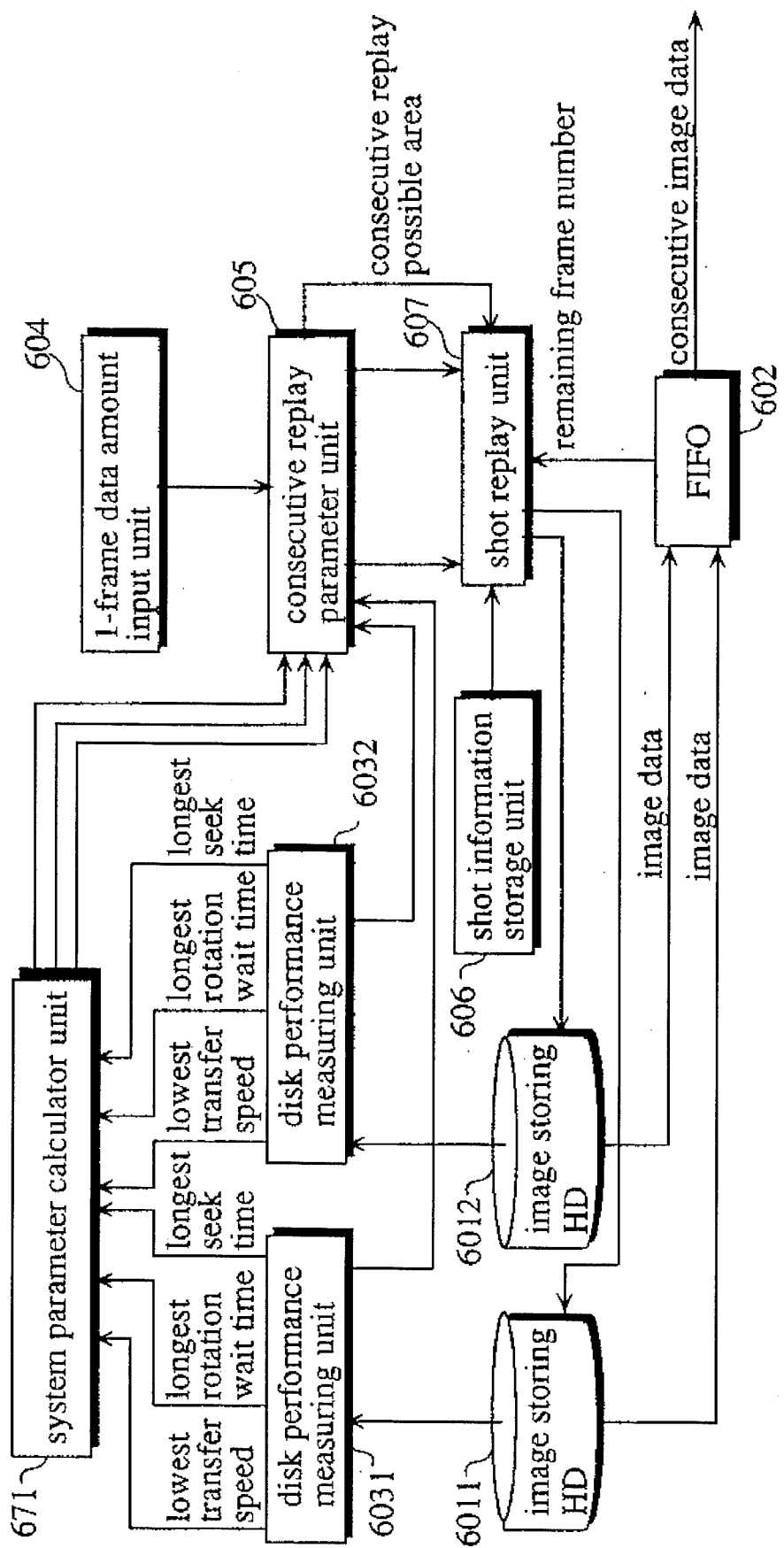
FIG. 66 shows a block diagram of the video editing apparatus of Embodiment 18.

The non-linear video editing system of this embodiment is constructed basically the same as Embodiment 17, as shown in FIG. 66 except that there are two image data storage HDs 6011 and 6012 and two disk performance measuring units 6031 and 6032, and a system parameter calculator unit 671.

The HDs 6011 and 6012 having the same constructions and effects as Embodiment 17, hold divided image data, which are transferred to the FIFO 602. The FIFO 602 synthesizes these divided image data into one and buffers serially, and outputs in synchronization with the frame cycle.

In addition, the FIFO 602 outputs the number of frames in the FIFO 602 to the shot replay unit 607.

The two disk performance measuring units 6031 and 6032 measure respective image data storage HDs 6011 and 6012, thereby outputting the lowest data transfer speed, the longest rotation wait time, the longest seek time, and information on the defective areas in the image data storage HDs 6011 and 6012.

The image data storage HDs 6011 and 6012 are provided with disk performance measuring units 6031 and 6032 to manage a case where the image data storage HDs 6011 and 6012 hold different images from each other, another case where they have different defective areas from each other.

The one-frame data amount input unit 604 holds data for one frame.

The system parameter calculator 671 outputs system lowest data transfer speed, the system longest seek time, and the system longest rotation wait time.

The system lowest data transfer speed is obtained by 2*the lowest speed at which data are outputted from one of the disk performance measuring units 6031 and 6032.

In this embodiment, the image data storage HDs 6011 and 6012 operate in parallel, so that data transfer time can be reduced by half by dividing data for one frame into the two image data storage HDs 6011 and 6012. This is the same as using a single HD having doubled capacity at the transfer speed D'=2S. Therefore, replay parameter can be obtained by replacing "D" in Embodiment 17 with "D'".

Then, the shot replay unit 607 determines the next transfer image data based on the shot information, when the number of frames in the FIFO 602 becomes smaller than the number of remaining frame for starting readout. If a shot is in process, partial image data for the frames to be transferred is transferred from the image data storage HDs 6011 and 6012 to the FIFO 602. If data less than 3/2 *the number of frames to be transferred are remained, the data are all transferred.

Then, the FIFO 602 synthesizes the transferred partial image data into a full image data and replay the data in synchronization with the frame cycle. Hence, desired image data are consecutively replayed.

<EMBODIMENT 19>

Figure 67:
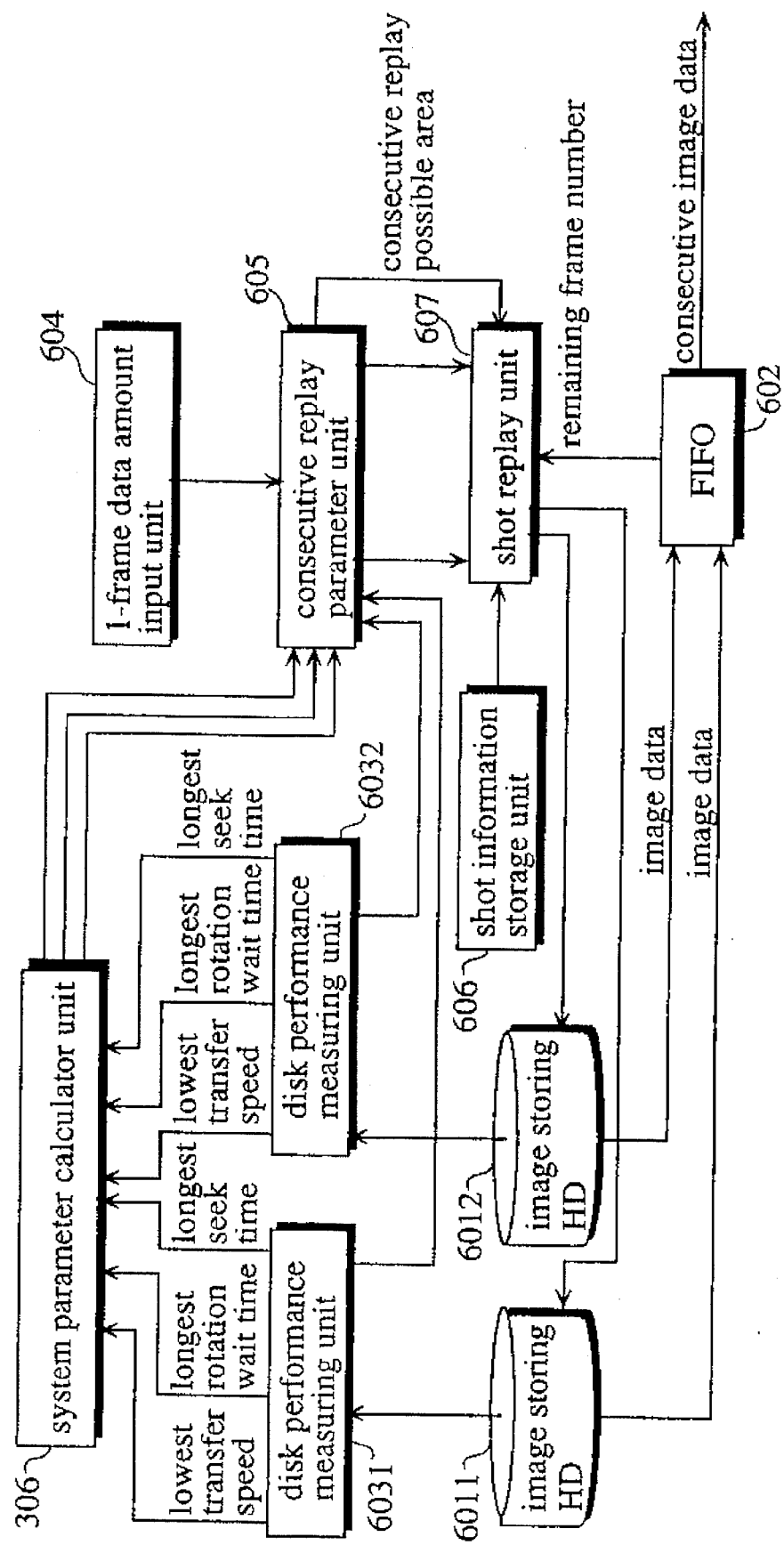
FIG. 67 shows a block diagram of the video editing apparatus of Embodiment 19.

The non-linear video editing system of this embodiment is constructed basically the same as Embodiment 18, as shown in FIG. 67 except that the HDs 6011 and 6012 are designed to operate selectively. As a result, image data are selectively transferred to the FIFO 602 and replayed in synchronization with the frame cycle, thereby outputting frames remained in the FIFO 602 as remainder frame No. without synthesizing partial image data.

The system of this embodiment, which has basically the same effects as that of Embodiment 17, can be regarded as having an image storage HD with a doubled capacity.

The system of this embodiment is characterized by the following.

The disk performance measuring units 6031 and 6032 measure the performance of the respective image data storage HDs 6011 and 6012, thereby outputting the lowest data transfer speed, the longest rotation wait time, the longest seek time, and information on the defective areas in the HDs. The second system parameter calculator unit outputs system lowest data transfer speed, the system longest seek time, and the system longest rotation wait time among all the outputs of the two disk performance measuring units.

The shot information storage unit 606 holds shot information including the start time and the termination time for consecutive data. The editing operation in this embodiment is carried out by rearranging the shot information. Each shot has a length corresponding to (the number of frames to be transferred/2).

After this, the shot replay unit 607 determines the next transfer data based on the shot information of the shot information storage unit 606 when the number of frames remained in the FIFO becomes smaller than the number of remaining frames for starting readout. When the reminder of the shot is smaller than 3/2* the number of transfer frames, it is all transferred. Then, the FIFO 602 replay the transferred image data in synchronization with frame cycle, consecutive data corresponding to the edited results are replayed.

<EMBODIMENT 20>

Figure 68:
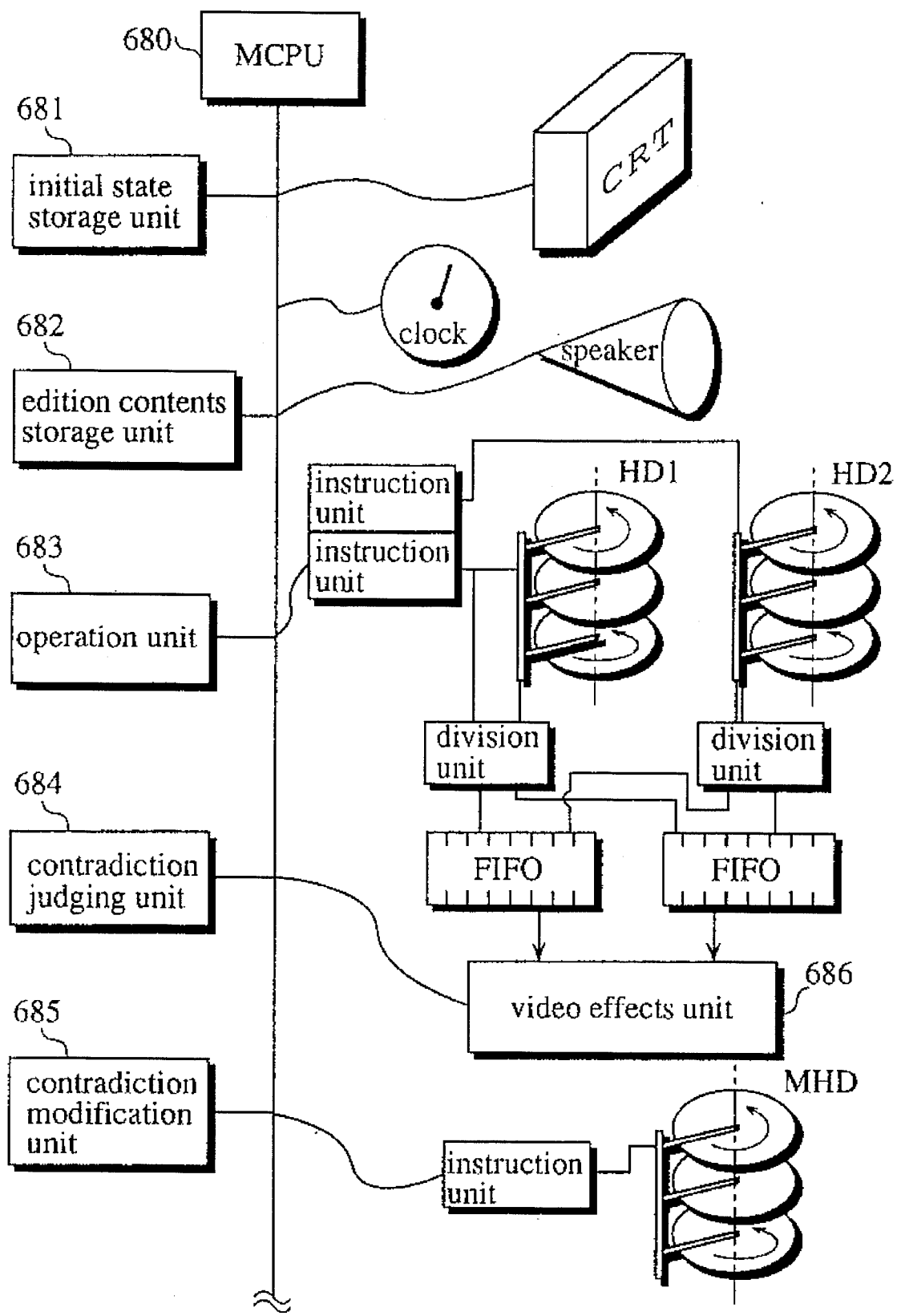
FIG. 68 shows a block diagram of the video editing apparatus of Embodiment 20.

FIG. 68 shows a block diagram of the non-linear video editing system of this embodiment. The diagram includes an initial state storage unit 681, an edition contents storage unit 682, an operation unit 683, a contradiction judging 684, and a contradiction modification unit 685, all of which characterize this embodiment.

The user inputs information on the locations for all the channels and shots stored in the image data storage HDs to the initial state storage unit 681, and designates an image data storage HD.

The edition contents storage unit 682 receives information on shots to be edited or on video effects inputted by the user. The operational procedures of the JPEG image expansion unit, the transfer parameter calculator unit, the compressed image synthesis unit, pause filling unit, disk performance measuring unit, and video effects unit 686 are stored in non-volatile memory integrated with the MCPU 680.

The operation unit 683 allows the user to suspend or go back the present operation or to add another shot or modify a already inputted shot. The modification of a shot can be carried out by the command FIFO, without suspending the output of the running image.

By checking desired shots in each time from the editing start and the contents of the edition, the contradiction judging unit 684 checks whether there is any contradiction between the already inputted contents and initialization by the user inputted through the operating unit. If there is any, it is informed by a lamp or the flickering of the CRT, thereby confirming the correct operation.

The contradiction modification unit 685 sets a correct value, based on the results of the contradiction judging unit 684, thereby updating the contents of the initial state storage unit 681 and the edition contents storage unit 682. In addition, the contents in the master image data storage HD is updated. Thus, the user can complete desired non-linear video edition.

The above-mentioned embodiments can be modified as follows.

(1) Although in Embodiments 1 to 12, the conversion from the frame Nos. to sector Nos. is executed by the block transfer execution unit 1211, sector Nos. may be previously stored in the shot link information memory 1208 together with corresponding frame Nos. Or, the conversion may be performed in the transfer parameter calculator unit 1210.

(2) Although in Embodiment 13, the conversion from the frame Nos. to sector Nos. is executed by the AC pause filling unit 4003 and BC pause filling unit 4004, sector Nos. may be previously stored in the AC channel shot link information memory and B channel shot link information memory together with corresponding frame Nos. Or, the conversion may be performed in the image storage units 4005 and 4006.

(3) Although a hard disk is used as image storage medium in all the embodiments, a laser disk or a photo-magnetic disk may be used instead as long as it is randomly accessible and does not need a pre roll.

(4) The partial image data storage HD used in Embodiments 3, 4, 9, 10 may be replaced by the plurality of HDs used in Embodiment 5.

(5) In Embodiment 13, the frame (shot) to apply vidual effects or to display may be designated by time information.

(6) Although the editing operation in each embodiment is limited to image data, audio data may be edited with image data or by itself. In that case, a speaker can be a display unit.

(7) To synthesize a plurality of channels, the bit information of each channel is stored in the predetermined position of storing element corresponding to each pixcel of VRAM for CRT, according to the contents of the video effects. In the case of audio information, a plurality of microphones and the storing unit of each microphone hold edited results. Or a microphone for each channel may be provided, so that when audio information is inputted from the FIFO, the audio information may not be inputted to the storing unit.

(8) Image data in each frame may be divided into red, blue, and green instead of odd-numbered scan lines and even-numbered scan lines.

(9) The display unit may be physically separated from the video effects unit, and the output of the video effects unit may be sent to the display unit by means of a laser disk or a magnetic disk.

(10) Although in the video effects units, shots and frames are shifted by providing switches or multiplexing bit information of a shot (frame) with zero, the former may be used when the pause is long and the latter when it is short.

(11) The same shot (frame) may be used repeatedly for display and video effects.

(12) Image data corresponding to a frame may be duplicated, and one is displayed on the other as "picture in picture".

(13) A component used in the Embodiments as a single unit for convenience' sake may be pluralized, or a component used as a plurality of units may be reduced to a single unit. Or they may be combined differently to meet different purposes. For example, (a) CRT and microphone may be combined as a display unit. (b) Instead of the plurality of calculators used in the disk performance measuring units, a single calculator may be used by switching operations. (c) A single storage unit such as a disk may be used to store various information inputted by the user by applying addresses for identification.

(14) Digital image data broadcasting received through the wire system and the wireless system may be edited with image data stored in advance in an image data storage unit for source video or FIFO.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A non-linear video editing system comprising:

source video storage means for storing digital video data which are assigned unique storing positions for predetermined amounts of video data and for outputting video data stored in a desired storing position at a desired time;

editing input operation means for receiving a storing position of shots used for edition and a time of an edition through an input operation of an operator, said shots being digital video data of consecutive sections in said source video storage means, the consecutive sections being designated by an operator;

shot information storage means for storing information on a start point and an end point of each of the shots and the time of the edition;

edition contents storing means for storing contents of an edition to be applied to the shots;

a FIFO for temporarily storing inputted video data;

video data transfer means for reading the shots from said source video storage means, based on the information stored in said shot information storage means, for dividing the read shots into blocks, and for transferring the blocks to said FIFO one by one;

video edition means for applying an edition to the video data sent from said FIFO, based on the storing contents stored in said edition contents storing means and the information stored in said shot information storage means; and data transfer control means for controlling the shot reading performed by said video data transfer means, said data transfer control means comprising a threshold frame number memory, a block transfer request means, a block transfer start/end frames storage means, a transfer parameter calculation means, and a designated transfer frame number memory; wherein said threshold frame number memory stores a threshold of frames for a next transfer request to said FIFO, the threshold being set to prevent said FIFO from having no frames before receiving blocks based on said block transfer request;

said block transfer request means requests said transfer parameter calculation means to transfer the next blocks when the number of frames in said FIFO becomes below the threshold;

said designated transfer frame number memory stores a designation transfer frame number, which is the number of frames composing a block, when said data transfer means transfers blocks in response to the block transfer request, the designation transfer frame number being set to make the number of frames in said FIFO above the threshold when the next blocks are sent in response to the block transfer request;

said block transfer start/end frames storage means stores, as an initial value, said start point and said end point of each of the shots stored in said shot information storage means and stores a start point of a next block by calculating the number of transferred frames to and from a start frame number in a last transfer every time a start of a block transfer is informed;

transfer parameter calculation means finds a start frame position and an end frame position of a block transfer in said block transfer start/end frames storage means, said start frame position and said end frame position correspond to the shot requested block transfer start, thereby judging by calculation whether the number of frames between said positions is above a predetermined multiple of the designated transfer frame number, if the number is judged to be above the predetermined multiple, the transfer parameter calculation means directs said data transfer means to transfer the number of frames stored in said designated transfer frame number memory, and if the number is judged to be below the predetermined multiple, it directs said data transfer means to transfer blocks for the number of times determined by the predetermined multiple, the number of frames composing each of the blocks being determined by a function between said threshold frame number and the predetermined multiple.

2. The non-linear video editing system of claim 1, wherein said transfer parameter calculation means sets the predetermined multiple to 1.5.

3. The non-linear video editing system of claim 2, wherein said transfer parameter calculation means makes each block have frames which are determined by a function between said threshold frame number and the predetermined multiple, and sets the number of transfer times to one of 1 and 2.

4. The non-linear video editing system of claim 3, wherein said data transfer control means further comprises:

data transfer speed detection means for finding an average of data transfer time by repeatedly transferring a great amount of data and then dividing a time needed for the transfer by transferred data, thereby finding a slowest data transfer speed;

rotation wait detection means for finding an average rotation wait time by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, thereby either storing the found threshold to said threshold frame number memory, or determining a capacity of the FIFO.

5. The non-linear video editing system of claim 4, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

6. The non-linear video editing system of claim 3, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

7. The non-linear video editing system of claim 2, wherein said data transfer control means further comprises:

data transfer speed detection means for finding an average of data transfer time by repeatedly transferring a great amount of data and then dividing a time needed for the transfer by transferred data, thereby finding a slowest data transfer speed;

rotation wait detection means for finding an average rotation wait time by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, thereby either storing the found threshold to said threshold frame number memory, or determining a capacity of the FIFO.

8. The non-linear video editing system of claim 7, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

9. The non-linear video editing system of claim 2, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

10. The non-linear video editing system of claim 1, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

11. The non-linear video editing system of claim 1, wherein said data transfer control means further comprises:

a command FIFO for directing said data transfer means for transferring a block which is composed of a predetermined number of frames and which starts from a frame position found by said transfer parameter calculator means, in response to a block transfer request from said block transfer request means, said command FIFO storing a command for the transfer;

a threshold command number memory for storing a threshold command number determined by a time needed for a CPU to process a special operation of an operator, the number of frames outputted from the FIFO during the time, and the threshold frame number;

command transfer request means for detecting the command number in said command FIFO when the command number becomes below the threshold stored in said threshold command number memory; and transfer command parameter calculation means for comparing, in response to a direction from said command transfer request means, the number of frames determined by multiplying a command number of a predetermined number of times by a predetermined transfer frame number, with the number of frames which are not transferred yet, for inputting said command number of the predetermined number of times to said command FIFO when the former number in the comparison is larger, and for generating a block transfer command array composed of the number of blocks needed to transfer all the remaining frames, thereby inputting the generated block transfer command array to said command FIFO, wherein said transfer command parameter calculation means further finds a start frame which is supposed to be positioned first in a next block transfer, after each block transfer, and stores the found start frame to said block transfer start/end frames storage means and said command FIFO.

12. The non-linear video editing system of claim 11, wherein said transfer parameter calculation means sets the predetermined multiple to 1.5.

13. The non-linear video editing system of claim 12, wherein said transfer parameter calculation means makes each block have frames which are determined by a function between said threshold frame number and the predetermined multiple, and sets the number of transfer times to one of 1 and 2.

14. The non-linear video editing system of claim 13, wherein said data transfer control means further comprises:

data transfer speed detection means for finding an average of data transfer time by repeatedly transferring a great amount of data and then dividing a time needed for the transfer by transferred data, thereby finding a slowest data transfer speed;

rotation wait detection means for finding an average rotation wait time by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, thereby either storing the found threshold to said threshold frame number memory, or determining a capacity of the FIFO.

15. The non-linear video editing system of claim 14, wherein said data transfer control means further comprises threshold command number calculation means for finding a threshold command number from the lowest data transfer speed, the longest rotation wait time, the longest seek time, the time needed for the CPU to process the special operation of the operator, the number of frames outputted from the FIFO during the time, and the threshold frame number, and for storing the found threshold command number to said threshold command number memory.

16. The non-linear video editing system of claim 15, wherein said data transfer control means further comprises:

defective area detection means for detecting a defective area in said source video storage means, based of information on the longest seek time sent from said longest seek time detection means; and spare frame storage means for comparing the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

17. The non-linear video editing system of claim 16, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

18. The non-linear video editing system of claim 15, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

19. The non-linear video editing system of claim 14, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

20. The non-linear video editing system of claim 13, wherein said data transfer control means further comprises threshold command number calculation means for finding a threshold command number from the lowest data transfer speed, the longest rotation wait time, the longest seek time, the time needed for the CPU to process the special operation of the operator, the number of frames outputted from the FIFO during the time, and the threshold frame number, and for storing the found threshold command number to said threshold command number memory.

21. The non-linear video editing system of claim 20, wherein said data transfer control means further comprises:

defective area detection means for detecting a defective area in said source video storage means, based of information on the longest seek time sent from said longest seek time detection means; and spare frame storage means for comparing the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

22. The non-linear video editing system of claim 21, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

23. The non-linear video editing system of claim 20, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

24. The non-linear video editing system of claim 13, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

25. The non-linear video editing system of claim 12, wherein said data transfer control means further comprises threshold command number calculation means for finding a threshold command number from the lowest data transfer speed, the longest rotation wait time, the longest seek time, the time needed for the CPU to process the special operation of the operator, the number of frames outputted from the FIFO during the time, and the threshold frame number, and for storing the found threshold command number to said threshold command number memory.

26. The non-linear video editing system of claim 25, wherein said data transfer control means further comprises:

defective area detection means for detecting a defective area in said source video storage means, based of information on the longest seek time sent from said longest seek time detection means; and spare frame storage means for comparing the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

27. The non-linear video editing system of claim 26, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

28. The non-linear video editing system of claim 25, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

29. The non-linear video editing system of claim 12, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

30. The non-linear video editing system of claim 11, wherein said data transfer control means further comprises threshold command number calculation means for finding a threshold command number from the lowest data transfer speed, the longest rotation wait time, the longest seek time, the time needed for the CPU to process the special operation of the operator, the number of frames outputted from the FIFO during the time, and the threshold frame number, and for storing the found threshold command number to said threshold command number memory.

31. The non-linear video editing system of claim 30, wherein said data transfer control means further comprises:

defective area detection means for detecting a defective area in said source video storage means, based of information on the longest seek time sent from said longest seek time detection means; and spare frame storage means for comparing the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

32. The non-linear video editing system of claim 31, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

33. The non-linear video editing system of claim 30, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

34. The non-linear video editing system of claim 11, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

35. A non-linear video editing system comprising:

a plurality of source video storage means for storing digital video data which are assigned unique storing positions for predetermined amounts of video data and for outputting video data stored in a desired storing position at a desired time;

edition input operation means for receiving information on at least one of the plurality of source video storage means to which shots used for edition belong, the storing position in the source video storage means, and time of the edition through an input operation of an operator, said shots being digital video data of consecutive sections in said source video storage means, the consecutive sections being designated by an operator;

shot information storage means for storing information on the source video storage means to which the shots belong, a start point and an end point of each of the shots, and the time of the edition;

edition contents storing means for storing contents of an edition to be applied to the shots;

a FIFO for temporarily storing inputted video data;

video data transfer means for reading the shots from each of said plurality of source video storage means, based on the information stored in said shot information storage means, for dividing the read shots into blocks, and for transferring the blocks to said FIFO one by one;

video edition means for applying an edition to the video data sent from said FIFO, based on the storing contents stored in said edition contents storing means and the information stored in said shot information storage means; and data transfer control means for controlling the shot reading performed by said video data transfer means, said data transfer control means comprising a threshold frame number memory, a block transfer request means, a block transfer start/end frames storage means, a transfer parameter calculation means, and a designated transfer frame number memory; wherein said threshold frame number memory stores a threshold of frames for a next transfer request to said FIFO, the threshold being set to prevent said FIFO from having no frames before receiving blocks based on said block transfer request;

said block transfer request means requests said transfer parameter calculation means to transfer the next blocks when the number of frames in said FIFO becomes below the threshold;

said designated transfer frame number memory stores a designation transfer frame number, which is the number of frames composing a block, when said data transfer means transfers blocks in response to the block transfer request, the designation transfer frame number being set to make the number of frames in said FIFO above the threshold when the next blocks are sent in response to the block transfer request;

said block transfer start/end frames storage means stores, as an initial value, the source video storage means to which the shots belong and said start point and said end point of each of the shots stored in said shot information storage means and stores a start point of a next block by calculating the number of transferred frames to and from a start frame number in a last transfer every time a start of a block transfer is informed;

transfer parameter calculation means finds a start frame position and an end frame position of a block transfer in said block transfer start/end frames storage means, said start frame position and said end frame position correspond to the shot requested block transfer start, thereby judging whether the number of frames between said positions is above a predetermined multiple of the designated transfer frame number, if the number is judged to be above the predetermined multiple, the transfer parameter calculation means directs said data transfer means to transfer the number of frames stored in said designated transfer frame number memory, and if the number is judged to be below the predetermined multiple, it directs said data transfer means to transfer blocks each having a same number of frames and the number of times determined by the determined multiple.

36. The non-linear video editing system of claim 35, wherein said transfer parameter calculation means sets the predetermined multiple to 1.5.

37. The non-linear video editing system of claim 36, wherein said transfer parameter calculation means makes each block have frames which are determined by a function between said threshold frame number and the predetermined multiple, and sets the number of transfer times to one of 1 and 2.

38. The non-linear video editing system of claim 37, wherein said data transfer control means further comprises:

data transfer speed detection means for finding an average of data transfer time, for each of said source video storage means, by repeatedly transferring a great amount of data and then dividing a time needed for the transfer by transferred data, thereby finding a slowest data transfer speed;

rotation wait detection means for finding an average rotation wait time, for each of said source video storage means, by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer, for each of said source video storage means, and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, for each of said source video storage means, thereby either storing the found threshold to said threshold frame number memory, or determining a capacity of the FIFO.

39. The non-linear video editing system of claim 38, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

40. The non-linear video editing system of claim 37, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

41. The non-linear video editing system of claim 36, wherein said data transfer control means further comprises:

data transfer speed detection means for finding an average of data transfer time, for each of said source video storage means, by repeatedly transferring a great amount of data and then dividing a time needed for the transfer by transferred data, thereby finding a slowest data transfer speed;

rotation wait detection means for finding an average rotation wait time, for each of said source video storage means, by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer, for each of said source video storage means, and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, for each of said source video storage means, thereby either storing the found threshold to said threshold frame number memory, or determining a capacity of the FIFO.

42. The non-linear video editing system of claim 39, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

43. The non-linear video editing system of claim 36, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

44. The non-linear video editing system of claim 35, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

45. The non-linear video editing system of claim 35, wherein said data transfer control means further comprises:

a command FIFO for directing said data transfer means for transferring a block which is composed of a predetermined number of frames and which starts from a frame position found by said transfer parameter calculator means, in response to a block transfer request from said block transfer request means, said command FIFO storing a command for the transfer;

a threshold command number memory for storing a threshold command number determined by a time needed for a CPU to process a special operation of an operator, the number of frames outputted from the FIFO during the time, and the threshold frame number;

command transfer request means for detecting the command number in said command FIFO when the command number becomes below the threshold stored in said threshold command number memory; and transfer command parameter calculation means for comparing, in response to a direction from said command transfer request means, the number of frames determined by multiplying a command number of a predetermined number of times by a predetermined transfer frame number, with the number of frames which are not transferred yet in the same source video storage means, for inputting said command number of the predetermined number of times to said command FIFO when the former number in the comparison is larger, and for generating a block transfer command array composed of the number of blocks needed to transfer all the remaining frames, thereby inputting the generated block transfer command array to said command FIFO, wherein said transfer command parameter calculation means further finds a start frame which is supposed to be positioned first in a next block transfer, after each block transfer, and stores the found start frame to said block transfer start/end frames storage means and said command FIFO.

46. The non-linear video editing system of claim 45, wherein said transfer parameter calculation means sets the predetermined multiple to 1.5.

47. The non-linear video editing system of claim 46, wherein said transfer parameter calculation means makes each block have frames which are determined by a function between said threshold frame number and the predetermined multiple, and sets the number of transfer times to one of 1 and 2.

48. The non-linear video editing system of claim 47, wherein said data transfer control means further comprises:

data transfer speed detection means for finding an average of data transfer time, for each of said source video storage means, by repeatedly transferring a great amount of data and then dividing a time needed for the transfer by transferred data, thereby finding a slowest data transfer speed;

rotation wait detection means for finding an average rotation wait time, for each of said source video storage means, by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer, for each of said source video storage means, and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, for each of said source video storage means, thereby either storing the found threshold to said threshold frame number memory, or determining a capacity of the FIFO.

49. The non-linear video editing system of claim 48, wherein said data transfer control means further comprises threshold command number calculation means for finding, for each source video storage means, a threshold command number from the lowest data transfer speed, the longest rotation wait time, the longest seek time, the time needed for the CPU to process the special operation of the operator, the number of frames outputted from the FIFO during the time, and the number of frames in a predetermined block, and for storing the found threshold command number to said threshold command number memory.

50. The non-linear video editing system of claim 49, wherein said data transfer control means further comprises:

defective area detection means for detecting a defective area in said source video storage means, for each of said source video storage means, based of information on the longest seek time sent from said longest seek time detection means; and spare frame storage means for comparing, for each of said source video storage means, the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

51. The non-linear video editing system of claim 50, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

52. The non-linear video editing system of claim 49, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

53. The non-linear video editing system of claim 48, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

54. The non-linear video editing system of claim 47, wherein said data transfer control means further comprises threshold command number calculation means for finding, for each source video storage means, a threshold command number from the lowest data transfer speed, the longest rotation wait time, the longest seek time, the time needed for the CPU to process the special operation of the operator, the number of frames outputted from the FIFO during the time, and the number of frames in a predetermined block, and for storing the found threshold command number to said threshold command number memory.

55. The non-linear video editing system of claim 54, wherein said data transfer control means further comprises:

defective area detection means for detecting a defective area in said source video storage means, for each of said source video storage means, based of information on the longest seek time sent from said longest seek time detection means; and spare frame storage means for comparing, for each of said source video storage means, the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

56. The non-linear video editing system of claim 55, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

57. The non-linear video editing system of claim 54, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

58. The non-linear video editing system of claim 47, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

59. The non-linear video editing system of claim 46, wherein said data transfer control means further comprises threshold command number calculation means for finding, for each source video storage means, a threshold command number from the lowest data transfer speed, the longest rotation wait time, the longest seek time, the time needed for the CPU to process the special operation of the operator, the number of frames outputted from the FIFO during the time, and the number of frames in a predetermined block, and for storing the found threshold command number to said threshold command number memory.

60. The non-linear video editing system of claim 59, wherein said data transfer control means further comprises:

defective area detection means for detecting a defective area in said source video storage means, for each of said source video storage means, based of information on the longest seek time sent from said longest seek time detection means; and spare frame storage means for comparing, for each of said source video storage means, the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

61. The non-linear video editing system of claim 60, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

62. The non-linear video editing system of claim 59, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

63. The non-linear video editing system of claim 46, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

64. The non-linear video editing system of claim 45, wherein said data transfer control means further comprises threshold command number calculation means for finding, for each source video storage means, a threshold command number from the lowest data transfer speed, the longest rotation wait time, the longest seek time, the time needed for the CPU to process the special operation of the operator, the number of frames outputted from the FIFO during the time, and the number of frames in a predetermined block, and for storing the found threshold command number to said threshold command number memory.

65. The non-linear video editing system of claim 64, wherein said data transfer control means further comprises:

defective area detection means for detecting a defective area in said source video storage means, for each of said source video storage means, based of information on the longest seek time sent from said longest seek time detection means; and spare frame storage means for comparing, for each of said source video storage means, the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

66. The non-linear video editing system of claim 65, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

67. The non-linear video editing system of claim 64, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

68. The non-linear video editing system of claim 45, wherein said data transfer control means further comprises:

following shot detection means for detecting whether each of the shots stored in said shot information storage means is followed by another shot to be edited;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

69. The non-linear video editing system of claim 35 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

70. The non-linear video editing system of claim 36 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

71. The non-linear video editing system of claim 37 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

72. The non-linear video editing system of claim 38 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

73. The non-linear video editing system of claim 39 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

74. The non-linear video editing system of claim 40 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

75. The non-linear video editing system of claim 41 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

76. The non-linear video editing system of claim 42 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

77. The non-linear video editing system of claim 43 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

78. The non-linear video editing system of claim 44 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

79. The non-linear video editing system of claim 45 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

80. The non-linear video editing system of claim 46 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

81. The non-linear video editing system of claim 47 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

82. The non-linear video editing system of claim 48 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

83. The non-linear video editing system of claim 49 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

84. The non-linear video editing system of claim 50 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

85. The non-linear video editing system of claim 51 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

86. The non-linear video editing system of claim 52 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

87. The non-linear video editing system of claim 53 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

88. The non-linear video editing system of claim 54 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

89. The non-linear video editing system of claim 55 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

90. The non-linear video editing system of claim 56 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

91. The non-linear video editing system of claim 57 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

92. The non-linear video editing system of claim 58 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

93. The non-linear video editing system of claim 59 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

94. The non-linear video editing system of claim 60 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

95. The non-linear video editing system of claim 61 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

96. The non-linear video editing system of claim 62 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

97. The non-linear video editing system of claim 63 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

98. The non-linear video editing system of claim 64 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

99. The non-linear video editing system of claim 65 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

100. The non-linear video editing system of claim 66 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

101. The non-linear video editing system of claim 67 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

102. The non-linear video editing system of claim 68 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

103. A non-linear video editing system comprising:

source video storage means for storing digital video data which are assigned unique storing positions for predetermined amounts of video data and for outputting video data stored in a desired storing position at a desired time;

a plurality of FIFOs for temporarily storing inputted video data;

edition input operation means for receiving a storing position of shots used for edition, time of an edition, and a FIFO to which the shots are inputted, through an input operation of an operator, said shots being digital video data of consecutive sections in said source video storage means, the consecutive sections being designated by an operator;

shot information storage means for storing information on a start point and an end point of each of the shots and the time of the edition;

edition contents storing means for storing information on which FIFO each of the shots is inputted to and contents of an edition to be applied to each of the shots;

video data transfer means for reading the shots from said source video storage means, based on the information stored in said shot information storage means, for dividing the read shots into blocks, and for transferring the blocks to said FIFO one by one;

FIFO selection means for reading the information outputted from said video data transfer means through said shot information storage means and edition contents storing means, thereby inputting each block to a respective FIFO;

video edition means for applying an edition to the video data sent from each of said FIFOs, based on the storing contents stored in said edition contents storing means and the information stored in said shot information storage means; and data transfer control means for controlling the shot reading performed by said video data transfer means, said data transfer control means comprising a threshold frame number memory, a block transfer request means, a block transfer start/end frames storage means, a transfer parameter calculation means, and a designated transfer frame number memory; wherein said threshold frame number memory stores a threshold of frames for a next transfer request to a given one of said FIFOs, the threshold being set to prevent the FIFO from having no frames before receiving the blocks based on said block transfer request;

said block transfer request means requests said transfer parameter calculation means to transfer the next blocks when the number of frames in each of said FIFOs becomes below the threshold;

said designated transfer frame number memory stores a designation transfer frame number, which is the number of frames composing a block, when said data transfer means transfers blocks in response to the block transfer request, the designation transfer frame number being set to make the number of frames in the given one of said FIFOs above the threshold when the next blocks are sent in response to the block transfer request;

said block transfer start/end frames storage means stores, as an initial value, said start point and said end point of each of the shots stored in said shot information storage means and stores a start point of a next block by calculating the number of transferred frames to and from a start frame number in a last transfer every time a start of a block transfer is informed; and transfer parameter calculation means finds a start frame position and an end frame position of a block transfer in said block transfer start/end frames storage means, said start frame position and said end frame position correspond to the shot requested block transfer start, thereby judging by calculation whether the number of frames between said positions is above a predetermined multiple of the designated transfer frame number, if the number is judged to be above the predetermined multiple, directs said data transfer means to transfer the number of frames stored in said designated transfer frame number memory, and if the number is judged to be below the predetermined multiple, directs said data transfer means to transfer blocks for the number of times determined by the predetermined multiple, the number of frames composing each of the blocks being determined by a function between said threshold frame number and the predetermined multiple.

104. The non-linear video editing system of claim 103, wherein said transfer parameter calculation means sets the predetermined multiple to 1.5.

105. The non-linear video editing system of claim 104, wherein said transfer parameter calculation means makes each block have frames which are determined by a function between said threshold frame number and the predetermined multiple, and sets the number of transfer times to one of 1 and 2.

106. The non-linear video editing system of claim 105, wherein said data transfer control means further comprises:

data transfer speed detection means for finding an average of data transfer time by repeatedly transferring a great amount of data and then dividing a time needed for the transfer by transferred data, thereby finding a slowest data transfer speed;

rotation wait detection means for finding an average rotation wait time by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, thereby either storing the found threshold to said threshold frame number memory, or determining a capacity of the FIFO.

107. The non-linear video editing system of claim 106, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

108. The non-linear video editing system of claim 105, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

109. The non-linear video editing system of claim 104, wherein said data transfer control means further comprises:

data transfer speed detection means for finding an average of data transfer time by repeatedly transferring a great amount of data and then dividing a time needed for the transfer by transferred data, thereby finding a slowest data transfer speed;

rotation wait detection means for finding an average rotation wait time by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, thereby either storing the found threshold to said threshold frame number memory, or determining a capacity of the FIFO.

110. The non-linear video editing system of claim 109, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

111. The non-linear video editing system of claim 104, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

112. The non-linear video editing system of claim 103, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

113. The non-linear video editing system of claim 103, wherein said data transfer control means further comprises:

a plurality of command FIFOs for directing said data transfer means for transferring a block which is composed of a predetermined number of frames and which starts from a frame position found by said transfer parameter calculator means, in response to a block transfer request from said block transfer request means, said command FIFO storing a command for the transfer;

threshold command number memory for storing a threshold command number determined by a time needed for a CPU to process a special operation of an operator, the number of frames outputted from the FIFO during the time, and the threshold frame number;

command transfer request means for detecting the command number in each of said command FIFOs when the command number becomes below the threshold stored in said threshold command number memory; and transfer command parameter calculation means for comparing, in response to a direction from said command transfer request means, the number of frames determined by multiplying a command number of a predetermined number of times by a predetermined transfer frame number, with the number of frames which are not transferred yet, for inputting said command number of the predetermined number of times to said command FIFO when the former number in the comparison is larger, and for generating a block transfer command array composed of the number of blocks needed to transfer all the remaining frames, thereby inputting the generated block transfer command array to said command FIFO, said transfer command parameter calculation means further finding a start frame which is supposed to be positioned first in a next block transfer, after each block transfer, and storing the found start frame to said block transfer start/end frames storage means and said command FIFO; and transfer command parameter calculation adjusting means for determining which one of a plurality of requests sent from said command transfer request means has a priority.

114. The non-linear video editing system of claim 113, wherein said transfer parameter calculation means sets the predetermined multiple to 1.5.

115. The non-linear video editing system of claim 114, wherein said transfer parameter calculation means makes each block have frames which are determined by a function between said threshold frame number and the predetermined multiple, and sets the number of transfer times to one of 1 and 2.

116. The non-linear video editing system of claim 115, wherein said data transfer control means further comprises:

data transfer speed detection means for finding an average of data transfer time by repeatedly transferring a great amount of data and then dividing a time needed for the transfer by transferred data, thereby finding a slowest data transfer speed;

rotation wait detection means for finding an average rotation wait time by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, thereby either storing the found threshold to said threshold frame number memory, or determining a capacity of the FIFO.

117. The non-linear video editing system of claim 116, wherein said data transfer control means further comprises threshold command number calculation means for finding a threshold command number from the lowest data transfer speed, the longest rotation wait time, the longest seek time, the time needed for the CPU to process the special operation of the operator, the number of frames outputted from the FIFO during the time, and the threshold frame number, and for storing the found threshold command number to said threshold command number memory.

118. The non-linear video editing system of claim 117, wherein said data transfer control means further comprises:

defective area detection means for detecting a defective area in said source video storage means, based of information on the longest seek time sent from said longest seek time detection means; and spare frame storage means for comparing the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

119. The non-linear video editing system of claim 118, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

120. The non-linear video editing system of claim 117, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

121. The non-linear video editing system of claim 116, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

122. The non-linear video editing system of claim 115, wherein said data transfer control means further comprises threshold command number calculation means for finding a threshold command number from the lowest data transfer speed, the longest rotation wait time, the longest seek time, the time needed for the CPU to process the special operation of the operator, the number of frames outputted from the FIFO during the time, and the threshold frame number, and for storing the found threshold command number to said threshold command number memory.

123. The non-linear video editing system of claim 122, wherein said data transfer control means further comprises:

defective area detection means for detecting a defective area in said source video storage means, based of information on the longest seek time sent from said longest seek time detection means; and spare frame storage means for comparing the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

124. The non-linear video editing system of claim 123, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

125. The non-linear video editing system of claim 122, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

126. The non-linear video editing system of claim 115, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

127. The non-linear video editing system of claim 114, wherein said data transfer control means further comprises threshold command number calculation means for finding a threshold command number from the lowest data transfer speed, the longest rotation wait time, the longest seek time, the time needed for the CPU to process the special operation of the operator, the number of frames outputted from the FIFO during the time, and the threshold frame number, and for storing the found threshold command number to said threshold command number memory.

128. The non-linear video editing system of claim 126, wherein said data transfer control means further comprises:

defective area detection means for detecting a defective area in said source video storage means, based of information on the longest seek time sent from said longest seek time detection means; and spare frame storage means for comparing the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

129. The non-linear video editing system of claim 128, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

130. The non-linear video editing system of claim 127, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

131. The non-linear video editing system of claim 114, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

132. The non-linear video editing system of claim 113, wherein said data transfer control means further comprises threshold command number calculation means for finding a threshold command number from the lowest data transfer speed, the longest rotation wait time, the longest seek time, the time needed for the CPU to process the special operation of the operator, the number of frames outputted from the FIFO during the time, and the threshold frame number, and for storing the found threshold command number to said threshold command number memory.

133. The non-linear video editing system of claim 132, wherein said data transfer control means further comprises:

defective area detection means for detecting a defective area in said source video storage means, based of information on the longest seek time sent from said longest seek time detection means; and spare frame storage means for comparing the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

134. The non-linear video editing system of claim 133, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

135. The non-linear video editing system of claim 132, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

136. The non-linear video editing system of claim 113, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

137. A non-linear video editing system comprising:

a plurality of source video storage means for storing digital video data which are assigned unique storing positions for predetermined amounts and for outputting video data stored in desired storing position at desired time;

a plurality of FIFOs for temporarily storing inputted video data;

edition input operation means for receiving information on at least one of the plurality of source video storage means to which shots used for edition belong, the storing position in the source video storage means, and time of the edition through an input operation of an operator, said shots being digital video data of consecutive sections in said source video storage means, the consecutive sections being designated by an operator;

shot information storage means for storing information on the source video storage means to which the shots belong, a start point and an end point of each of the shots, and the time of the edition;

edition contents storing means for storing information on which FIFO each of the shots is inputted to and contents of an edition to be applied to each of the shots;

video data transfer means for reading the shots from each of said plurality of source video storage means, based on the information stored in said shot information storage means, for dividing the read shots into blocks, and for transferring the blocks to said FIFO one by one;

FIFO selection means for reading the information outputted from said video data transfer means through said shot information storage means and edition contents storing means, thereby inputting each block to a respective FIFO;

video edition means for applying an edition to the video data sent from each of said FIFOs, based on the storing contents stored in said edition contents storing means and the information stored in said shot information storage means; and data transfer control means for controlling the shot reading performed by said video data transfer means, said data transfer control means comprising a threshold frame number memory, a block transfer request means, a block transfer start/end frames storage means, a transfer parameter calculation means, and a designated transfer frame number memory; wherein said threshold frame number memory stores a threshold of frames for a next transfer request to a given one of said FIFOs, the threshold being set to prevent the FIFO from having no frames before receiving blocks based on said block transfer request;

said block transfer request means requests said transfer parameter calculation means to transfer next blocks when the number of frames in each of said FIFOs becomes below the threshold;

said designated transfer frame number memory stores a designation transfer frame number, which is the number of frames composing a block, when said data transfer means transfers blocks in response to the block transfer request, the designation transfer frame number being set to make the number of frames in the given one of said FIFOs above the threshold when the next blocks are sent in response to the block transfer request;

said block transfer start/end frames storage means stores, as an initial value, said start point and said end point of each of the shots stored in said shot information storage means and stores a start point of a next block by calculating the number of transferred frames to and from a start frame number in a last transfer every time a start of a block transfer is informed; and transfer parameter calculation means finds a start frame position and an end frame position of a block transfer in said block transfer start/end frames storage means, said start frame position and said end frame position correspond to the shot requested block transfer start, thereby judging by calculation whether the number of frames between said positions is above a predetermined multiple of the designated transfer frame number, if the number is judged to be above the predetermined multiple, directs said data transfer means to transfer the number of frames stored in said designated transfer frame number memory, and if the number is judged to be below the predetermined multiple, directs said data transfer means to transfer blocks for the number of times determined by the predetermined multiple, the number of frames composing each of the blocks being determined by a function between said threshold frame number and the predetermined multiple.

138. The non-linear video editing system of claim 137, wherein said transfer parameter calculation means sets the predetermined multiple to 1.5.

139. The non-linear video editing system of claim 138, wherein said transfer parameter calculation means makes each block have frames which are determined by a function between said threshold frame number and the predetermined multiple, and sets the number of transfer times to one of 1 and 2.

140. The non-linear video editing system of claim 139, wherein said data transfer control means further comprises:

data transfer speed detection means for finding an average of data transfer time, for each of said source video storage means, by repeatedly transferring a great amount of data and then dividing a time needed for the transfer by transferred data, thereby finding a slowest data transfer speed;

rotation wait detection means for finding an average rotation wait time, for each of said source video storage means, by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer, for each of said source video storage means, and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, for each of said source video storage means, thereby either storing the found threshold to said threshold frame number memory, or determining a capacity of the FIFO.

141. The non-linear video editing system of claim 140, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

142. The non-linear video editing system of claim 139, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

143. The non-linear video editing system of claim 138, wherein said data transfer control means further comprises:

data transfer speed detection means for finding an average of data transfer time, for each of said source video storage means, by repeatedly transferring a great amount of data and then dividing a time needed for the transfer by transferred data, thereby finding a slowest data transfer speed;

rotation wait detection means for finding an average rotation wait time, for each of said source video storage means, by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer, for each of said source video storage means, and finding a value greater than the predetermined multiple, based on a value expected from the average transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, for each of said source video storage means, thereby either storing the found threshold to said threshold frame number memory, or determining a capacity of the FIFO.

144. The non-linear video editing system of claim 143, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

145. The non-linear video editing system of claim 138, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

146. The non-linear video editing system of claim 137, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

147. The non-linear video editing system of claim 137, wherein said data transfer control means further comprises:

a plurality of command FIFOs for directing said data transfer means for transferring a block which is composed of a predetermined number of frames and which starts from a frame position found by said transfer parameter calculator means, in response to a block transfer request from said block transfer request means, said command FIFO storing a command for the transfer;

threshold command number memory for storing a threshold command number determined by a time needed for a CPU to process a special operation of an operator, the number of frames outputted from the FIFO during the time, and the threshold frame number;

command transfer request means for detecting the command number in each of said command FIFOs when the command number becomes below the threshold stored in said threshold command number memory; and transfer command parameter calculation means for comparing, in response to a direction from said command transfer request means, the number of frames determined by multiplying a command number of a predetermined number of times by a predetermined transfer frame number, with the number of frames which are not transferred yet in the same source video storage means, for inputting said command number of the predetermined number of times to said command FIFO when the former number in the comparison is larger, and for generating a block transfer command array composed of the number of blocks needed to transfer all the remaining frames, thereby inputting the generated block transfer command array to said command FIFO, said transfer command parameter calculation means further finding a start frame which is supposed to be positioned first in a next block transfer, after each block transfer, and storing the found start frame to said block transfer start/end frames storage means and said command FIFO; and transfer command parameter calculation adjusting means for determining which one of a plurality of requests sent from said command transfer request means has a priority.

148. The non-linear video editing system of claim 147, wherein said transfer parameter calculation means sets the predetermined multiple to 1.5.

149. The non-linear video editing system of claim 148, wherein said transfer parameter calculation means makes each block have frames which are determined by a function between said threshold frame number and the predetermined multiple, and sets the number of transfer times to one of 1 and 2.

150. The non-linear video editing system of claim 147, wherein said data transfer control means further comprises:

data transfer speed detection means for finding an average of data transfer time, for each of said source video storage means, by repeatedly transferring a great amount of data and then dividing a time needed for the transfer by transferred data, thereby finding a slowest data transfer speed;

rotation wait detection means for finding an average rotation wait time, for each of said source video storage means, by repeating to transfer a small amount of consecutive data and then subtracting clear transfer time from an entire time spent for the transfer operation and for further finding a longest rotation wait time by doubling the average rotation wait time;

longest seek time detection means for first repeating to transfer a small amount of consecutive data in order to find a time needed for each of the repeated transfer, for each of said source video storage means, and finding a value greater than the predetermined multiple, based on a value expected from the average-transfer speed found by said data transfer speed detection means and the average rotation wait time found by said rotation wait detection means, thereby detecting a storing area having a non-consecutive sector, and further detecting a longest seek time; and threshold frame calculation means for finding a threshold from the longest data transfer speed, the longest rotation wait time, and the longest seek time, for each of said source video storage means, thereby either storing the found threshold to said threshold frame number memory, or determining a capacity of the FIFO.

151. The non-linear video editing system of claim 150, wherein said data transfer control means further comprises threshold command number calculation means for finding, for each source video storage means, a threshold command number from the lowest data transfer speed, the longest rotation wait time, the longest seek time, the time needed for the CPU to process the special operation of the operator, the number of frames outputted from the FIFO during the time, and the number of frames in a predetermined block, and for storing the found threshold command number to said threshold command number memory.

152. The non-linear video editing system of claim 151, wherein said data transfer control means further comprises:

defective area detection means for detecting a defective area in said source video storage means, for each of said source video storage means, based of information on the longest seek time sent from said longest seek time detection means; and spare frame storage means for comparing, for each of said source video storage means, the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

153. The non-linear video editing system of claim 152, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

154. The non-linear video editing system of claim 151, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

155. The non-linear video editing system of claim 150, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

156. The non-linear video editing system of claim 149, wherein said data transfer control means further comprises threshold command number calculation means for finding, for each source video storage means, a threshold command number from the lowest data transfer speed, the longest rotation wait time, the longest seek time, the time needed for the CPU to process the special operation of the operator, the number of frames outputted from the FIFO during the time, and the number of frames in a predetermined block, and for storing the found threshold command number to said threshold command number memory.

157. The non-linear video editing system of claim 156, wherein said data transfer control means further comprises:

defective area detection means for detecting a defective area in said source video storage means, for each of said source video storage means, based of information on the longest seek time sent from said longest seek time detection means; and spare frame storage means for comparing, for each of said source video storage means, the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

158. The non-linear video editing system of claim 157, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

159. The non-linear video editing system of claim 156, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

160. The non-linear video editing system of claim 149, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

161. The non-linear video editing system of claim 148, wherein said data transfer control means further comprises threshold command number calculation means for finding, for each source video storage means, a threshold command number from the lowest data transfer speed, the longest rotation wait time, the longest seek time, the time needed for the CPU to process the special operation of the operator, the number of frames outputted from the FIFO during the time, and the number of frames in a predetermined block, and for storing the found threshold command number to said threshold command number memory.

162. The non-linear video editing system of claim 161, wherein said data transfer control means further comprises:

defective area detection means for detecting a defective area in said source video storage means, for each of said source video storage means, based of information on the longest seek time sent from said longest seek time detection means; and spare frame storage means for comparing, for each of said source video storage means, the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

163. The non-linear video editing system of claim 162, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

164. The non-linear video editing system of claim 161, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

165. The non-linear video editing system of claim 148, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

166. The non-linear video editing system of claim 147, wherein said data transfer control means further comprises threshold command number calculation means for finding, for each source video storage means, a threshold command number from the lowest data transfer speed, the longest rotation wait time, the longest seek time, the time needed for the CPU to process the special operation of the operator, the number of frames outputted from the FIFO during the time, and the number of frames in a predetermined block, and for storing the found threshold command number to said threshold command number memory.

167. The non-linear video editing system of claim 166, wherein said data transfer control means further comprises:

defective area detection means for detecting a defective area in said source video storage means, for each of said source video storage means, based of information on the longest seek time sent from said longest seek time detection means; and spare frame storage means for comparing, for each of said source video storage means, the defective area and the information on a start point and an end point of each shot stored in said shot information storage means and for, if ann shot to be edited exists in the defective area, making at least one of said block transfer request means, threshold frame number calculation means, and threshold command number calculation means have a spare frame in said FIFO for a data transfer preceding to the transfer of the frame existing in the defective area.

168. The non-linear video editing system of claim 167, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

169. The non-linear video editing system of claim 166, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

170. The non-linear video editing system of claim 147, wherein said data transfer control means further comprises:

following shot detection means for detecting whether each of the shots stored in said shot information storage means is followed by another shot to be edited in the same FIFO;

between-shots frame number calculation means for, when said other shot is detected, finding the number of frames corresponding to a time needed after a termination frame in a preceding shot has been edited until a start frame in a following shot has been edited; and between-shots fill-up means for either extending a termination frame position of a preceding shot backwards or extending a start frame position of a following shot forwards, thereby adding frames between the preceding and following shots, the number of frames to be added being found by said between-shots frame number calculation means, said between-shots fill-up means further allowing said FIFO to read all the frames composing the preceding and following shots and the frames added therebetween, and prohibiting said video edition means to output the added frames as frames to be edited.

171. The non-linear video editing system of claim 138 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

172. The non-linear video editing system of claim 139 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

173. The non-linear video editing system of claim 140 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

174. The non-linear video editing system of claim 141 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

175. The non-linear video editing system of claim 142 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

176. The non-linear video editing system of claim 143 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

177. The non-linear video editing system of claim 144 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

178. The non-linear video editing system of claim 145 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

179. The non-linear video editing system of claim 146 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

180. The non-linear video editing system of claim 147 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

181. The non-linear video editing system of claim 148 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

182. The non-linear video editing system of claim 149 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

183. The non-linear video editing system of claim 150 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

184. The non-linear video editing system of claim 151 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

185. The non-linear video editing system of claim 152 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

186. The non-linear video editing system of claim 153 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

187. The non-linear video editing system of claim 154 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

188. The non-linear video editing system of claim 155 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

189. The non-linear video editing system of claim 156 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

190. The non-linear video editing system of claim 157 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

191. The non-linear video editing system of claim 158 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

192. The non-linear video editing system of claim 159 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

193. The non-linear video editing system of claim 160 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

194. The non-linear video editing system of claim 161 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

195. The non-linear video editing system of claim 162 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

196. The non-linear video editing system of claim 163 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

197. The non-linear video editing system of claim 164 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

198. The non-linear video editing system of claim 165 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

199. The non-linear video editing system of claim 166 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

200. The non-linear video editing system of claim 167 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

201. The non-linear video editing system of claim 168 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

202. The non-linear video editing system of claim 169 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

203. The non-linear video editing system of claim 170 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

204. The non-linear video editing system of claim 171 further comprising:

division information input operation means for receiving an input operation of the operator to input contents of divided video data;

division information storage means for storing the information inputted to said division information input operation means;

divisional video data synthesis means for synthesizing the divided video data into an original video data, based on the information read from said division information storage means, said synthesizing being carried out at least one of before each of the divided video image is inputted to said FIFO, when it is in said FIFO, and after it is outputted from said FIFO, wherein said plurality of source video storage means, said edition input operation means, said shot information storage means, said video data transfer means, said data transfer control means, and said FIFO each can provide the divided video data with a same input operation and a respective process as the original video data.

* * * * *